US012767326B2

(12) United States Patent
De Paiva et al.

(10) Patent No.: US 12,767,326 B2
(45) Date of Patent: Oct. 20, 2026

(54) SYSTEMS AND METHODS FOR FLIGHT CONTROL OF EVTOL AIRCRAFT

(71) Applicant: Archer Aviation, Inc., San Jose, CA (US)

(72) Inventors: Fernanda Aline Matta De Paiva, Los altos Hills, CA (US); Scott Furman, Menlo Park, CA (US); Sergio Henrique Soares Ferreira, San Jose, CA (US); Damien Bardon, San Jose, CA (US)

(73) Assignee: Archer Aviation Inc., San Jose, CA (US)

( * ) Notice: Subject to any disclaimer, the term of this patent is extended or adjusted under 35 U.S.C. 154(b) by 60 days.

(21) Appl. No.: 18/622,020

(22) Filed: Mar. 29, 2024

(65) Prior Publication Data

US 2024/0400200 A1 Dec. 5, 2024

Related U.S. Application Data

(63) Continuation of application No. 18/468,421, filed on Sep. 15, 2023, now Pat. No. 12,006,035.

(Continued)

(51) Int. Cl.

*B64C 29/00* (2006.01)
*B64C 11/46* (2006.01)

(Continued)

(52) U.S. Cl.

CPC .......... *B64C 29/0033* (2013.01); *B64C 11/46* (2013.01); *B64C 13/16* (2013.01);

(Continued)

(58) Field of Classification Search

CPC .............. B64C 29/0033; B64C 13/503; B64D 2221/00

See application file for complete search history.

(56) References Cited

U.S. PATENT DOCUMENTS

| | | | |
|---|---|---|---|
| 5,001,646 | A | 3/1991 | Caldwell et al. |
| 9,898,033 | B1 | 2/2018 | Long |

(Continued)

FOREIGN PATENT DOCUMENTS

| | | | |
|---|---|---|---|
| EP | 3891067 | B1 | 1/2024 |
| WO | 2020180373 | A2 | 9/2020 |

OTHER PUBLICATIONS

International Search Report and Written Opinion of the International Search Authority for International Application No. PCT/US2024/022039 dated Aug. 23, 2024 (14 pages).

(Continued)

*Primary Examiner* — William L Gmoser

(74) *Attorney, Agent, or Firm* — Finnegan, Henderson, Farabow, Garrett & Dunner, LLP

(57) ABSTRACT

Aspects of this present disclosure relate to flight control of electric aircrafts and other vehicles. In one embodiment, an aircraft is disclosed comprising: a fuselage; two wings; a plurality of lift propellers, the lift propellers disposed aft of the wings during forward flight; plurality of tilt propellers that are tiltable between vertical lift and forward propulsion configurations, the tilt propellers disposed forward of the wings during forward flight; a plurality of tilt propellor actuators that tilt propellers between vertical lift and forward propulsion configurations, the tilt propellor actuators on opposite sides of the fuselage; and a plurality of electrical buses coupled to a flight control computer; wherein the flight control computer is configured to provide control signals for at least one of the lift propellers mounted to one of the wings and one of the tilt propellers mounted to the other wing via the same electrical bus.

31 Claims, 31 Drawing Sheets

Related U.S. Application Data

(60) Provisional application No. 63/504,958, filed on May 30, 2023.

(51) Int. Cl.

| | |
|---|---|
| ***B64C 13/16*** | (2006.01) |
| ***B64C 13/18*** | (2006.01) |
| ***B64C 13/50*** | (2006.01) |
| ***B64C 19/00*** | (2006.01) |
| ***B64D 27/34*** | (2024.01) |
| ***B64D 31/12*** | (2006.01) |
| ***B64D 31/16*** | (2024.01) |
| ***B64D 45/00*** | (2006.01) |
| ***B64F 5/60*** | (2017.01) |
| ***G01C 23/00*** | (2006.01) |
| ***G05D 1/617*** | (2024.01) |
| ***G05D 1/80*** | (2024.01) |

(52) U.S. Cl.

CPC .............. *B64C 13/18* (2013.01); *B64C 13/50* (2013.01); *B64C 19/00* (2013.01); *B64D 27/34* (2024.01); *B64D 31/12* (2013.01); *B64D 31/16* (2024.01); *B64D 45/00* (2013.01); *B64F 5/60* (2017.01); *G01C 23/005* (2013.01); *G05D 1/617* (2024.01); *G05D 1/80* (2024.01); *B64D 2221/00* (2013.01)

(56) References Cited

U.S. PATENT DOCUMENTS

| | | | | |
|---|---|---|---|---|
| 11,077,937 | B1 * | 8/2021 | Bruell | B64C 11/001 |
| 11,697,495 | B1 | 7/2023 | Henck et al. | |
| 12,149,193 | B1 * | 11/2024 | Lueneburg | H02P 27/06 |
| 12,375,013 | B1 * | 7/2025 | Wang | B64C 27/32 |
| 2002/0153452 | A1 | 10/2002 | King et al. | |
| 2004/0093130 | A1 | 5/2004 | Osder et al. | |
| 2010/0076625 | A1 | 3/2010 | Yoeli | |
| 2013/0138270 | A1 | 5/2013 | Christensen et al. | |
| 2017/0355449 | A1 | 12/2017 | Bapat et al. | |
| 2019/0009901 | A1 | 1/2019 | Luo et al. | |
| 2019/0332125 | A1 | 10/2019 | Irwin, III et al. | |
| 2020/0164995 | A1 | 5/2020 | Lovering et al. | |
| 2020/0333805 | A1 | 10/2020 | English et al. | |
| 2022/0009379 | A1 | 1/2022 | Mikic et al. | |
| 2022/0009625 | A1 | 1/2022 | Bower et al. | |
| 2022/0127011 | A1 | 4/2022 | Long et al. | |
| 2022/0269291 | A1 | 8/2022 | Teles Ferreira et al. | |
| 2023/0051515 | A1 | 2/2023 | Baladi et al. | |
| 2023/0056909 | A1 * | 2/2023 | Gusman | B64C 13/16 |
| 2024/0137244 | A1 | 4/2024 | Starr et al. | |
| 2025/0026470 | A1 * | 1/2025 | Baladi | B64C 17/06 |

OTHER PUBLICATIONS

Walker, G., et al., "F-35B Integrated Flight-Propulsion Control Development", 2013 international powered lift conference, 2013, 15 pages.

Vigano, L., et al., "Development of augmented control laws for a tilt rotor in low and high speed flight modes", European Rotorcraft Forum, 2017, 14 pages.

Denham, J., et al., "Converging on a precision Hover control strategy for the F-35B STOVL aircraft.", AIAA Guidance, Navigation and Control Conference and Exhibit, 2006, 13 pages.

Whittle, R., "Flying The Osprey Is Not Dangerous, Just Different: Veteran Pilots", Breaking Defense, Sep. 5, 2012, 11 pages.

Kang, Y., et al., "Development of flight control system and troubleshooting on flight test of a tilt-rotor unmanned aerial vehicle", International Journal of Aeronautical and Space Sciences 17.1, 2016, p. 120-131, 12 pages.

* cited by examiner

SYSTEMS AND METHODS FOR FLIGHT CONTROL OF EVTOL AIRCRAFT

CROSS-REFERENCE TO RELATED APPLICATIONS

The present application is a continuation of U.S. application Ser. No. 18/468,421, titled "SYSTEMS AND METHODS FOR FLIGHT CONTROL OF EVTOL AIRCRAFT," filed Sep. 15, 2023, which issued as U.S. Pat. No. 12,006,035 on Jun. 11, 2024, which claims priority to U.S. Provisional Application No. 63/504,958, titled "SYSTEMS AND METHOD FOR FLIGHT CONTROL OF EVTOL AIRCRAFT," filed May 30, 2023, the contents of all of which are incorporated by reference herein in their entirety for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles. Other aspects of the present disclosure generally relate to improvements in flight control systems and methods that provide particular advantages in aerial vehicles and may be used in other types of vehicles.

SUMMARY

Aspects of this present disclosure relate to flight control of electric aircrafts and other vehicles. In one embodiment, an aircraft is disclosed comprising: a fuselage; two wings; a plurality of lift propellers, the lift propellers disposed aft of the wings during forward flight; plurality of tilt propellers that are tiltable between vertical lift and forward propulsion configurations, the tilt propellers disposed forward of the wings during forward flight; a plurality of tilt propellor actuators that tilt propellers between vertical lift and forward propulsion configurations, the tilt propellor actuators on opposite sides of the fuselage; and a plurality of electrical buses coupled to a flight control computer; wherein the flight control computer is configured to provide control signals for at least one of the lift propellers mounted to one of the wings and one of the tilt propellers mounted to the other wing via the same electrical bus.

DETAILED DESCRIPTION

Figure 1:
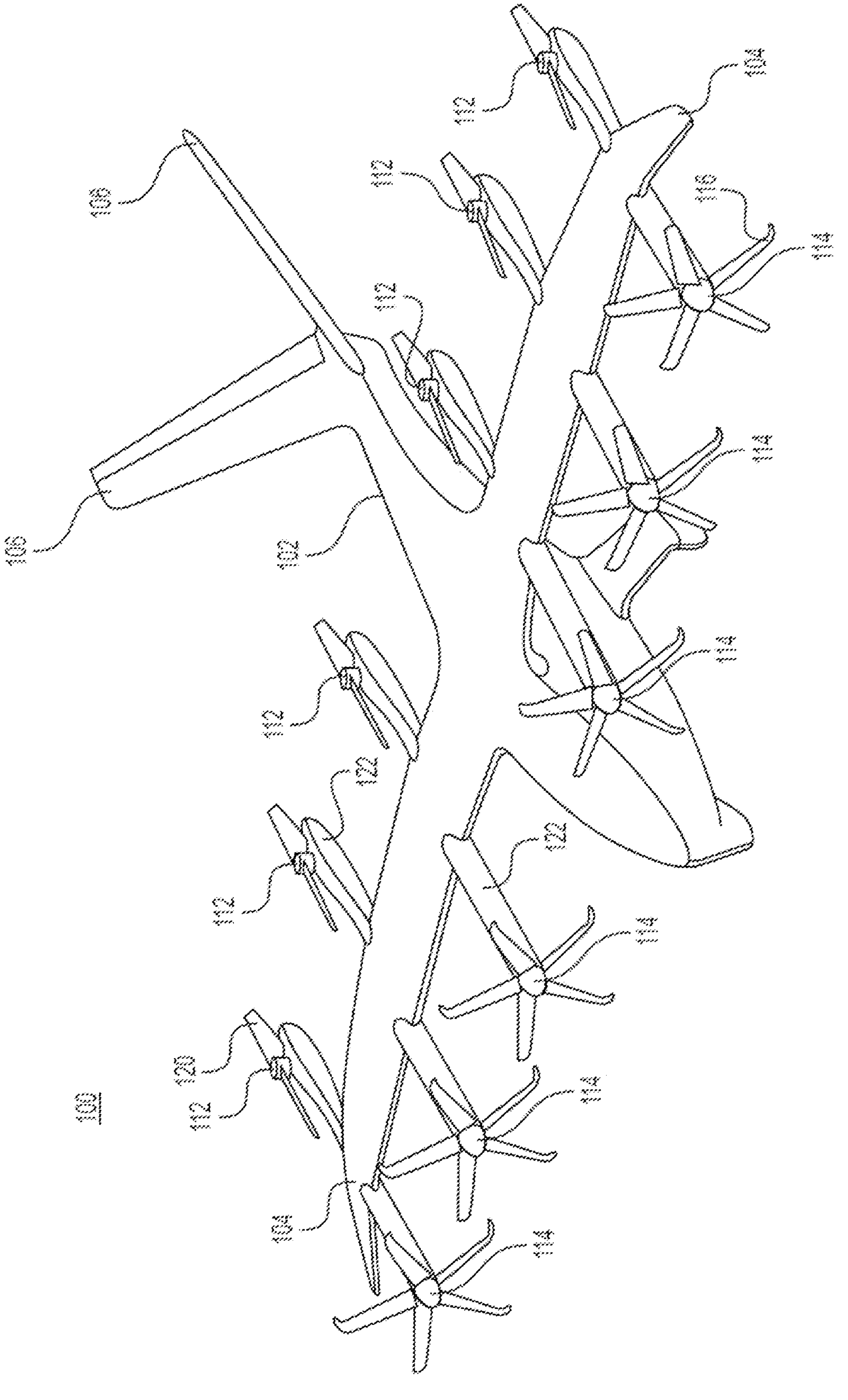
FIG. 1 shows an exemplary VTOL aircraft, consistent with disclosed embodiments.

The present disclosure addresses systems, components, and techniques primarily for use in a non-conventional aircraft driven by an electric propulsion system. For example, the tilt-rotor aircraft of the present disclosure may be configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it may be desired that components of the aircraft are configured and designed to withstand frequent use without wearing, generate less heat and vibration, and that the aircraft include mechanisms to effectively control and manage heat or vibration generated by the components. Further, it may be intended that several of these aircraft operate near each other over a crowded metropolitan area. Accordingly, it may be desired that their components are configured and designed to generate low levels of noise interior and exterior to the aircraft, and to have a variety of safety and backup mechanisms. For example, it may be desired for safety reasons that the aircraft be propelled by a distributed propulsion system, avoiding the risk of a single point of failure, and that they are capable of conventional takeoff and landing on a runway. Moreover, it may be desired that the aircraft can safely vertically takeoff and land from and into relatively small or restricted spaces compared to traditional airport runways (e.g., vertiports, parking lots, or driveways) while transporting several passengers or commuters with accompanying baggage. These use requirements may place design constraints on aircraft size, weight, operating efficiency (e.g., drag, energy use), which may impact the design and configuration of the aircraft components.

Disclosed embodiments provide new and improved configurations of aircraft components that are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft driven by an electric propulsion system.

In some embodiments, the aircraft driven by an electric propulsion system of the present disclosure may be designed to be capable of both vertical and conventional takeoff and landing, with a distributed electric propulsion system enabling vertical flight, horizontal and lateral flight, and transition. Thrust may be generated by supplying high voltage electrical power to a plurality of electric engines of the distributed electric propulsion system, which may include the necessary components to convert the high voltage electrical power into mechanical shaft power to rotate a propeller. Embodiments disclosed herein may involve optimizing the energy density of the electric propulsion system. Embodiments may include an electric engine connected to an onboard electrical power source, which may include a device capable of storing energy such as a battery or capacitor, and may include one or more systems for harnessing or generating electricity such as a fuel powered generator or solar panel array. Some disclosed embodiments provide for weight reduction and space reduction of components in the aircraft to increase aircraft efficiency and performance. Disclosed embodiments also improve upon safety in passenger transportation using new and improved safety protocols and system redundancy in the case of a failure, to minimize any single points of failure in the aircraft propulsion system.

In some embodiments, an aircraft may include one or more wings and/or wing-like structures (hereafter referred to as wing-like structures or wings interchangeably). As described herein, wing-like structures may include traditional wings, canards, stabilizers, winglets, or any other airfoil that may be designed to provide at least some lift. It should be understood that any descriptions using the term wing may be equivalent to using any kind of other wing-like structure.

In some embodiments, the distributed electric propulsion system may include twelve electric engines, which may be mounted on booms forward and aft of the main wings of the aircraft. A subset of the electric engines, such as those mounted forward of the main wings, may be tiltable mid-flight between a horizontally oriented position (e.g., to generate forward thrust for cruising) and a vertically oriented position (e.g., to generate vertical lift for takeoff, landing, and hovering). The propellers of the forward electric engines may rotate in a clockwise or counterclockwise direction. Propellers may counter-rotate with respect to adjacent propellers. The aft electric engines may be fixed in a vertically oriented position (e.g., to generate vertical lift). The propellers may also rotate in a clockwise or counterclockwise direction. In some embodiments, the difference in rotation direction may be achieved using the direction of engine rotation. In other embodiments, the engines may all rotate in the same direction, and gearing may be used to achieve different propeller rotation directions. Vertical lift is to be defined as lift in the vertical direction consisting the range of 90 degrees±15%. Horizontal thrust is to be defined as thrust in the horizontal direction consisting the range of 0 degrees±15%.

In some embodiments, an aircraft may possess quantities of electric engines in various combinations of forward and aft engine configurations. For example, an aircraft may possess six forward and six aft electric engines, five forward and five aft electric engines, four forward and four aft electric engines, three forward and three aft electric engines, two forward and two aft electric engines, or any other combination of forward and aft engines, including embodiments where the number of forward electric engines and aft electric engines are not equivalent.

In some embodiments, for a vertical takeoff and landing (VTOL) mission, the forward and aft electric engines may provide vertical thrust during takeoff and landing. During flight phases where the aircraft is moving forward, the forward electric engines may provide horizontal thrust, while the propellers of the aft electric engines may be stowed at a fixed position in order to minimize drag. The aft electric engines may be actively stowed with position monitoring. Transition from vertical flight to horizontal flight and vice-versa may be accomplished via the tilt propeller subsystem. The tilt propeller subsystem may redirect thrust between a primarily vertical direction during vertical flight mode to a horizontal or near-horizontal direction during a forward-flight cruising phase. A variable pitch mechanism may change the forward electric engine's propeller-hub assembly blade collective angles for operation during the hover-phase, transition phase, and cruise-phase.

In some embodiments, in a conventional takeoff and landing (CTOL) mission, the forward electric engines may provide horizontal thrust for wing-borne take-off, cruise, and landing, and the wings may provide vertical lift. In some embodiments, the aft electric engines may not be used for generating thrust during a CTOL mission and the aft propellers may be stowed in place. In other embodiments, the aft electrical engines may be used at reduced power to shorten the length of the CTOL takeoff or landing.

The disclosed embodiments provide systems, subsystems, and components for new VTOL aircraft having various combinations of an electric propulsion system and cooling systems that maximize performance while minimizing weight.

In some embodiments, an electric propulsion system as described herein may generate thrust by supplying High Voltage (HV) electric power to an electric engine, which in turn converts HV power into mechanical shaft power which is used to rotate a propeller. An aircraft as described herein may include multiple electric engines mounted forward and aft of the wing. The engines may be mounted directly to the wing, or mounted to one or more booms attached to the wing. The amount of thrust each electric engine generates may be governed by a torque command from a Flight Control System (FCS) over a digital communication interface to each electric engine. Embodiments may include forward electric engines that are capable of altering their orientation, or tilt. Some embodiments include forward engines that may be a clockwise (CW) type or counterclockwise (CCW) type. The forward electric propulsion subsystem may consist of a multi-blade adjustable pitch propeller, as well as a variable pitch subsystem.

In some embodiments, an aircraft may include aft electric engines, or lifters, that can be of a clockwise (CW) type or counterclockwise (CCW) type. Some embodiments may include aft electric engines that utilize a multi-blade fixed pitch propeller.

As described herein, the orientation and use of the electric propulsion system components may change throughout the operation of the aircraft. In some embodiments, during vertical takeoff and landing, the forward propulsion systems as well as aft propulsion systems may provide vertical thrust during takeoff and landing. During the flight phases where the aircraft is in forward flight-mode, the forward propulsion systems may provide horizontal thrust, while the aft propulsion system propellers may be stowed at a fixed position to minimize drag. The aft electric propulsion systems may be actively stowed with position monitoring. Some embodiments may include a transition from vertical flight to horizontal flight and vice-versa. In some embodiments, the transitions may be accomplished via the Tilt Propeller System (TPS). The TPS reorients the electric propulsion system between a primarily vertical direction during vertical flight mode to a mostly horizontal direction during forward-flight mode. Some embodiments may include a variable pitch mechanism that may change the forward propulsion system propeller blade collective angles for operation during the hover-phase, cruise-phase, and transition phase. Some embodiments may include a Conventional Takeoff and Landing (CTOL) configurations such that the tilters provide horizontal thrust for wing-borne take-off, cruise, and landing phases. In some embodiments, the aft electric engines are not used for generating thrust during a CTOL mission and the aft propellers are stowed in place to minimize drag.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
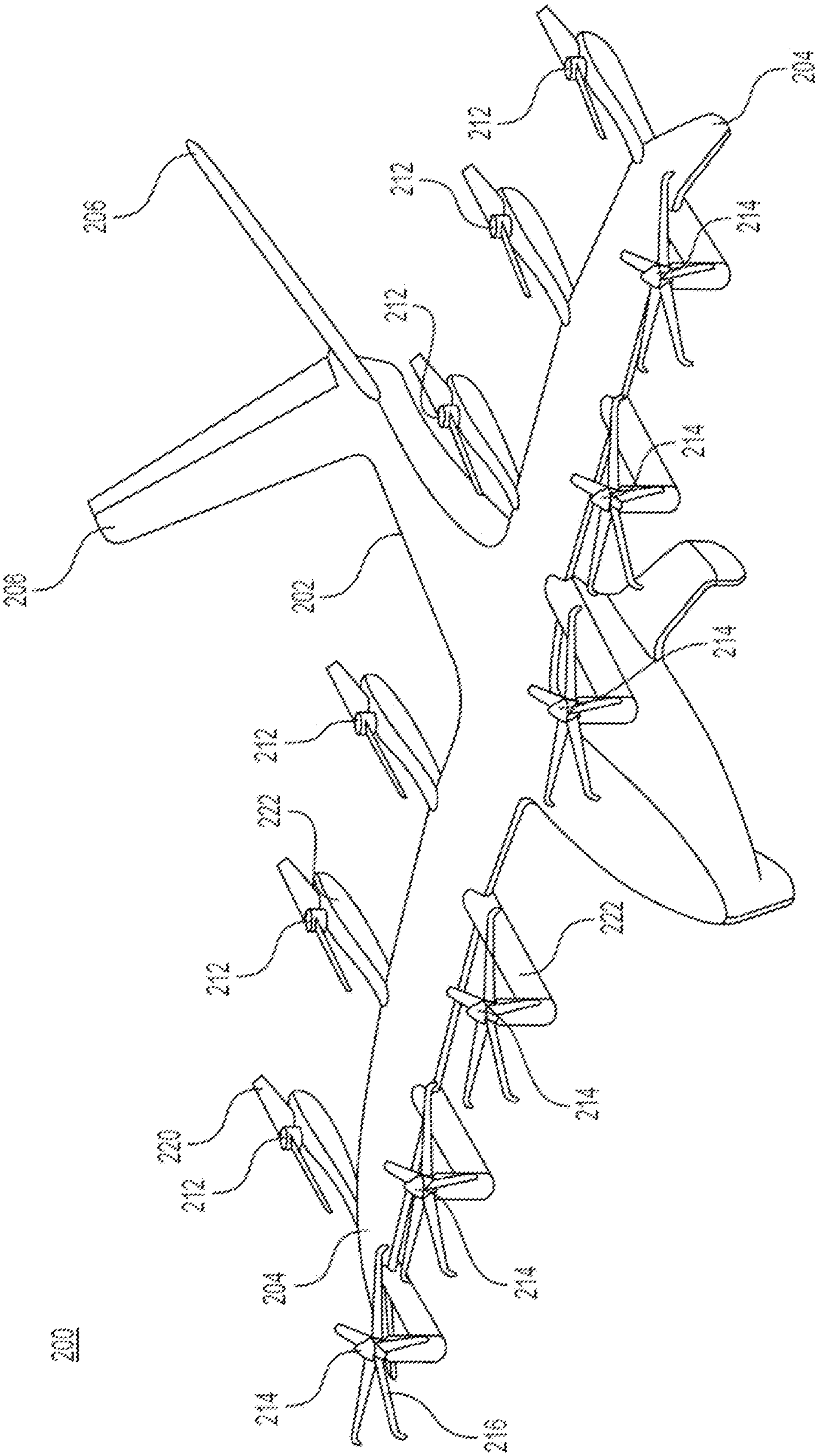
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. Accordingly, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked for cruising in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 and at least a portion of tilt propellers 114, 214 may be located forward of wings 104, 204. In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps and/or ailerons. According to some embodiments, wings 104, 204 may have designed with a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design. In some embodiments, the wings have a tapering leading edge.

In some embodiments, lift propellers 112, 212 or tilt propellers 114, 214 may canted relative to at least one other lift propeller 112, 212 or tilt propeller 114, 214. As used herein, canting refers to a relative orientation of the rotational axis of the lift propeller/tilt propeller about a line that is parallel to the forward-rearward direction, analogous to the roll degree of freedom of the aircraft. Canting of the lift propellers and/or tilt propellers may help minimize damage from propeller burst by orienting a rotational plane of the lift propeller/tilt propeller discs (the blades plus the hub onto which the blades are mounted) so as to not intersect critical portions of the aircraft (such areas of the fuselage in which people may be positioned, critical flight control systems, batteries, adjacent propellers, etc.) or other propeller discs and may provide enhanced yaw control during flight.

Figure 3:
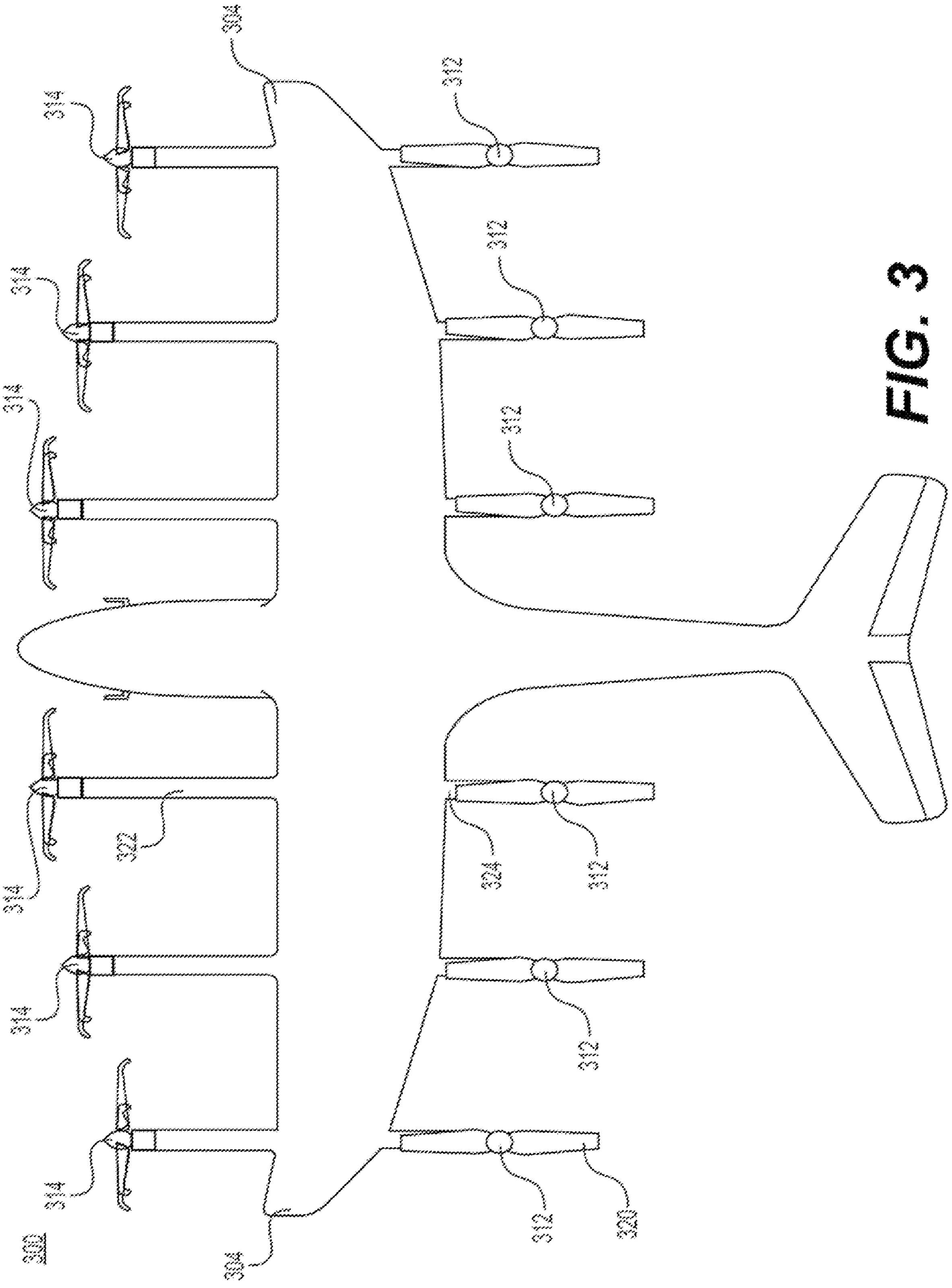
FIG. 3 shows an exemplary top plan view of a VTOL aircraft, consistent with disclosed embodiments.

FIG. 3 is an illustration of a top plan view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, a length of the rear end of the boom 324 from the wing 304 to the lift propeller 312 may comprise a similar rear end of the boom 324 length across the numerous rear ends of the booms. In some embodiments, the length of the rear ends of the booms may vary across the, exemplary, six rear ends of the booms. For example, each rear end of the boom 324 may comprise a different length from the wing 304 to the lift propeller 312, or a subset of rear ends of booms may be similar in length. In some embodiments, a front end of boom 322 may comprise various lengths from the wing 304 to the tilt propeller 314 across the front ends of booms. For example, as shown in FIG. 3, a length of the front end of boom 322 from the tilt propellers 314 nearest the fuselage to the wing 304 may comprise a greater length than the length of the front end of the boom 322 from the wing 304 to the tilt propellers 314 furthest from the fuselage. Some embodiments may include front ends of the booms with similar lengths across the, exemplary, six front ends of booms or any other distribution of lengths of the front ends of booms from the wing 304 to tilt propellers 314. Some embodiments may include an aircraft 300 possessing eight electric propulsion systems with four forward electric propulsion systems 314 and four aft electric propulsion systems 312, or any other distribution of forward and aft electric propulsion systems, including embodiments where the number of forward electric propulsion systems 314 is less than or greater than the number of aft electric propulsion systems 312. Further, FIG. 3 depicts an exemplary embodiment of a VTOL aircraft 300 with forward propellers 314 in a horizontal orientation for horizontal flight and aft propeller blades 320 in a stowed position for a forward phase of flight.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems.

Figure 4:
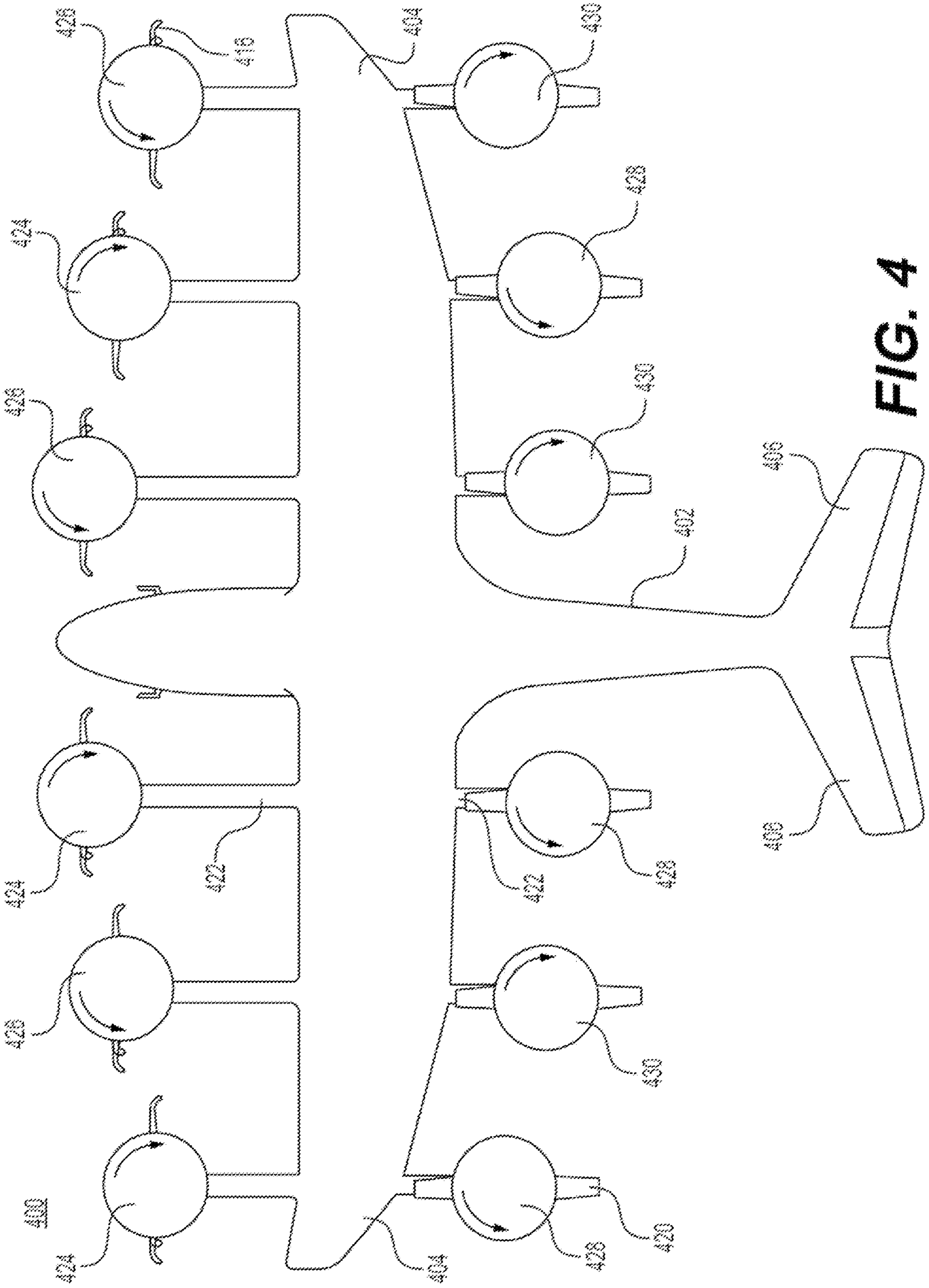
FIG. 4 illustrates exemplary propeller rotation of a VTOL aircraft, consistent with disclosed embodiments.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
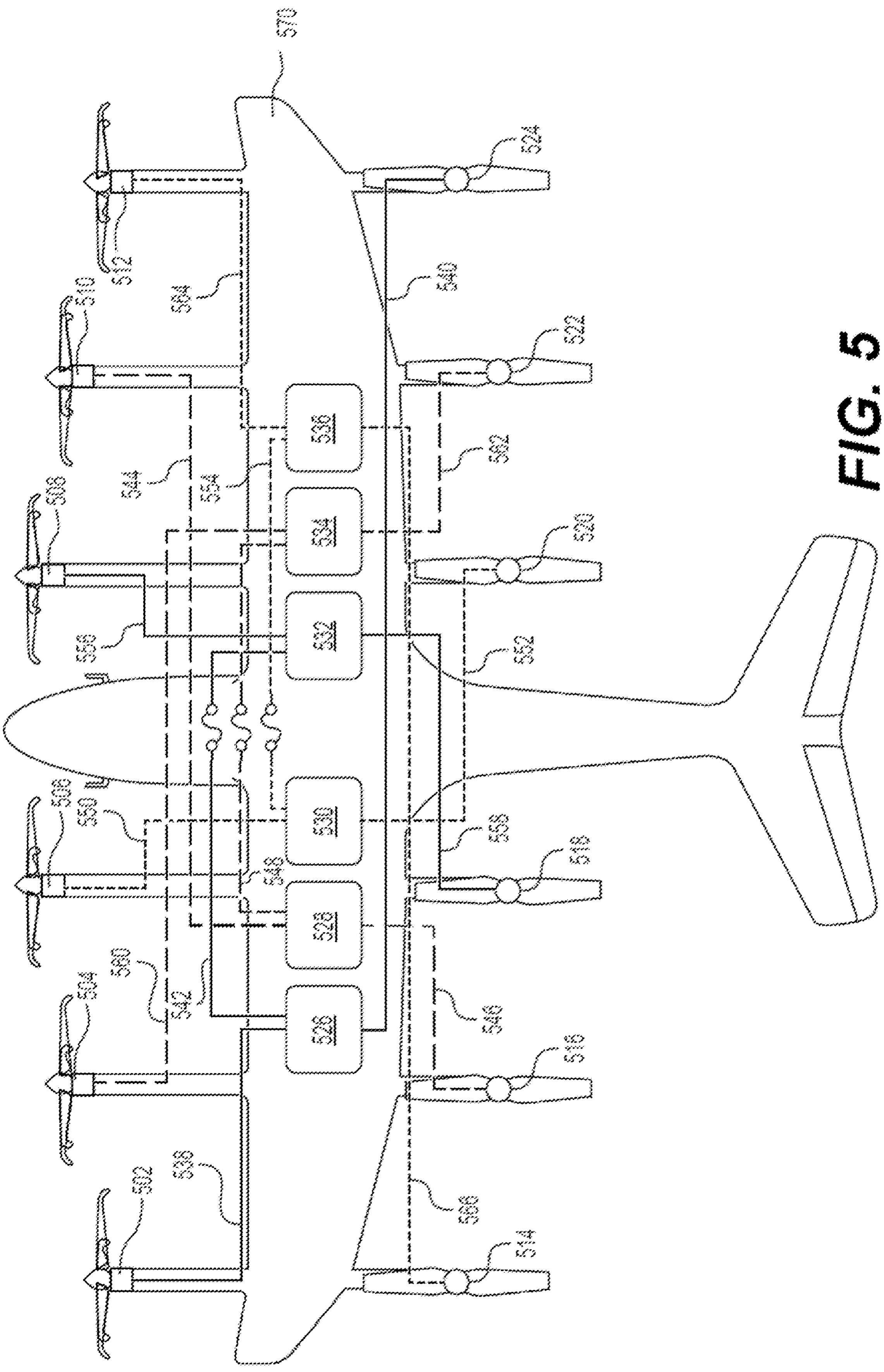
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have various power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems, including batteries 526, 528, 530, 532, 534, and 536 stored within the wing 570 of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, a battery may be connected to diagonally opposing electric engines. In such a configuration, first power system 526 may provide power to electric engines 502 via power connection channel 538 and electric engine 524 via power connection channel 540. In some embodiments, first power system 526 may also be paired with a fourth power system 532 via a power connection channel 542 possessing a fuse to prevent excessive current from flowing through the power systems 526 and 532. Further to this embodiment, VTOL aircraft 500 may include a second power system 528 paired with a fifth power system 534 via power connection channel 548 possessing a fuse and may provide power to electric engines 510 and 516 via power connection channels 544 and 546, respectively. In some embodiments, a third power system 530 may be paired with a sixth power system 536 via power connection channel 554 possessing a fuse and may provide power to electric engines 506 and 520 via power connection channels 550 and 552, respectively. The fourth power system 532 may also provide power to electric engines 508 and 518 via power connection channels 556 and 558, respectively. The fifth power system 534 may also provide power to electric engines 504 and 522 via power connection channels 560 and 562, respectively. The sixth power system 536 may also provide power to electric engines 512 and 514 via power connection channels 564 and 566, respectively.

As disclosed herein, an electric propulsion system may include an electric engine connected to a High Voltage Power System, such as a battery, located within the aircraft, via high voltage channels or power connection channels. Some embodiments may include various batteries being stored within an aircraft wing with high voltage channels traveling throughout the aircraft, including the wing and boom, to an electric propulsion system. In some embodiments, multiple high voltage power systems may be used to create an electric propulsion system with multiple high voltage power supplies to avoid the risk of a single point of failure. In some embodiments, an aircraft may include multiple electric propulsion systems that may be wired in a pattern to various batteries or power sources stored throughout the aircraft. It is recognized that such a configuration may be beneficial as to avoid the risk of a single point of failure where one battery or power source failure could lead to a portion of the aircraft not being able to maintain a required amount of thrust to continue flight or perform a controlled landing. For example, if a VTOL possessed two forward electric propulsion systems and two aft propulsion systems, the forward and the aft electric propulsion systems on opposite sides of the VTOL aircraft may be connected to the same high voltage power system. In such a configuration, if one high voltage power system were to fail, a forward and an aft electric propulsion system on opposite sides of the VTOL aircraft would remain in working order and may provide a more balanced flight or landing compared to a forward and aft electric propulsion system failing on the same side of a VTOL aircraft. Some embodiments may include four forward electric propulsion systems and four aft electric propulsion systems where diagonally opposing electric engines are connected to a common battery or power source. Some embodiments may include various configurations of electric engines electrically connected to high voltage power systems such that a risk of a single point of failure is avoided in the case of a power source failure and the phase of flight during which a failure occurs may continue or the aircraft may perform an alternative phase of flight in response to the failure.

As discussed above, an electric propulsion system may include an electric engine that provides mechanical shaft power to a propeller assembly to produce thrust. In some embodiments, the electric engine of an electric propulsion system may include a High Voltage Power System supplying high voltage power to the electric engines and/or a Low Voltage System supplying low voltage direct current power to an electric engine. Some embodiments may include the electric engine(s) digitally communicating with a Flight Control System ("FCS") comprising one or more Flight Control Computers ("FCC") that may send and receive signals to and from the electric engine including commands and responsive data or status. Some embodiments may include an electric engine capable of receiving operating parameters from and communicating operating parameters to the FCC, including speed, voltage, current, torque, temperature, vibration, propeller position, and any other value of operating parameters.

In some embodiments, a flight control system may include a system capable of communicating with an electric engine to send and receive analog/discrete signals to the electric engine and controlling an apparatus capable of redirecting thrust of the tilt propellers between a primarily vertical direction during vertical flight mode to a mostly horizontal direction during forward-flight mode. In some embodiments, this system may be referred to as a Tilt Propeller System ("TPS") and may be capable of communicating and orienting additional features of the electric propulsion system.

Figure 6:
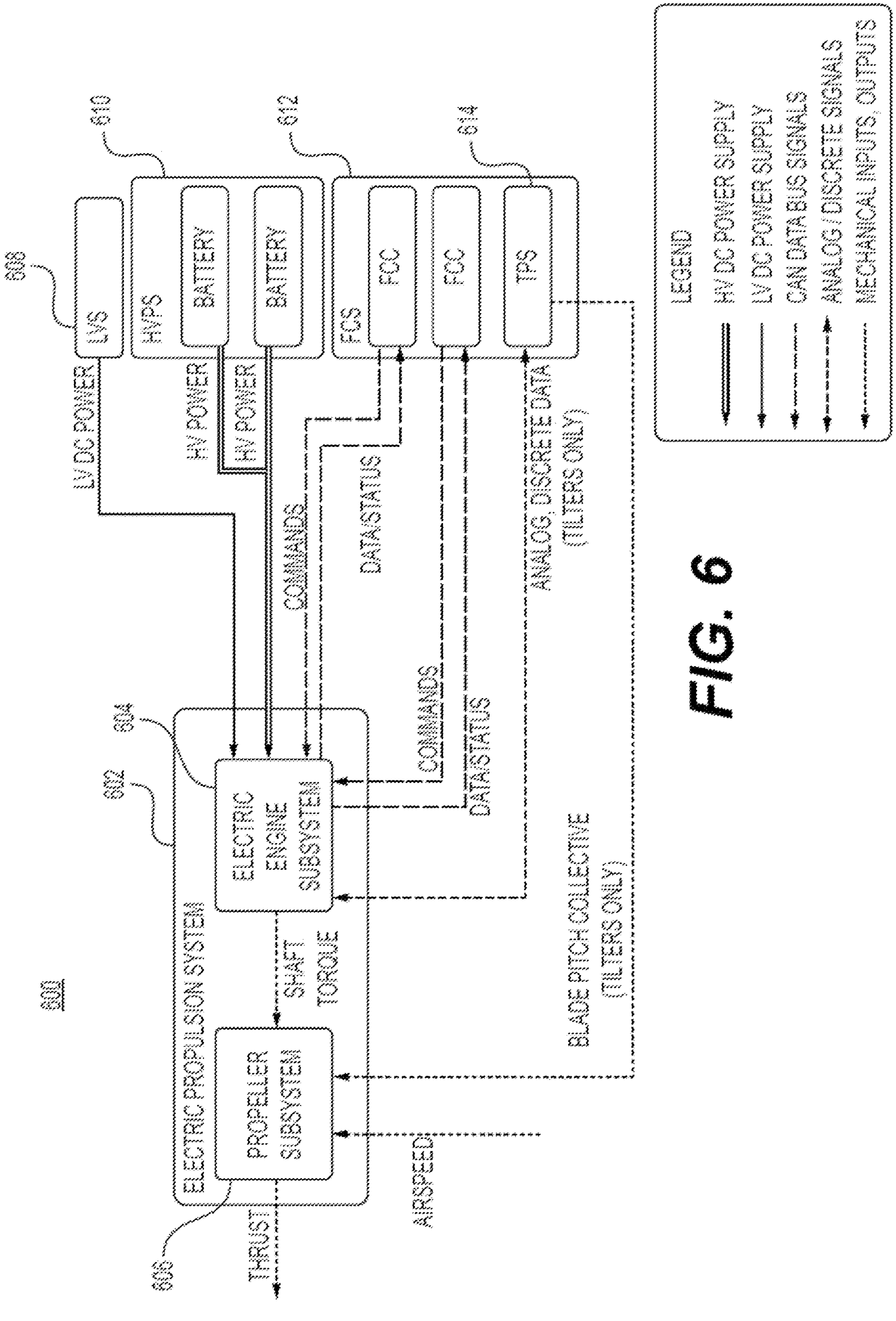
FIG. 6 shows an exemplary architecture of an electric propulsion unit, consistent with disclosed embodiments.

FIG. 6 illustrates block diagram of an exemplary architecture and design of an electric propulsion unit (EPU) 600 consistent with disclosed embodiments. In some embodiments, an electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage DC (LV DC) power from a Low Voltage System (LVS) 608. Some embodiments may include the electric engine subsystem 604 receiving high voltage (HV) power from a High Voltage Power System (HVPS) 610 comprising at least one battery or other device capable of storing energy. In some embodiments, a High Voltage Power System may include more than one battery, or other device capable of storing energy, supplying high voltage power to the electric engine subsystem 604. It is recognized that such a configuration may be advantageous as to not risk a single point of failure where a single battery failure leads to an electric propulsion system 602 failure.

Some embodiments may include an electric propulsion system 602 including an electric engine subsystem 604 receiving signals from and sending signals to a flight control system 612. In some embodiments, a flight control system 612 may comprise a flight control computer capable of using Controller Area Network ("CAN") data bus signals to send commands to the electric engine subsystem 604 and receive status and data from the electric engine subsystem 604. It should be understood that while CAN data bus signals are used between the flight control computer and the electric engine(s), some embodiments may include any form of communication with the ability to send and receive data from a flight control computer to an electric engine. In some embodiments, a flight control system 612 may also include a Tilt Propeller System ("TPS") 614 capable of sending and receiving analog, discrete data to and from the electric engine subsystem 604 of the tilt propellers. A tilt propeller system 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606.

As discussed throughout, an exemplary VTOL aircraft may possess various types of electric propulsion systems including tilt propellers and lift propellers, including forward electric engines with the ability to tilt during various phases of flight, and aft electric engines that remain in one orientation and may only be active during certain phases of flight (i.e., take off, landing, and hover).

Figure 7:
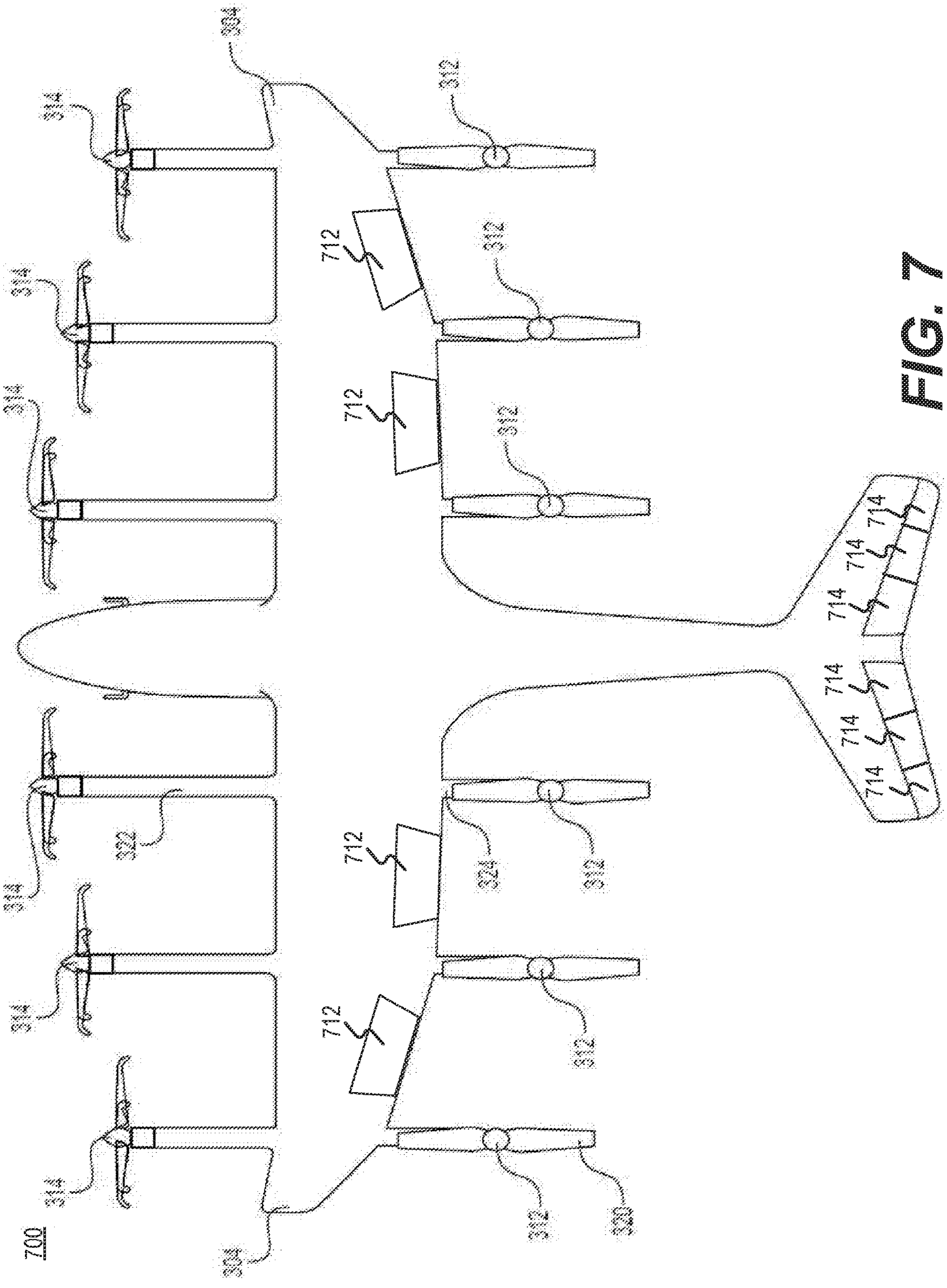
FIG. 7 shows an exemplary top plan view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plan view of an exemplary VTOL aircraft, consistent with embodiments of the present disclosure. Aircraft 700 shown in the figure may be a top plan view of the aircraft 100, 200 shown in FIGS. 1 and 2, respectively. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions or one or more rudders and/or one or more elevators. In aircraft 700, the actuators may include, in addition to the electric propulsion systems discussed earlier, control surface actuators (CSAs) associated with flaperons 712 and ruddervators 714, as discussed further below with reference to FIGS. 8A-13D.

Figure 8A:
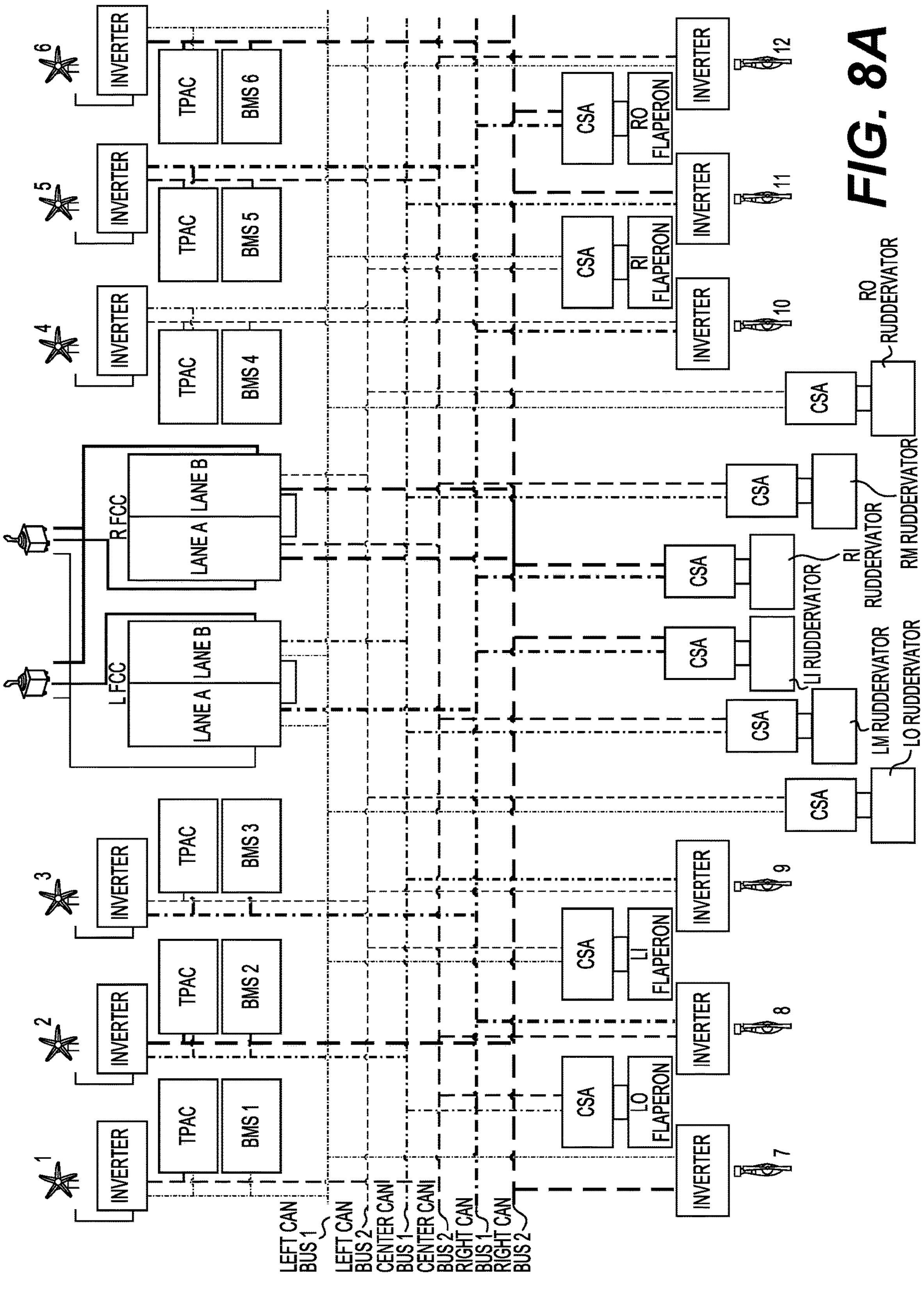
FIGS. 8A-D shows an exemplary flight control signaling architecture, consistent with disclosed embodiments.

FIGS. 8A-D illustrate a flight control signaling architecture for controlling the control surfaces and associated actuators, according to various embodiments. Although FIGS. 7-13D illustrate twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8A, control surfaces and actuators may be controlled by a combination of four flight control computers (FCCs)—Left FCC, Lane A (L FCC-A), Left FCC, Lane B (L FCC-B), Right FCC, Lane A (R FCC-A), and Right FCC, Lane A (R FCC-B), although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing process required to control the control surfaces and actuators may be performed on a single computing thread by a single flight control computer.

The FCCs may provide control signals to the control surface actuators, including the EPU inverters, TPACs, BMSs, flaperon CSAs, and ruddervator CSAs, via one or more bus systems. For different control surface actuators, the FCC may provide control signals can be voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8A). In some embodiments, multiple FCCs may be able to provide control signals via each CAN bus system, and each FCC may be able to provide control signals via multiple CAN bus systems. In the exemplary architecture illustrated in FIG. 8A, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

Moreover, the flight control signaling architecture may be configured so that, in the event of failure of any flight control signaling component (e.g., an FCC or a bus), the aircraft may be able to continue stable flight (even if with reduced lift or thrust) because any loss of control, lift, or thrust is substantially symmetric (e.g., <±5%, <±10%, <±15%, <±20%, or <±25% asymmetry) with respect to roll, pitch, and/or yaw of the aircraft. For example, with reference to FIG. 8B, Left CAN bus 1 may provide control signals to Inverters 1 and 12, and 6 and 7, so that a failure of this bus may result in substantially symmetric loss of lift or thrust on opposite sides of the aircraft. For example, a failure of Left CAN bus 1 will likely result in EPU 1 and EPU 12 both going offline simultaneously, resulting in substantially symmetric loss of lift with respect to roll and/or pitch of the aircraft. Similarly, failure of Left CAN bus 1 will likely result in EPU 6 and EPU 7 both going offline simultaneously, resulting in substantially symmetric loss of lift with respect to roll and/or pitch of the aircraft. Further, failure of Left CAN bus 1 will likely result in LI flaperon and RI flaperon both going offline simultaneously, resulting in substantially symmetric loss of control with respect to roll and/or pitch of the aircraft. Similarly, failure of Left CAN bus 1 will likely result in LO ruddervator and RO ruddervator both going offline simultaneously, resulting in substantially symmetric loss of control with respect to yaw and/or pitch of the aircraft. For example, a failure of Left CAN bus 1 will likely result in loss of control of TPAC 1 and TPAC 6, resulting in symmetric loss of control with respect to roll and/or pitch of the aircraft.

Figure 8B:
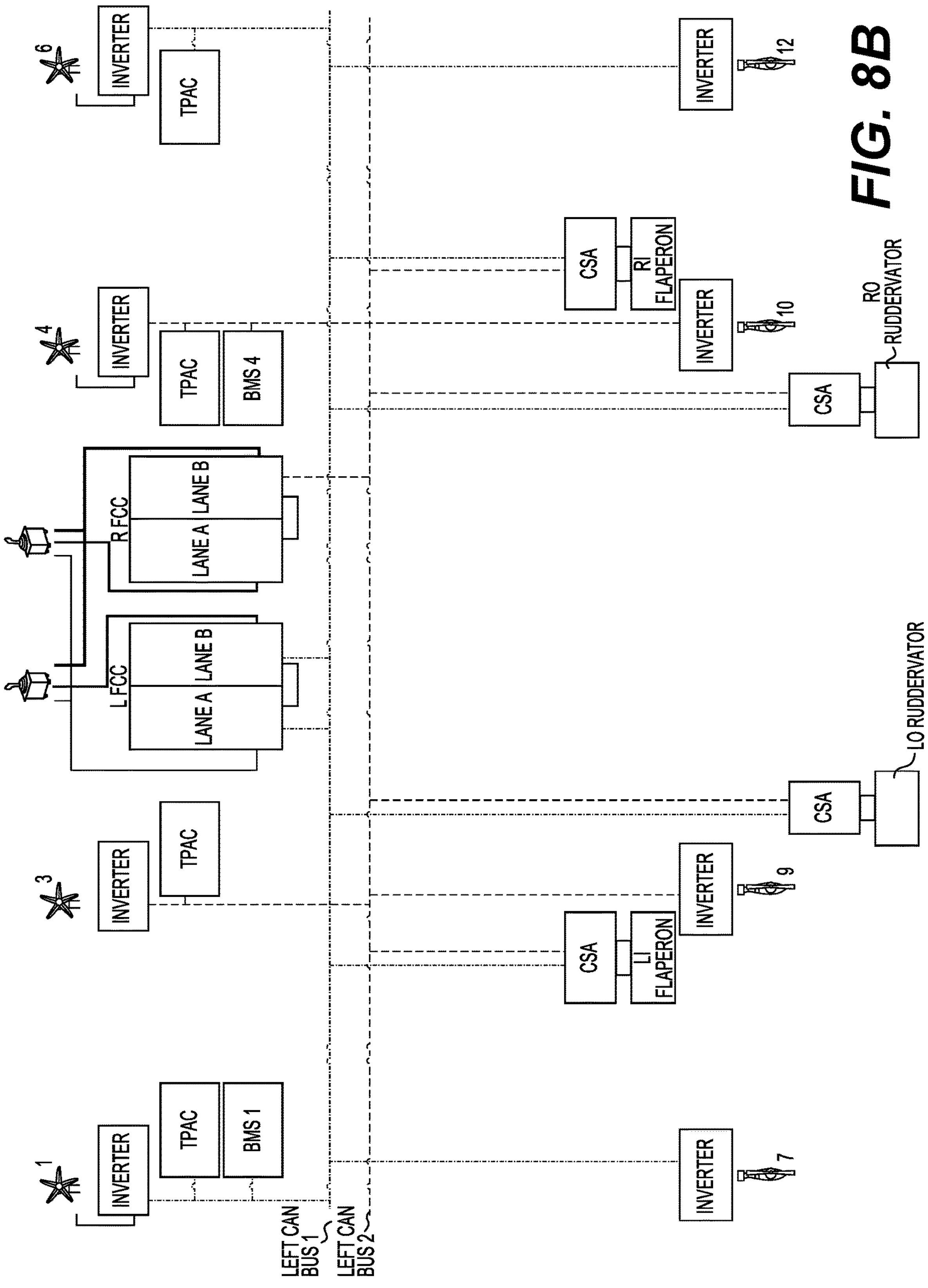

Similarly, with reference to FIG. 8B, Left CAN bus 2 may provide control signals to Inverters 3 and 10, and 4 and 9, so that a failure of this bus may result in substantially symmetric loss of lift or thrust on opposite sides of the aircraft. For example, a failure of Left CAN bus 2 will likely result in EPU 3 and EPU 10 both going offline simultaneously, resulting in substantially symmetric loss of lift with respect to roll and/or pitch of the aircraft. Similarly, failure of Left CAN bus 2 will likely result in EPU 4 and EPU 9 both going offline simultaneously, resulting in substantially symmetric loss of lift with respect to roll and/or pitch of the aircraft. Further, failure of Left CAN bus 2 will likely result in LI flaperon and RI flaperon both going offline simultaneously, resulting in substantially symmetric loss of control with respect to roll and/or pitch of the aircraft. Similarly, failure of Left CAN bus 2 will likely result in LO ruddervator and RO ruddervator both going offline simultaneously, resulting in substantially symmetric loss of control with respect to roll and/or pitch of the aircraft. For example, a failure of Left CAN bus 2 will likely result in loss of control of TPAC 3 and TPAC 4, resulting in substantially symmetric loss of control with respect to yaw and/or pitch of the aircraft.

Figure 8C:
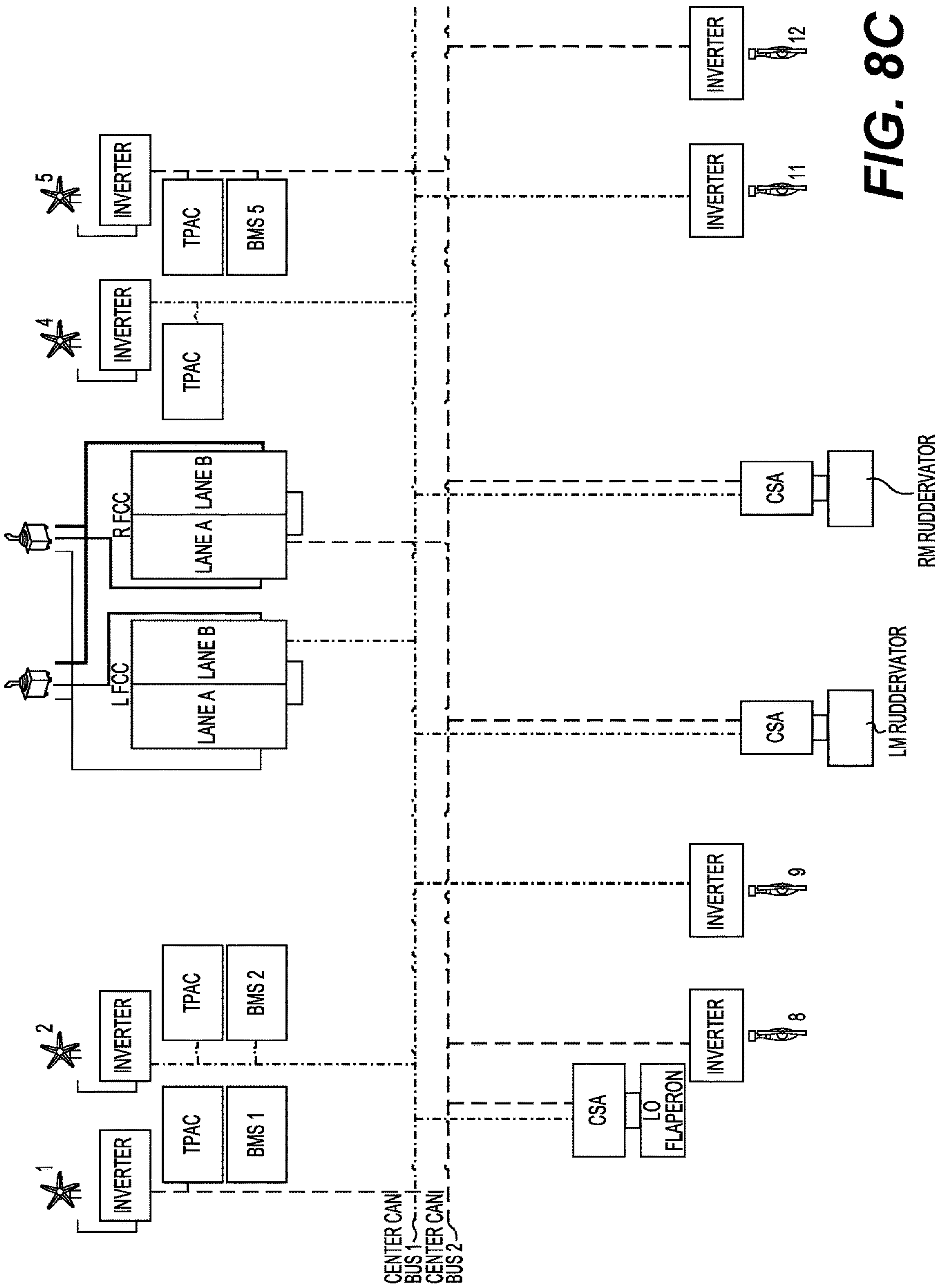

Similarly, with reference to FIG. 8C, Center CAN bus 1 may provide control signals to Inverters 2 and 11, and 4 and 9, so that a failure of this bus may result in substantially symmetric loss of lift or thrust on opposite sides of the aircraft. For example, a failure of Center CAN bus 1 will likely result in EPU 2 and EPU 11 both going offline simultaneously, resulting in substantially symmetric loss of lift with respect to roll and/or pitch of the aircraft. Similarly, failure of Center CAN bus 1 will likely result in EPU 4 and EPU 9 both going offline simultaneously, resulting in substantially symmetric loss of lift with respect to roll and/or pitch of the aircraft. Failure of Center CAN bus 1 will likely result in LO flaperon going offline, resulting in substantially asymmetric loss of control with respect to roll and/or pitch of the aircraft. Failure of Center CAN bus 1 will likely result in LM ruddervator and RM ruddervator both going offline simultaneously, resulting in substantially symmetric loss of control with respect to yaw and/or pitch of the aircraft. For example, a failure of Center CAN bus 1 will likely result in loss of control of TPAC 2 and TPAC 4, resulting in substantially asymmetric loss of control with respect to roll and/or pitch of the aircraft.

Similarly, with reference to FIG. 8C, Center CAN bus 2 may provide control signals to Inverters 1 and 12, and 5 and 8, so that a failure of this bus may result in substantially symmetric loss of lift or thrust on opposite sides of the aircraft. For example, a failure of Center CAN bus 2 will likely result in EPU 1 and EPU 12 both going offline simultaneously, resulting in substantially symmetric loss of lift with respect to roll and/or pitch of the aircraft. Similarly, failure of Center CAN bus 2 will likely result in EPU 5 and EPU 8 both going offline simultaneously, resulting in substantially symmetric loss of lift with respect to roll and/or pitch of the aircraft. Failure of Center CAN bus 2 will likely result in LO flaperon going offline, resulting in substantially asymmetric loss of control with respect to roll and/or pitch of the aircraft. Failure of Center CAN bus 2 will likely result in LM ruddervator and RM ruddervator both going offline simultaneously, resulting in substantially symmetric loss of control with respect to yaw and/or pitch of the aircraft. For example, a failure of Center CAN bus 2 will likely result in loss of control of TPAC 1 and TPAC 5, resulting in substantially asymmetric loss of control with respect to roll and/or pitch of the aircraft.

Figure 8D:
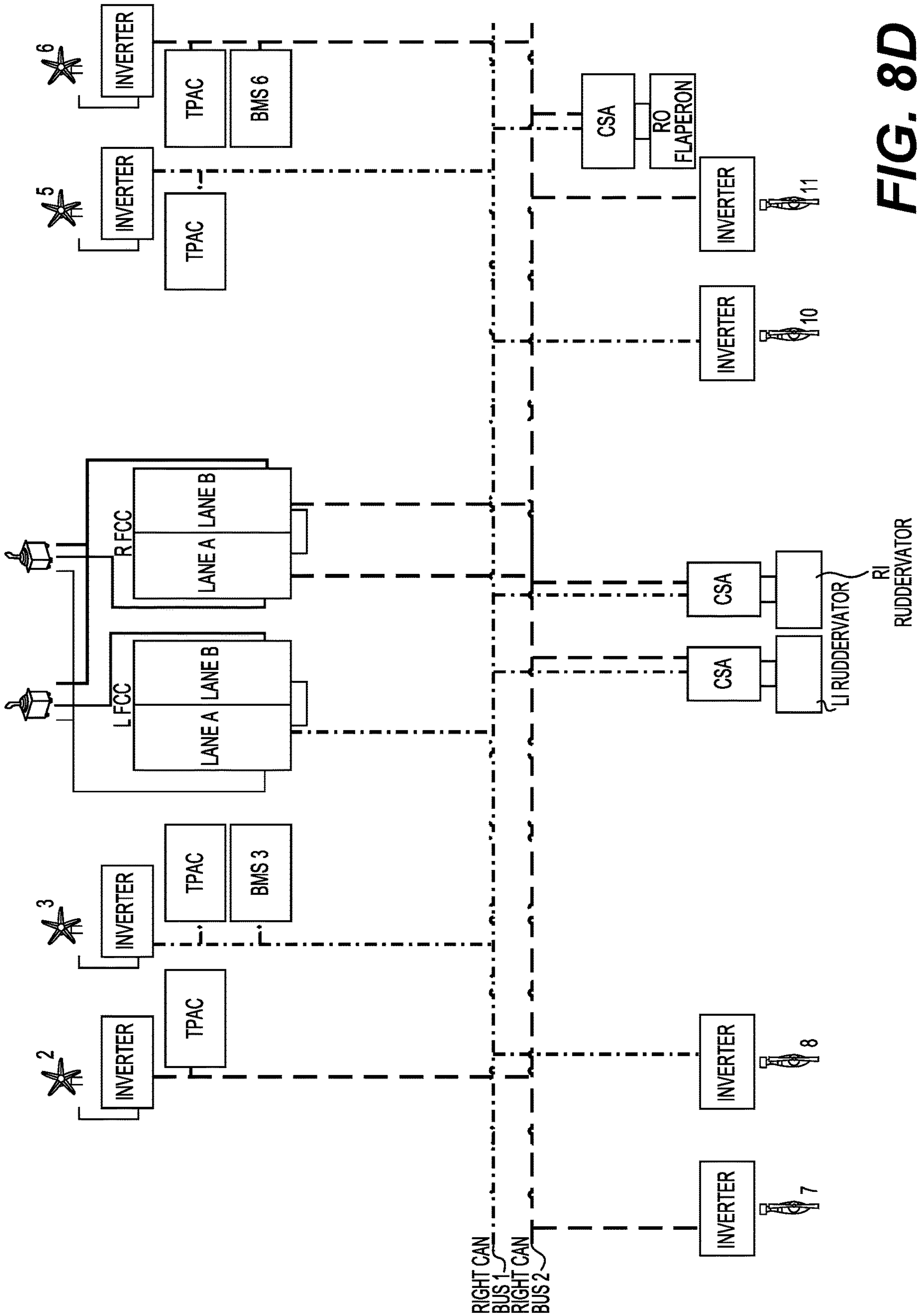

Similarly, with reference to FIG. 8D, Right CAN bus 1 may provide control signals to Inverters 3 and 10, and 5 and 8, so that a failure of this bus may result in substantially symmetric loss of lift or thrust on opposite sides of the aircraft. For example, a failure of Right CAN bus 1 will likely result in EPU 3 and EPU 10 both going offline simultaneously, resulting in substantially symmetric loss of lift with respect to roll and/or pitch of the aircraft. Similarly, failure of Right CAN bus 1 will likely result in EPU 5 and EPU 8 both going offline simultaneously, resulting in substantially symmetric loss of lift with respect to roll and/or pitch of the aircraft. Failure of Right CAN bus 1 will likely result in RO flaperon going offline, resulting in substantially asymmetric loss of control with respect to roll and/or pitch of the aircraft. Failure of Right CAN bus 1 will likely result in LI ruddervator and RI ruddervator both going offline simultaneously, resulting in substantially symmetric loss of control with respect to yaw and/or pitch of the aircraft. For example, a failure of Right CAN bus 1 will likely result in loss of control of TPAC 3 and TPAC 5, resulting in substantially asymmetric loss of control with respect to roll and/or pitch of the aircraft.

Similarly, with reference to FIG. 8D, Right CAN bus 2 may provide control signals to Inverters 2 and 11, and 6 and 7, so that a failure of this bus may result in substantially symmetric loss of lift or thrust on opposite sides of the aircraft. For example, a failure of Right CAN bus 2 will likely result in EPU 2 and EPU 11 both going offline simultaneously, resulting in substantially symmetric loss of lift with respect to roll and/or pitch of the aircraft. Similarly, failure of Right CAN bus 2 will likely result in EPU 6 and EPU 7 both going offline simultaneously, resulting in substantially symmetric loss of lift with respect to roll and/or pitch of the aircraft. Failure of Right CAN bus 2 will likely result in RO flaperon going offline, resulting in substantially asymmetric loss of control with respect to roll and/or pitch of the aircraft. Failure of Right CAN bus 2 will likely result in LI ruddervator and RI ruddervator both going offline simultaneously, resulting in substantially symmetric loss of control with respect to yaw and/or pitch of the aircraft. For example, a failure of Right CAN bus 2 will likely result in loss of control of TPAC 2 and TPAC 6, resulting in substantially asymmetric loss of control with respect to roll and/or pitch of the aircraft.

In some embodiments, FCCs may be configured to alter its control allocation to minimize, offset, or eliminate the loss of lift and/or control with respect to failure of Left CAN bus 1. For example, with reference to FIG. 8B, if failure of Left CAN bus 1 results in loss of control of BMS 1, FCC may alter its commands through Left CAN bus 2 to BMS 4 to minimize offset or eliminate the loss of lift with respect to loss of control of BMS 1. As another example, if failure of Left CAN bus 1 results in loss of control of TPAC 1 and TPAC 6, FCC may alter its commands through Left CAN bus 2 to TPAC 3 and TPAC 4 to minimize offset or eliminate the loss of lift with respect to loss of control of TPAC 1 and TPAC 6. In general, FCCs may be configured to minimize offset or eliminate the loss of lift and/or control with respect to failure of any of the CAN buses by control of any of the other CAN buses, and/or control of any control surfaces and/or any controllers associated with any of the other CAN buses. In some embodiments, FCCs may be configured to alter any control margins associated with inceptor inputs provided by a pilot of the aircraft.

It is to be understood that all such symmetric permutations and combinations of control signaling to EPU inverters and associated propeller blades, TPACs, BMSs, flaperons and associated CSAs, and ruddervators and associated CSAs are contemplated within the scope of this disclosure.

With respect to the embodiment of FIG. 8A, such configurations as described above may provide the benefit that the aircraft is controllable even with (1) loss of any FCC, or (2) loss of all 3 CAN buses Left CAN Bus 1, Center CAN Bus 1, and Right CAN Bus 1, or (3) loss of all 3 CAN buses Left CAN Bus 2, Center CAN Bus 2, and Right CAN Bus 2. Further, minimally acceptable control may be achieved with such configurations even after (1) loss of any of the four flight control computer lanes L FCC-A, L FCC-B, R FCC-A, or R FCC-B, or (2) loss of any two of the CAN buses, or (3) complete loss of an aircraft low-voltage electrical wiring interconnect system (EWIS) channel and an additional CAN bus.

In some embodiments, minimally acceptable control may be defined as conditions under which the aircraft may continue to fly for a minimum amount of time, e.g., 5, 10, 15, 20, 25, 30, 35, 40, or 45 minutes. In some embodiments, minimally acceptable control during thrust-borne flight may comprise control of at least five out of six diagonal pairs of EPUs and associated TPUs. In some embodiments, minimally acceptable control during wing-borne flight may comprise control of: two out of three left tilter engines, two out of three right tilter engines, one out of two left wing flaperons, one out of two right wing flaperons, two out of three left side ruddervators, and two out of three right side ruddervators.

Figure 9A:
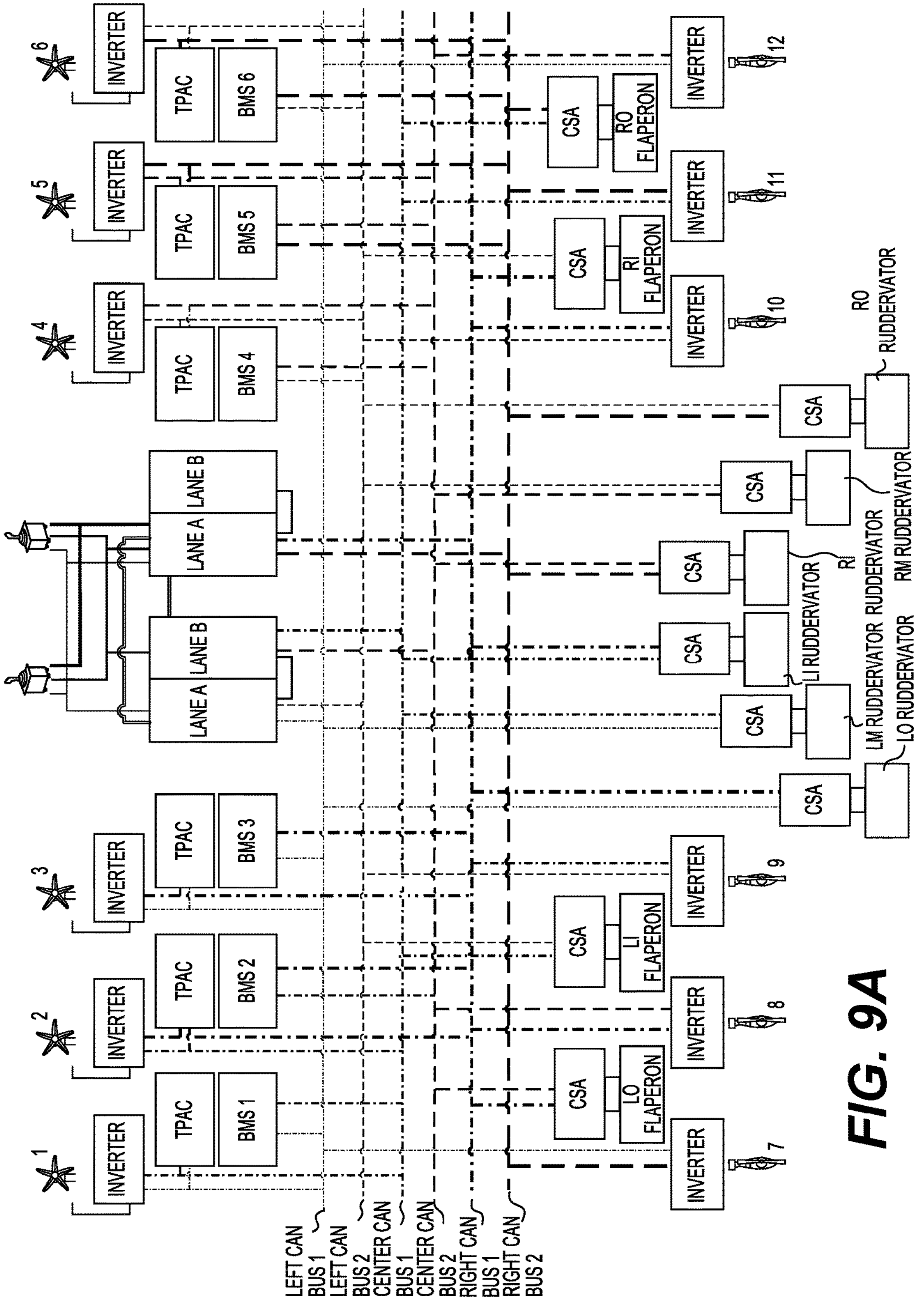
FIGS. 9A-13D illustrate and describe exemplary flight control signaling architectures and components thereof, consistent with disclosed embodiments.

FIG. 9A illustrates another exemplary flight control signaling architecture for controlling the control surfaces and associated actuators, according to various embodiments. In the illustrated embodiment, L FCC-A may provide control signals via Left CAN bus 1 and Left CAN bus 2, L FCC-B may provide control signals via Center CAN bus 1 and Center CAN bus 1, and R FCC-A may provide control signals via Right CAN bus 1 and Right CAN bus 2.

Figure 9B:
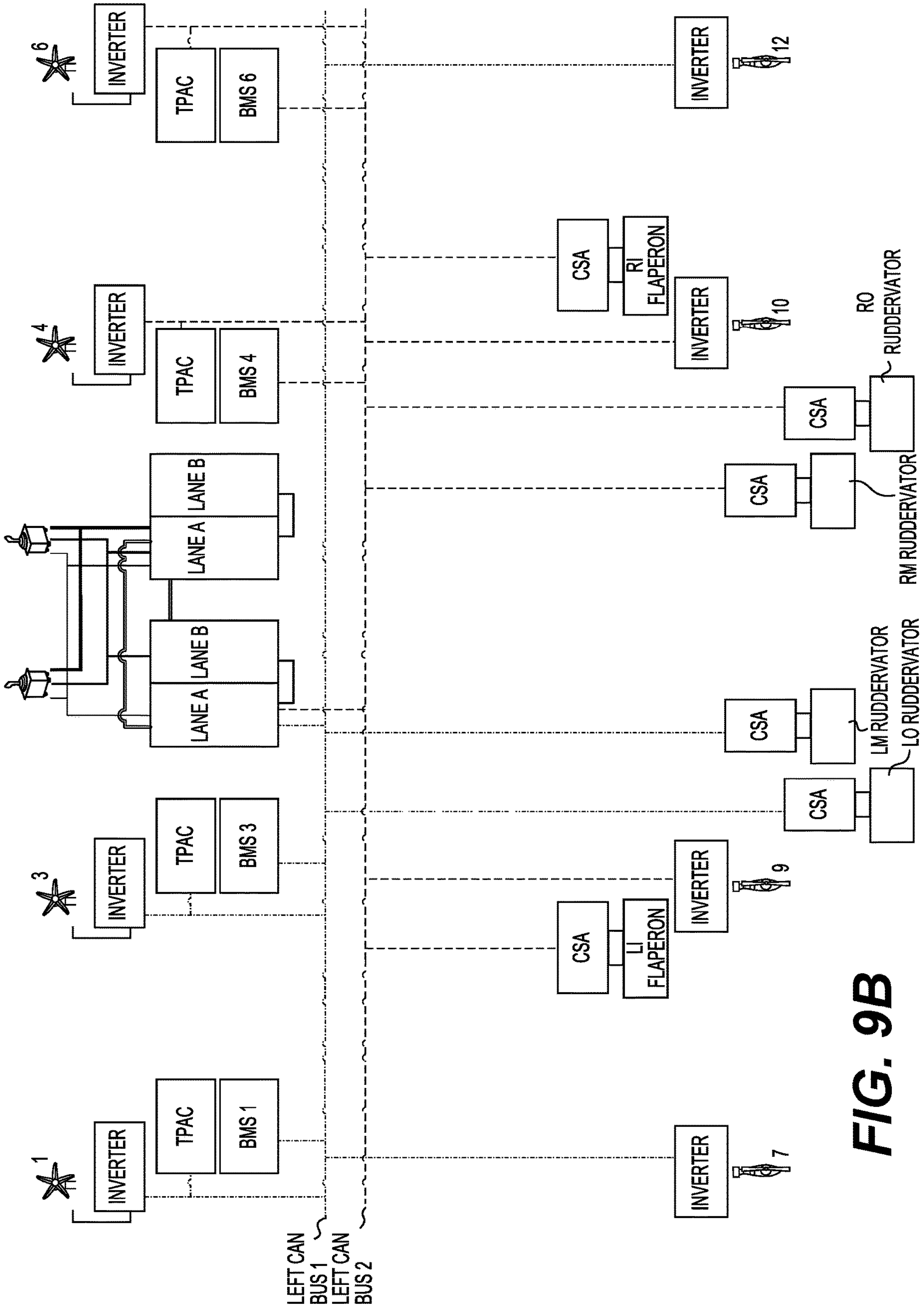

For example, with reference to FIG. 9B, Left CAN bus 1 may provide control signals to Inverters 1, 3, 7, and 12, so that a failure of this bus may result in substantially asymmetric loss of lift or thrust on opposite sides of the aircraft. For example, a failure of Left CAN bus 1 will likely result in EPUs 1, 3, 7, and 12 all going offline simultaneously, resulting in substantially asymmetric loss of lift with respect to roll and/or pitch of the aircraft. Further, failure of Left CAN bus 1 will likely result in LO ruddervator and LM ruddervator both going offline simultaneously, resulting in substantially asymmetric loss of lift with respect to yaw and/or pitch of the aircraft. For example, failure of Left CAN bus 1 will likely result in loss of control of TPAC 1 and TPAC 3, resulting in substantially asymmetric loss of control with respect to roll and/or pitch of the aircraft.

For example, with reference to FIG. 9B, Left CAN bus 2 may provide control signals to Inverters 4, 6, 9, and 10, so that a failure of this bus may result in substantially asymmetric loss of lift or thrust on opposite sides of the aircraft. For example, a failure of Left CAN bus 2 will likely result in EPUs 4, 6, 9, and 10 all going offline simultaneously, resulting in substantially asymmetric loss of lift with respect to roll and/or pitch of the aircraft. Failure of Left CAN bus 2 will likely result in both LI flaperon and RI flaperon both going offline simultaneously, resulting in substantially symmetric loss of control with respect to roll and/or pitch of the aircraft. Further, failure of Left CAN bus 2 will likely result in RM ruddervator and RO ruddervator both going offline simultaneously, resulting in substantially asymmetric loss of lift with respect to yaw and/or pitch of the aircraft. For example, failure of Left CAN bus 2 will likely result in loss of control of TPAC 4 and TPAC 6, resulting in substantially asymmetric loss of control with respect to roll and/or pitch of the aircraft.

Further, with reference to FIG. 9B, Left CAN bus 1 may provide control signals to Inverters 1, 3, 7, and 12, and Left CAN bus 2 may provide control signals to Inverters 4, 6, 9, and 10, so that a failure of both buses may result in substantially symmetric loss of lift or thrust on opposite sides of the aircraft. For example, a failure of both Left CAN bus 1 and Left CAN bus 2 will likely result in EPUs 1 and 12, 3 and 10, 4 and 9, and 6 and 7 all going offline simultaneously, resulting in substantially symmetric loss of lift with respect to roll and/or pitch of the aircraft. Further, Failure of both Left CAN bus 1 and Left CAN bus 2 will likely result in LI flaperon and RI flaperon both going offline simultaneously, resulting in substantially symmetric loss of control with respect to roll and/or pitch of the aircraft. Similarly, failure of both Left CAN bus 1 and Left CAN bus 2 will likely result in LO ruddervator, LM ruddervator, RM ruddervator, and RO ruddervator all going offline simultaneously, resulting in substantially symmetric loss of control with respect to yaw and/or pitch of the aircraft. For example, a failure of both Left CAN bus 1 and Left CAN bus 2 will likely result in loss of control of TPACs 1 and 3 and TPACs 4, and 6, respectively, resulting in substantially symmetric loss of control with respect to roll and/or pitch of the aircraft.

Figure 9C:
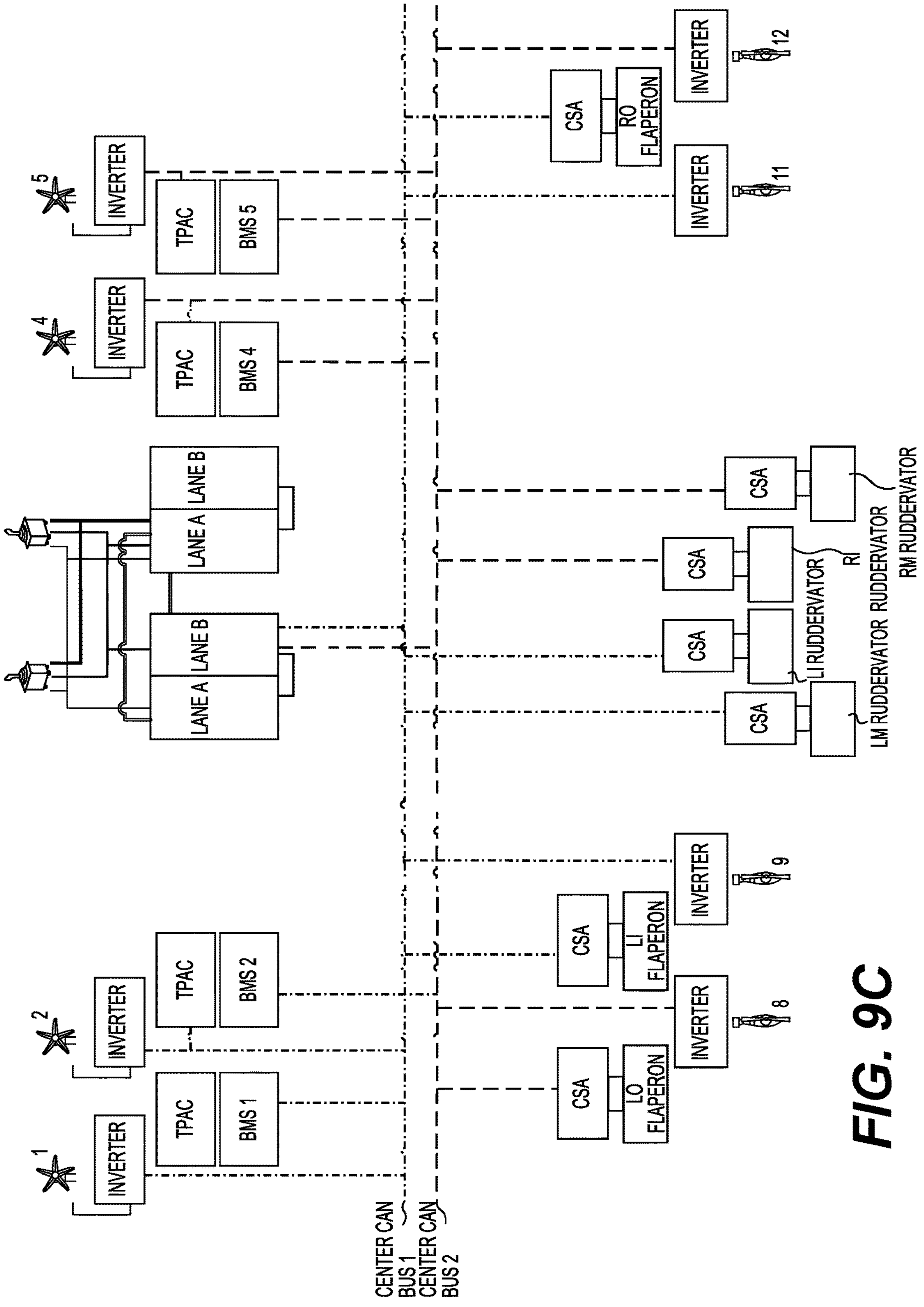

For example, with reference to FIG. 9C, Center CAN bus 1 may provide control signals to Inverters 1, 2, 9, and 11, so that a failure of this bus may result in substantially asymmetric loss of lift or thrust on opposite sides of the aircraft. For example, a failure of Center CAN bus 1 will likely result in EPUs 1, 2, 9, and 11 all going offline simultaneously, resulting in substantially asymmetric loss of lift with respect to roll and/or pitch of the aircraft. Failure of Center CAN bus 1 will likely result in both LI flaperon and RO flaperon both going offline simultaneously, resulting in substantially asymmetric loss of control with respect to roll and/or pitch of the aircraft. Further, failure of Center CAN bus 1 will likely result in LM ruddervator and LI ruddervator both going offline simultaneously, resulting in substantially asymmetric loss of lift with respect to yaw and/or pitch of the aircraft. For example, failure of Center CAN bus 1 will likely result in loss of control of TPAC 1 and TPAC 2, resulting in substantially asymmetric loss of control with respect to roll and/or pitch of the aircraft.

For example, with reference to FIG. 9C, Center CAN bus 2 may provide control signals to Inverters 4, 5, 8, and 12, so that a failure of this bus may result in substantially asymmetric loss of lift or thrust on opposite sides of the aircraft. For example, a failure of Center CAN bus 2 will likely result in EPUs 4, 5, 8, and 12 all going offline simultaneously, resulting in substantially asymmetric loss of lift with respect to roll and/or pitch of the aircraft. Failure of Center CAN bus 2 will likely result in LO flaperon going offline simultaneously, resulting in substantially asymmetric loss of control with respect to roll and/or pitch of the aircraft. Further, failure of Center CAN bus 2 will likely result in RI ruddervator and RM ruddervator both going offline simultaneously, resulting in substantially asymmetric loss of lift with respect to yaw and/or pitch of the aircraft. For example, failure of Center CAN bus 2 will likely result in loss of control of TPAC 4 and TPAC 5, resulting in substantially asymmetric loss of control with respect to roll and/or pitch of the aircraft.

Further, with reference to FIG. 9C, Center CAN bus 1 may provide control signals to Inverters 1, 2, 9, and 12, and Center CAN bus 2 may provide control signals to Inverters 4, 5, 8, and 12, so that a failure of both buses may result in substantially symmetric loss of lift or thrust on opposite sides of the aircraft. For example, a failure of both Center CAN bus 1 and Center CAN bus 2 will likely result in EPUs 1 and 12, 2 and 11, 4 and 9, and 5 and 8 all going offline simultaneously, resulting in substantially symmetric loss of lift with respect to roll and/or pitch of the aircraft. Failure of both Center CAN bus 1 and Center CAN bus 2 will likely result in LO flaperon, LI flaperon, and RO flaperon all going offline simultaneously, resulting in substantially asymmetric loss of control with respect to roll and/or pitch of the aircraft. Failure of both Center CAN bus 1 and Center CAN bus 2 will likely result in LM ruddervator, LI ruddervator, RI ruddervator, and RM ruddervator all going offline simultaneously, resulting in substantially symmetric loss of control with respect to yaw and/or pitch the aircraft. For example, a failure of both Center CAN bus 1 and Center CAN bus 2 will likely result in loss of control of TPACs 1 and 2 and TPACs 4 and 5, respectively, resulting in substantially asymmetric loss of control with respect roll and/or pitch of the aircraft.

Figure 9D:
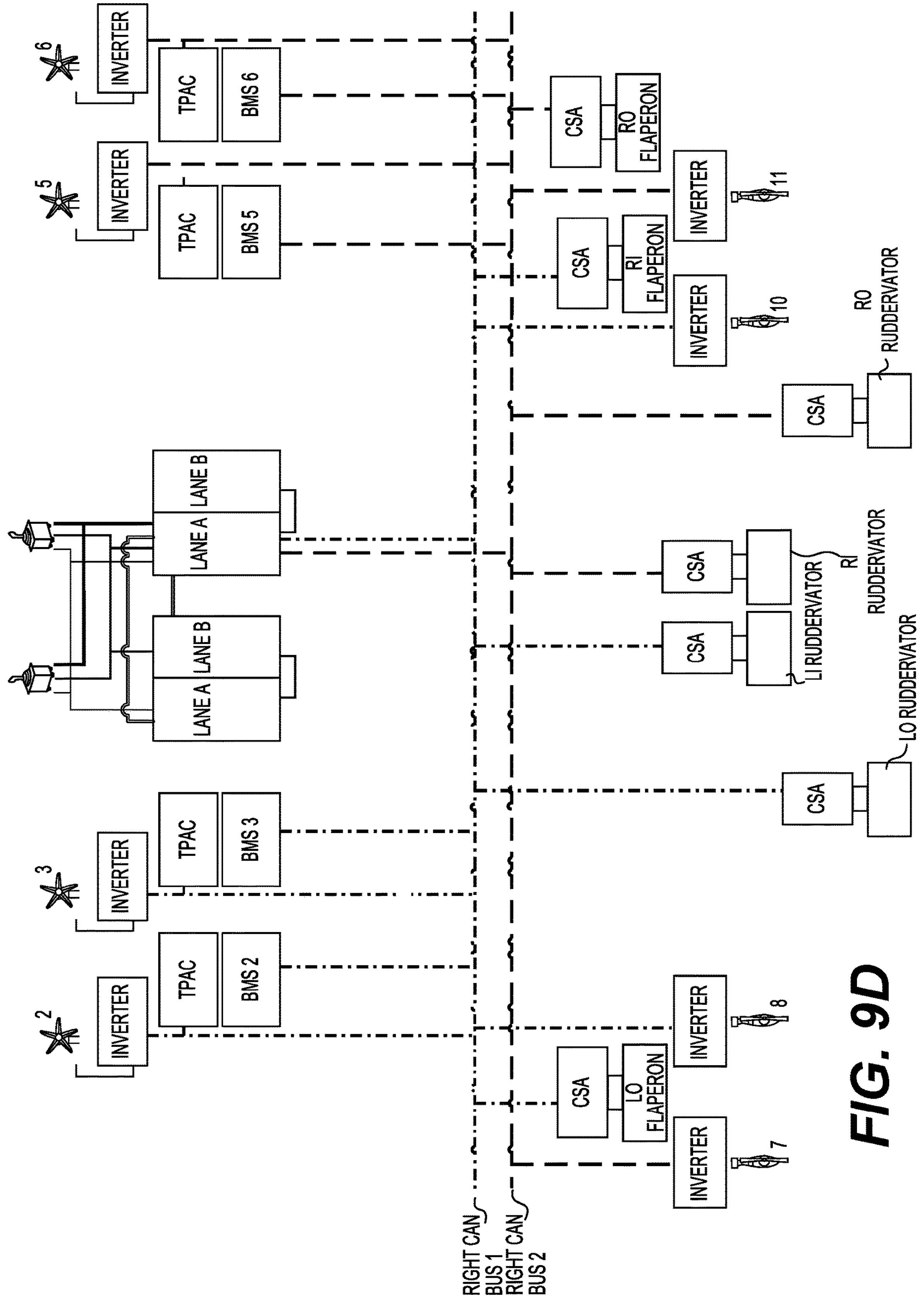

For example, with reference to FIG. 9D, Right CAN bus 1 may provide control signals to Inverters 2, 3, 8, and 10, so that a failure of this bus may result in substantially asymmetric loss of lift or thrust on opposite sides of the aircraft. For example, a failure of Right CAN bus 1 will likely result in EPUs 2, 3, 8, and 10 all going offline simultaneously, resulting in substantially asymmetric loss of lift with respect to roll and/or pitch of the aircraft. Failure of Right CAN bus 1 will likely result in both LO flaperon and RI flaperon both going offline simultaneously, resulting in substantially asymmetric loss of control with respect to roll and/or pitch of the aircraft. Further, failure of Right CAN bus 1 will likely result in LO ruddervator and LI ruddervator both going offline simultaneously, resulting in substantially asymmetric loss of lift with respect to yaw and/or pitch the aircraft. For example, failure of Right CAN bus 1 will likely result in loss of control of TPAC 2 and TPAC 3, resulting in substantially asymmetric loss of control with respect to roll and/or pitch of the aircraft.

For example, with reference to FIG. 9D, Right CAN bus 2 may provide control signals to Inverters 5, 6, 7, and 11, so that a failure of this bus may result in substantially asymmetric loss of lift or thrust on opposite sides of the aircraft. For example, a failure of Center CAN bus 2 will likely result in EPUs 5, 6, 7, and 11 all going offline simultaneously, resulting in substantially asymmetric loss of lift with respect to roll and/or pitch of the aircraft. Failure of Right CAN bus 2 will likely result in RO flaperon going offline simultaneously, resulting in substantially asymmetric loss of control with respect to roll and/or pitch of the aircraft. Further, failure of Right CAN bus 2 will likely result in RI ruddervator and RO ruddervator both going offline simultaneously, resulting in substantially asymmetric loss of lift with respect to yaw and/or pitch of the aircraft. For example, failure of Right CAN bus 2 will likely result in loss of control of TPAC 5 and TPAC 6, resulting in substantially asymmetric loss of control with respect to roll and/or pitch of the aircraft.

Further, with reference to FIG. 9D, Right CAN bus 1 may provide control signals to Inverters 2, 3, 8 and 10, and Right CAN bus 2 may provide control signals to Inverters 5, 6, 7, and 11, so that a failure of both buses may result in substantially symmetric loss of lift or thrust on opposite sides of the aircraft. For example, a failure of both Right CAN bus 1 and Right CAN bus 2 will likely result in EPUs 2, 11, 3, 10, 5, 8, 6, and 7 going offline simultaneously, resulting in substantially symmetric loss of lift with respect to roll and/or pitch of the aircraft. Failure of both Right CAN bus 1 and Right CAN bus 2 will likely result in LO flaperon, RI flaperon, and RO flaperon all going offline simultaneously, resulting in substantially asymmetric loss of control with respect to roll and/or pitch of the aircraft. Failure of both Right CAN bus 1 and Right CAN bus 2 will likely result in LO ruddervator, LI ruddervator, RI ruddervator, and RO ruddervator all going offline simultaneously, resulting in substantially symmetric loss of control with respect to yaw and/or pitch of the aircraft. For example, a failure of both Right CAN bus 1 and Right CAN bus 2 will likely result in loss of control of TPACs 2 and 3, TPACs 5 and 6, respectively, resulting in substantially asymmetric loss of control with respect to roll and/or pitch of the aircraft.

With respect to the embodiment of FIG. 9A, such configurations as described above may provide the benefit that the aircraft is fully controllable even with (1) loss of any FCC, or (2) loss of any CAN bus. Further, minimally acceptable control may be achieved with such configurations even after (1) loss of any two of the CAN buses.

With respect to FIG. 9A, in an alternative embodiment, instead of L FCC-A providing control signals via Left CAN bus 1 and Left CAN bus 2, L FCC-B providing control signals via Center CAN bus 1 and Center CAN bus 1, and R FCC-A providing control signals via Right CAN bus 1 and Right CAN bus 2, there may be an alternative configuration in which L FCC-A may provide control signals via Left CAN bus 1 and Left CAN bus 2, L FCC-B may provide control signals via Right CAN bus 1, R FCC-A may provide control signals via Center CAN bus 1 and Center CAN bus 2, and R FCC-B may provide control signals via Right CAN bus 2. This proposed alternative embodiment may provide the benefit that the aircraft is fully controllable even with (1) loss of any FCC, or (2) loss of any CAN bus. Further, minimally acceptable control may be achieved with such configurations even after (1) loss of any two of the CAN buses.

Further, there may be yet another alternative embodiment with respect to FIG. 9A such that L FCC-A may provide control signals via Left CAN bus 1 and Center CAN bus 2, L FCC-B may provide control signals via Left CAN bus 2 and Right CAN bus 2, R FCC-A may provide control signals via Center CAN bus 1 and Right CAN bus 2, and R FCC-B may provide control signals via Left CAN bus 1 and Right CAN bus 1. This proposed alternative embodiment may provide the benefit that the aircraft is fully controllable even with (1) loss of any CAN bus. Further, minimally acceptable control may be achieved with such configurations even after (1) loss of flight control computer lanes L FCC-A and L FCC-B, (2) loss of flight control computer lanes R FCC-A and R FCC-B, (3) loss of flight control computer lane L FCC-A and R FCC-B, (4) loss of flight control computer lanes L FCC-B and R FCC-B, or (5) loss of any two of the CAN buses.

Figure 10A:
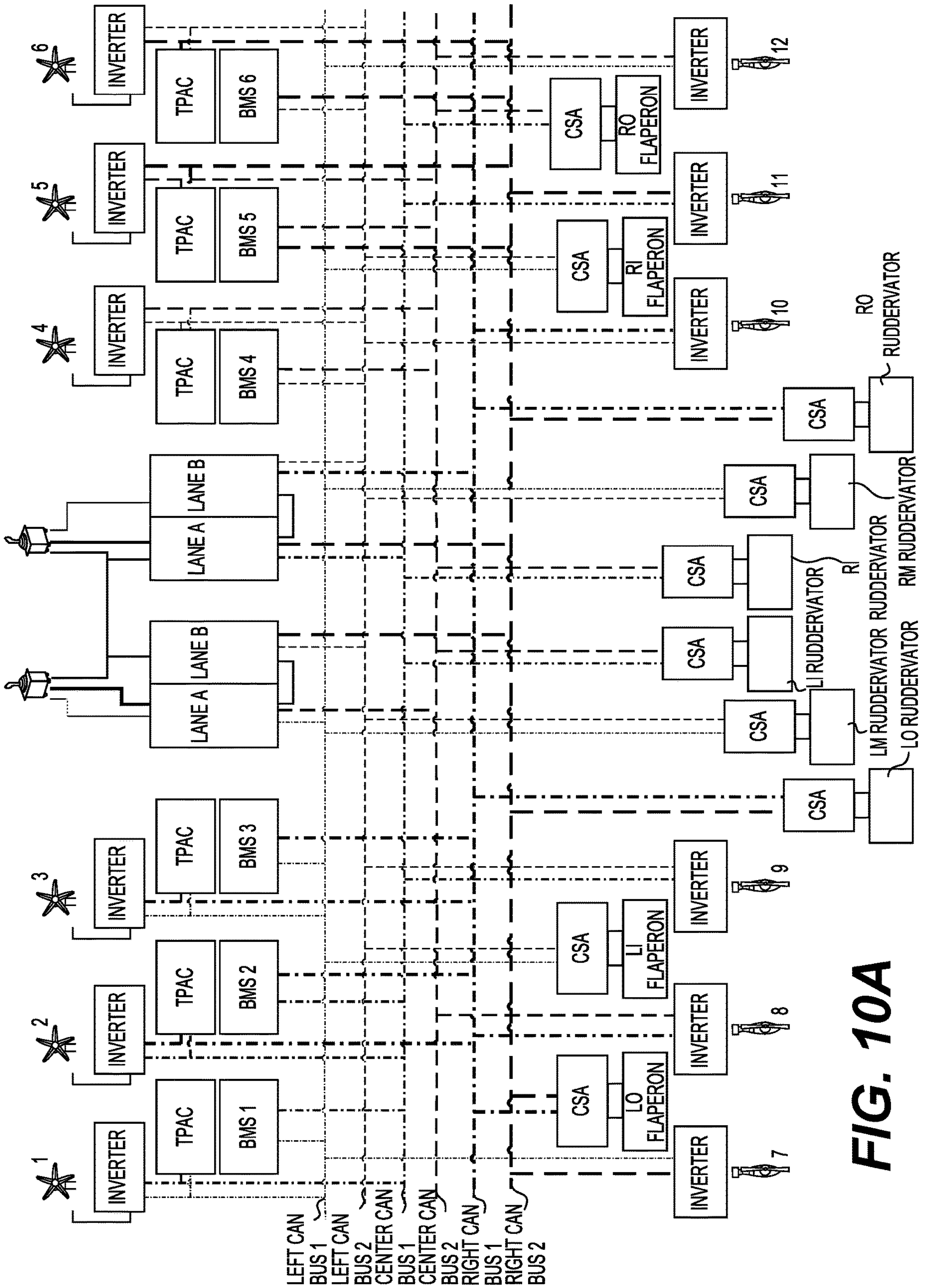

FIG. 10A illustrates another exemplary flight control signaling architecture for controlling the control surfaces and associated actuators, according to various embodiments. In the illustrated embodiment, L FCC-A may provide control signals via Left CAN bus 1 and Center CAN bus 2, L FCC-B may provide control signals via Left CAN bus 2 and Right CAN bus 2, R FCC-A may provide control signals via Center CAN bus 1 and Right CAN bus 2, and R FCC-B may provide control signals via Left CAN bus 1 and Right CAN bus 1.

Figure 10B:
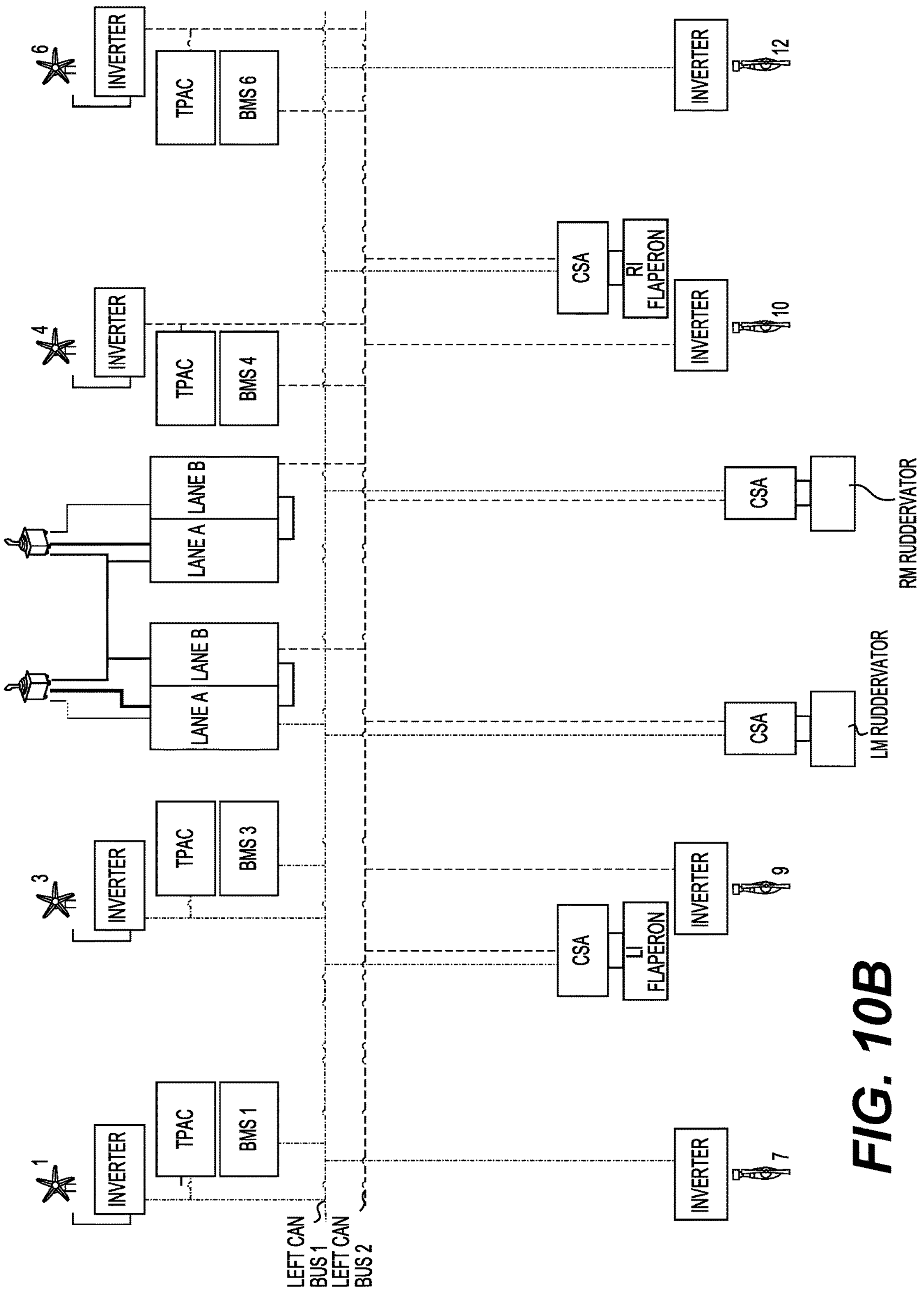

For example, with reference to FIG. 10B, Left CAN bus 1 may provide control signals to Inverters 1, 3, 7, and 12, so that a failure of this bus may result in substantially asymmetric loss of lift or thrust on opposite sides of the aircraft. For example, a failure of Left CAN bus 1 will likely result in EPUs 1, 3, 7, and 12 all going offline simultaneously, resulting in substantially asymmetric loss of lift with respect to roll and/or pitch of the aircraft. Failure of Left CAN bus 1 will likely result in both LI flaperon and RI flaperon both going offline simultaneously, resulting in substantially symmetric loss of control with respect to roll and/or pitch of the aircraft. Further, failure of Left CAN bus 1 will likely result in LM ruddervator and RM ruddervator both going offline simultaneously, resulting in substantially symmetric loss of lift with respect to yaw and/or pitch of the aircraft. For example, failure of Left CAN bus 1 will likely result in loss of control of TPAC 1 and TPAC 3, resulting in substantially asymmetric loss of control with respect to roll and/or pitch of the aircraft.

For example, with reference to FIG. 10B, Left CAN bus 2 may provide control signals to Inverters 4, 6, 9, and 10, so that a failure of this bus may result in substantially asymmetric loss of lift or thrust on opposite sides of the aircraft. For example, a failure of Left CAN bus 2 will likely result in EPUs 4, 6, 9, and 10 all going offline simultaneously, resulting in substantially asymmetric loss of lift with respect to roll and/or pitch of the aircraft. Failure of Left CAN bus 2 will likely result in both LI flaperon and RI flaperon both going offline simultaneously, resulting in substantially symmetric loss of control with respect to roll and/or pitch of the aircraft. Further, failure of Left CAN bus 2 will likely result in LM ruddervator and RM ruddervator both going offline simultaneously, resulting in substantially symmetric loss of lift with respect to yaw and/or pitch of the aircraft. For example, failure of Left CAN bus 2 will likely result in loss of control of TPAC 4 and TPAC 6, resulting in substantially asymmetric loss of control with respect to roll and/or pitch of the aircraft.

Further, with reference to FIG. 10B, Left CAN bus 1 may provide control signals to Inverters 1, 3, 7, and 12, and Left CAN bus 2 may provide control signals to Inverters 4, 6, 9, and 10, so that a failure of both buses may result in substantially symmetric loss of lift or thrust on opposite sides of the aircraft. For example, a failure of both Left CAN bus 1 and Left CAN bus 2 will likely result in EPUs 1 and 12, 3 and 10, 4 and 9, and 6 and 7 all going offline simultaneously, resulting in substantially symmetric loss of lift with respect to roll and/or pitch of the aircraft. Further, failure of both Left CAN bus 1 and Left CAN bus 2 will likely result in LI flaperon and RI flaperon both going offline simultaneously, resulting in substantially symmetric loss of control with respect to roll and/or pitch of the aircraft. Similarly, failure of both Left CAN bus 1 and Left CAN bus 2 will likely result in LM ruddervator and RM ruddervator both going offline simultaneously, resulting in substantially symmetric loss of control with respect to yaw and/or pitch of the aircraft. For example, a failure of both Left CAN bus 1 and Left CAN bus 2 will likely result in loss of control of TPACs 1 and 3 and TPACs 4, and 6, respectively, resulting in substantially symmetric loss of control with respect to roll and/or pitch of the aircraft.

Figure 10C:
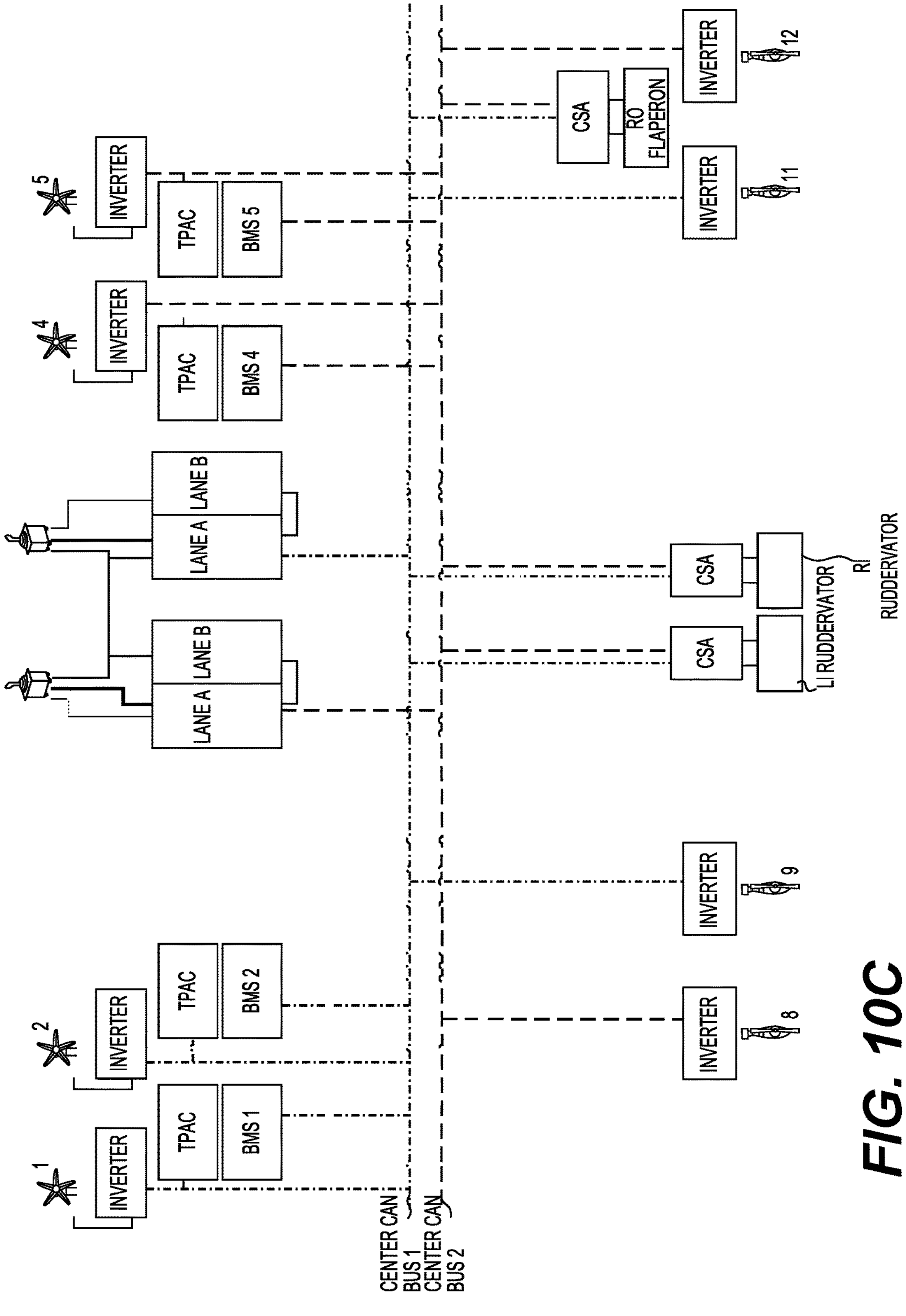

For example, with reference to FIG. 10C, Center CAN bus 1 may provide control signals to Inverters 1, 2, 9, and 11, so that a failure of this bus may result in substantially asymmetric loss of lift or thrust on opposite sides of the aircraft. For example, a failure of Center CAN bus 1 will likely result in EPUs 1, 2, 9, and 11 all going offline simultaneously, resulting in substantially asymmetric loss of lift with respect to roll and/or pitch of the aircraft. Further, failure of Center CAN bus 1 will likely result in RO flaperon going offline simultaneously, resulting in substantially asymmetric loss of control with respect to roll and/or pitch of the aircraft. Failure of Center CAN bus 1 will likely result in LI ruddervator and RI ruddervator both going offline simultaneously, resulting in substantially symmetric loss of lift with respect to yaw and/or pitch of the aircraft. For example, failure of Center CAN bus 1 will likely result in loss of control of TPAC 1 and TPAC 2, resulting in substantially asymmetric loss of control with respect to roll and/or pitch of the aircraft.

For example, with reference to FIG. 10C, Center CAN bus 2 may provide control signals to Inverters 4, 5, 8, and 12, so that a failure of this bus may result in substantially asymmetric loss of lift or thrust on opposite sides of the aircraft. For example, a failure of Center CAN bus 2 will likely result in EPUs 4, 5, 8, and 12 all going offline simultaneously, resulting in substantially asymmetric loss of lift with respect to roll and/or pitch of the aircraft. Further, Failure of Center CAN bus 2 will likely result in RO flaperon going offline simultaneously, resulting in substantially asymmetric loss of control with respect to roll and/or pitch of the aircraft. Failure of Center CAN bus 2 will likely result in LI ruddervator and RI ruddervator both going offline simultaneously, resulting in substantially symmetric loss of lift with respect to yaw and/or pitch of the aircraft. For example, failure of Center CAN bus 2 will likely result in loss of control of TPAC 4 and TPAC 5, resulting in substantially asymmetric loss of control with respect to roll and/or pitch of the aircraft.

Further, with reference to FIG. 10C, Center CAN bus 1 may provide control signals to Inverters 1, 2, 9, and 12, and Center CAN bus 2 may provide control signals to Inverters 4, 5, 8, and 12, so that a failure of both buses may result in substantially symmetric loss of lift or thrust on opposite sides of the aircraft. For example, a failure of both Center CAN bus 1 and Center CAN bus 2 will likely result in EPUs 1 and 12, 2 and 11, 4 and 9, and 5 and 8 all going offline simultaneously, resulting in substantially symmetric loss of lift with respect to roll and/or pitch of the aircraft. Failure of both Center CAN bus 1 and Center CAN bus 2 will likely result in RO flaperon going offline simultaneously, resulting in substantially asymmetric loss of control with respect to roll and/or pitch of the aircraft. Failure of both Center CAN bus 1 and Center CAN bus 2 will likely result in LI ruddervator and RI ruddervator both going offline simultaneously, resulting in substantially symmetric loss of control with respect to yaw and/or pitch of the aircraft. For example, a failure of both Center CAN bus 1 and Center CAN bus 2 will likely result in loss of control of TPACs 1 and 2 and TPACs 4 and 5, respectively, resulting in substantially asymmetric loss of control with respect to roll and/or pitch of the aircraft.

Figure 10D:
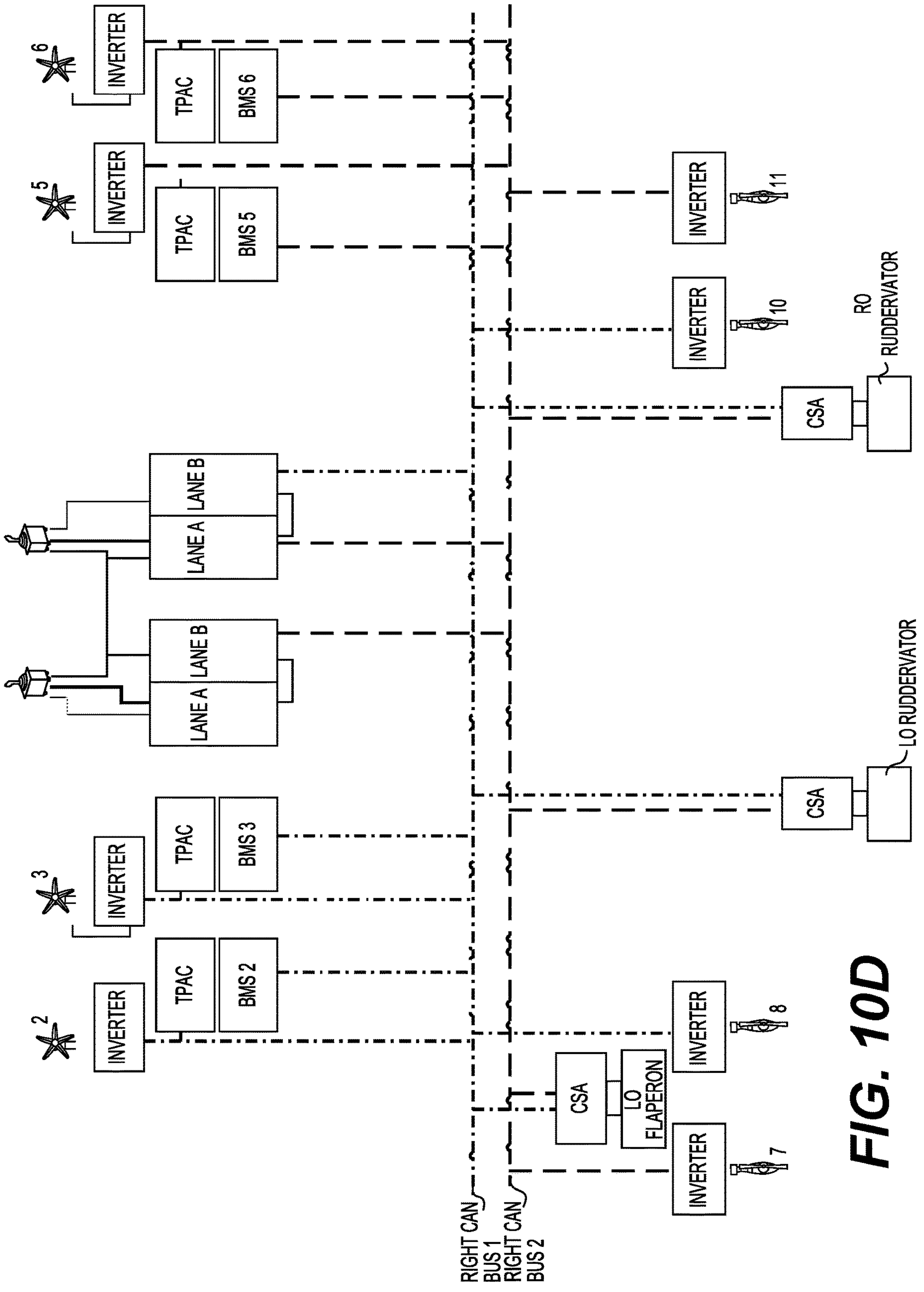

For example, with reference to FIG. 10D, Right CAN bus 1 may provide control signals to Inverters 2, 3, 8, and 10, so that a failure of this bus may result in substantially asymmetric loss of lift or thrust on opposite sides of the aircraft. For example, a failure of Right CAN bus 1 will likely result in EPUs 2, 3, 8, and 10 all going offline simultaneously, resulting in substantially asymmetric loss of lift with respect to roll and/or pitch of the aircraft. Further, failure of Right CAN bus 1 will likely result in LO flaperon going offline simultaneously, resulting in substantially asymmetric loss of control with respect to roll and/or pitch of the aircraft. Further, failure of Right CAN bus 1 will likely result in LO ruddervator and RO ruddervator both going offline simultaneously, resulting in substantially symmetric loss of lift with respect to yaw and/or pitch of the aircraft. For example, failure of Right CAN bus 1 will likely result in loss of control of TPAC 2 and TPAC 3, resulting in substantially asymmetric loss of control with respect to roll and/or pitch of the aircraft.

For example, with reference to FIG. 10D, Right CAN bus 2 may provide control signals to Inverters 5, 6, 7, and 11, so that a failure of this bus may result in substantially asymmetric loss of lift or thrust on opposite sides of the aircraft. For example, a failure of Center CAN bus 2 will likely result in EPUs 5, 6, 7, and 11 all going offline simultaneously, resulting in substantially asymmetric loss of lift with respect to roll and/or pitch of the aircraft. Further, failure of Right CAN bus 2 will likely result in LO flaperon going offline simultaneously, resulting in substantially asymmetric loss of control with respect to roll and/or pitch of the aircraft. Failure of Right CAN bus 2 will likely result in LO ruddervator and RO ruddervator both going offline simultaneously, resulting in substantially symmetric loss of lift with respect to yaw and/or pitch of the aircraft. For example, failure of Right CAN bus 2 will likely result in loss of control of TPAC 5 and TPAC 6, resulting in substantially asymmetric loss of control with respect to roll and/or pitch of the aircraft.

Further, with reference to FIG. 10D, Right CAN bus 1 may provide control signals to Inverters 2, 3, 8 and 10, and Right CAN bus 2 may provide control signals to Inverters 5, 6, 7, and 11, so that a failure of both buses may result in substantially symmetric loss of lift or thrust on opposite sides of the aircraft. For example, a failure of both Right CAN bus 1 and Right CAN bus 2 will likely result in EPUs 2, 11, 3, 10, 5, 8, 6, and 7 going offline simultaneously, resulting in substantially symmetric loss of lift with respect to roll and/or pitch of the aircraft. Failure of both Right CAN bus 1 and Right CAN bus 2 will likely result in RO flaperon going offline simultaneously, resulting in substantially asymmetric loss of control with respect to roll and/or pitch of the aircraft. Failure of both Right CAN bus 1 and Right CAN bus 2 will likely result in LO ruddervator and RO ruddervator both going offline simultaneously, resulting in substantially symmetric loss of control with respect to yaw and/or pitch of the aircraft. For example, a failure of both Right CAN bus 1 and Right CAN bus 2 will likely result in loss of control of TPACs 2 and 3, TPACs 5 and 6, respectively, resulting in substantially asymmetric loss of control with respect to roll and/or pitch of the aircraft.

With respect to the embodiment of FIG. 10A, such configurations as described above may provide the benefit that minimally acceptable control of the aircraft may be achieved with such configurations even after (1) loss of any 2 CAN bus, (2) loss of flight control computer lanes L FCC-A and L FCC-B, or (3) loss of flight control computer lanes R FCC-A and R FCC-B.

Figure 11A:
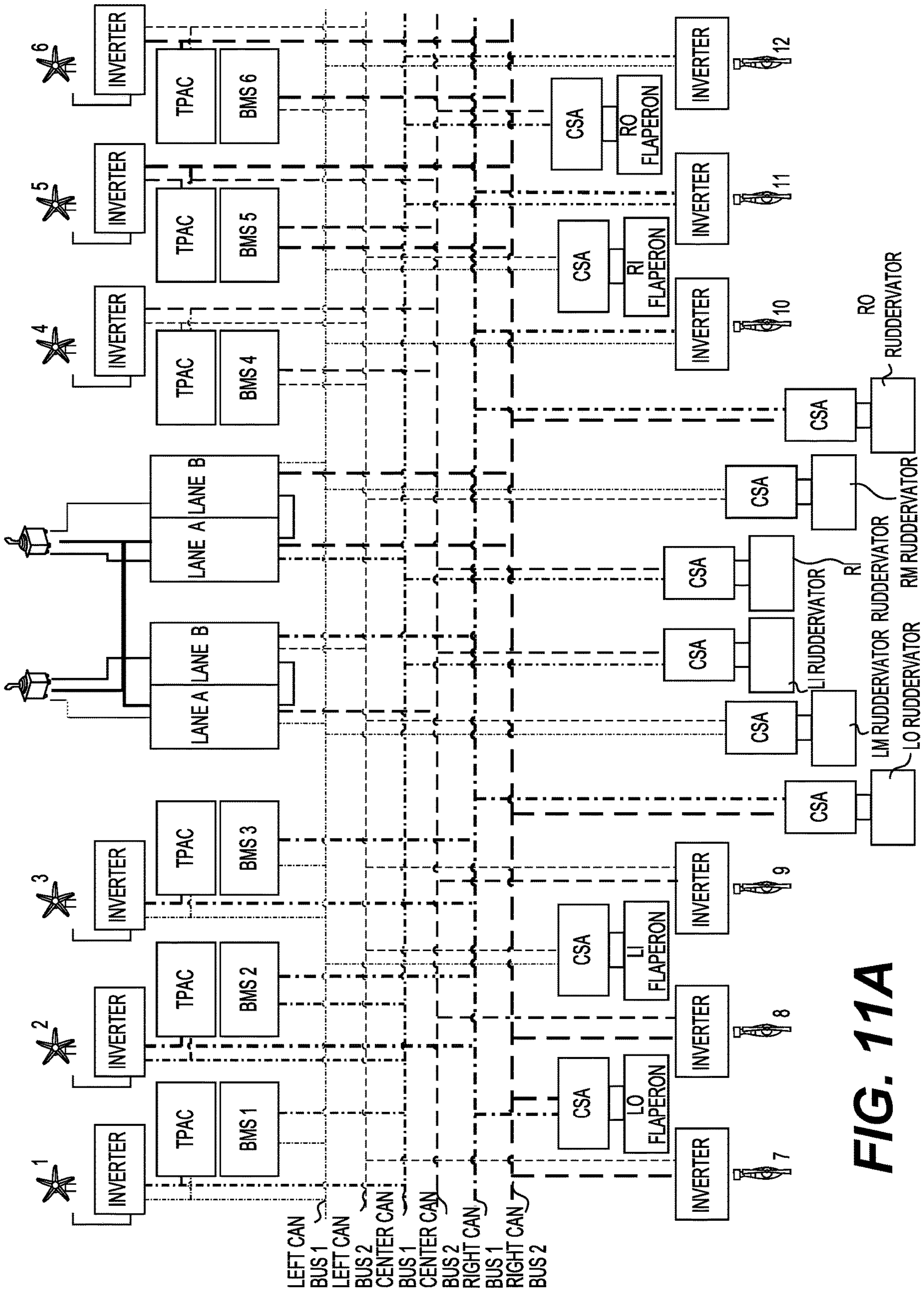

FIG. 11A illustrates another exemplary flight control signaling architecture for controlling the control surfaces and associated actuators, according to various embodiments. In the illustrated embodiment, L FCC-A may provide control signals via Left CAN bus 1 and Center CAN bus 2, L FCC-B may provide control signals via Left CAN bus 2 and Right CAN bus 1, R FCC-A may provide control signals via Center CAN bus 1 and Right CAN bus 2, and R FCC-B may provide control signals via Left CAN bus 1 and Right CAN bus 2.

Figure 11B:
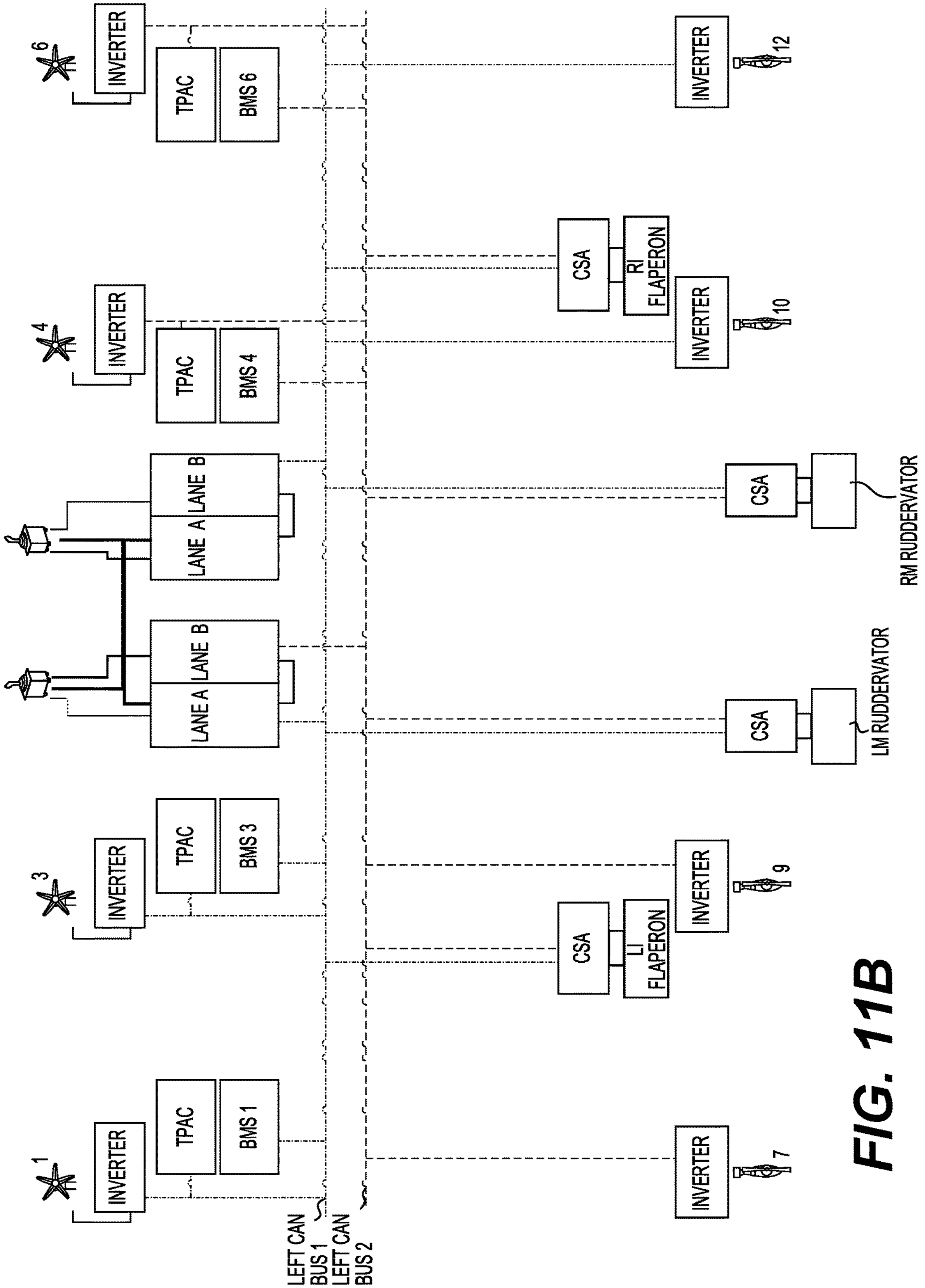

For example, with reference to FIG. 11B, Left CAN bus 1 may provide control signals to Inverters 1 and 12, and 3 and 10, so that a failure of this bus may result in substantially symmetric loss of lift or thrust on opposite sides of the aircraft. For example, a failure of Left CAN bus 1 will likely result in EPU 1 and EPU 12 both going offline simultaneously, resulting in substantially symmetric loss of lift with respect to roll and/or pitch of the aircraft. Similarly, failure of Left CAN bus 1 will likely result in EPU 3 and EPU 10 both going offline simultaneously, resulting in substantially symmetric loss of lift with respect to roll and/or pitch of the aircraft. Further, failure of Left CAN bus 1 will likely result in LI flaperon and RI flaperon both going offline simultaneously, resulting in substantially symmetric loss of control with respect to roll and/or pitch of the aircraft. Similarly, failure of Left CAN bus 1 will likely result in LM ruddervator and RM ruddervator both going offline simultaneously, resulting in substantially symmetric loss of control with respect to yaw and/or pitch of the aircraft. For example, failure of Left CAN bus 1 will likely result in loss of control of TPAC 1 and TPAC 3, resulting in substantially asymmetric loss of control with respect to roll and/or pitch of the aircraft.

Similarly, with reference to FIG. 11B, Left CAN bus 2 may provide control signals to Inverters 4 and 9, and 6 and 7, so that a failure of this bus may result in substantially symmetric loss of lift or thrust on opposite sides of the aircraft. For example, a failure of Left CAN bus 2 will likely result in EPU 4 and EPU 9 both going offline simultaneously, resulting in substantially symmetric loss of lift with respect to roll and/or pitch of the aircraft. Similarly, failure of Left CAN bus 2 will likely result in EPU 6 and EPU 7 both going offline simultaneously, resulting in substantially symmetric loss of lift with respect to roll and/or pitch of the aircraft. Further, failure of Left CAN bus 2 will likely result in LI flaperon and RI flaperon both going offline simultaneously, resulting in substantially symmetric loss of control with respect to roll and/or pitch of the aircraft. Similarly, failure of Left CAN bus 2 will likely result in LM ruddervator and RM ruddervator both going offline simultaneously, resulting in substantially symmetric loss of control with respect to yaw and/or pitch of the aircraft. For example, failure of Left CAN bus 2 will likely result in loss of control of TPAC 4 and TPAC 6, resulting in substantially asymmetric loss of control with respect to roll and/or pitch of the aircraft.

Further, with reference to FIG. 11B, failure of Left CAN bus 1 and Left CAN bus 2 will likely result in loss of control of TPACs 1 and 3 and TPACs 4 and 6, respectively, resulting in substantially symmetric loss of control with respect to roll and/or pitch of the aircraft.

Figure 11C:
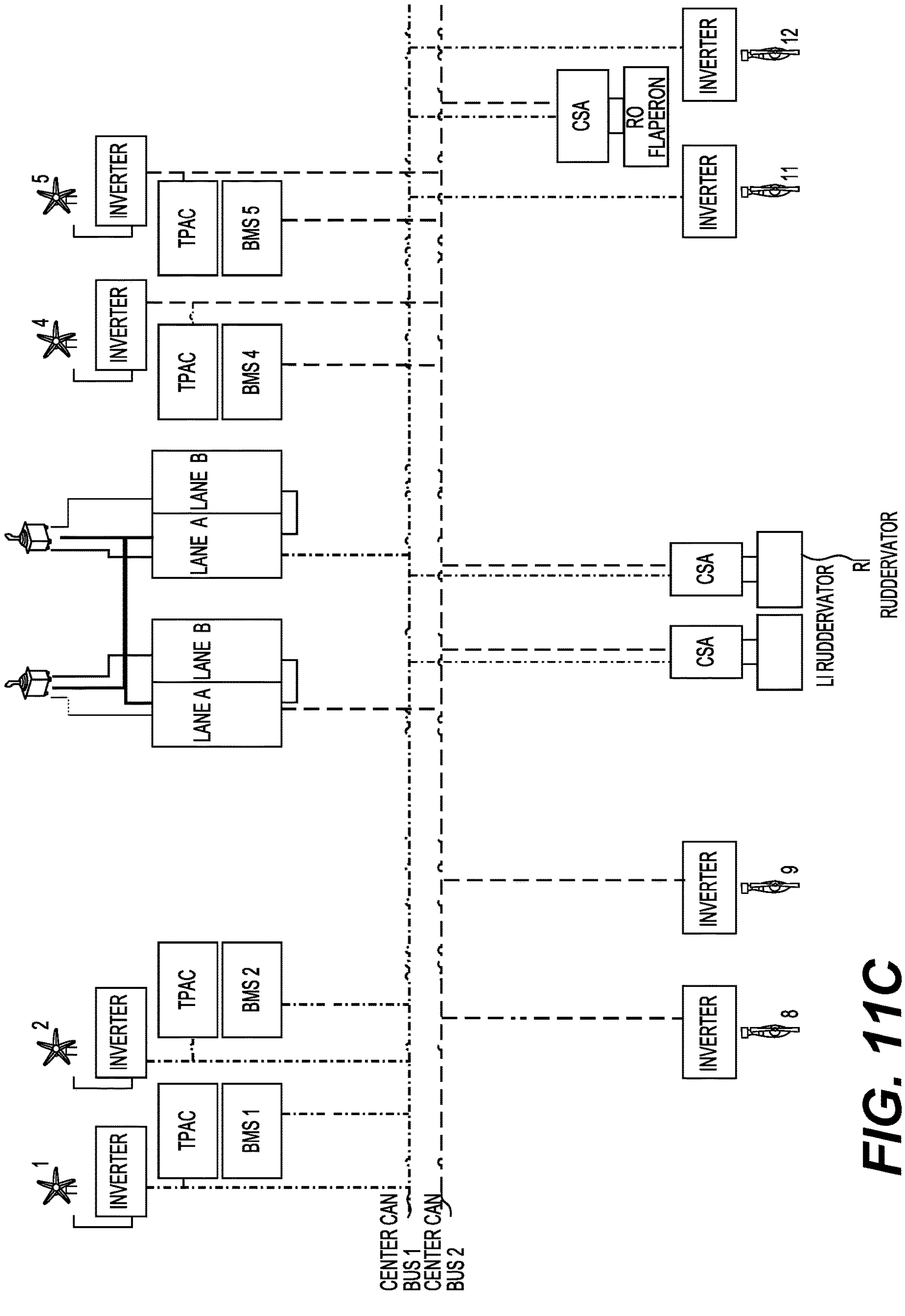

Similarly, with reference to FIG. 11C, Center CAN bus 1 may provide control signals to Inverters 1 and 12, and 2 and 11, so that a failure of this bus may result in substantially symmetric loss of lift or thrust on opposite sides of the aircraft. For example, a failure of Center CAN bus 1 will likely result in EPU 1 and EPU 12 both going offline simultaneously, resulting in substantially symmetric loss of lift with respect to roll and/or pitch of the aircraft. Similarly, failure of Center CAN bus 1 will likely result in EPU 2 and EPU 11 both going offline simultaneously, resulting in substantially symmetric loss of lift with respect to roll and/or pitch of the aircraft. Further, failure of Center CAN bus 1 will likely result in LI ruddervator and RI ruddervator both going offline simultaneously, resulting in substantially symmetric loss of control with respect to yaw and/or pitch of the aircraft. Failure of Center CAN bus 1 will likely result in RO flaperon going offline, resulting in substantially asymmetric loss of control with respect to roll and/or pitch of the aircraft. For example, failure of Center CAN bus 1 will likely result in loss of control of TPAC 1 and TPAC 2, resulting in substantially asymmetric loss of control with respect to roll and/or pitch of the aircraft.

Similarly, with reference to FIG. 11C, Center CAN bus 2 may provide control signals to Inverters 4 and 9, and 5 and 8, so that a failure of this bus may result in substantially symmetric loss of lift or thrust on opposite sides of the aircraft. For example, a failure of Center CAN bus 2 will likely result in EPU 4 and EPU 9 both going offline simultaneously, resulting in substantially symmetric loss of lift with respect to roll and/or pitch of the aircraft. Similarly, failure of Center CAN bus 2 will likely result in EPU 5 and EPU 8 both going offline simultaneously, resulting in substantially symmetric loss of lift with respect to roll and/or pitch of the aircraft. Further, failure of Center CAN bus 2 will likely result in LI ruddervator and RI ruddervator both going offline simultaneously, resulting in substantially symmetric loss of control with respect to yaw and/or pitch of the aircraft. Failure of Center CAN bus 2 will likely result in RO flaperon going offline, resulting in substantially asymmetric loss of control with respect to roll and/or pitch of the aircraft. For example, failure of Center CAN bus 2 will likely result in loss of control of TPAC 4 and TPAC 5, resulting in substantially asymmetric loss of control with respect to roll and/or pitch of the aircraft.

Further, with reference to FIG. 11C, failure of Center CAN bus 1 and Center CAN bus 2 will likely result in loss of control of TPACs 1 and 2 and TPACs 4 and 5, respectively, resulting in substantially symmetric loss of control with respect to roll and/or pitch of the aircraft.

Figure 11D:
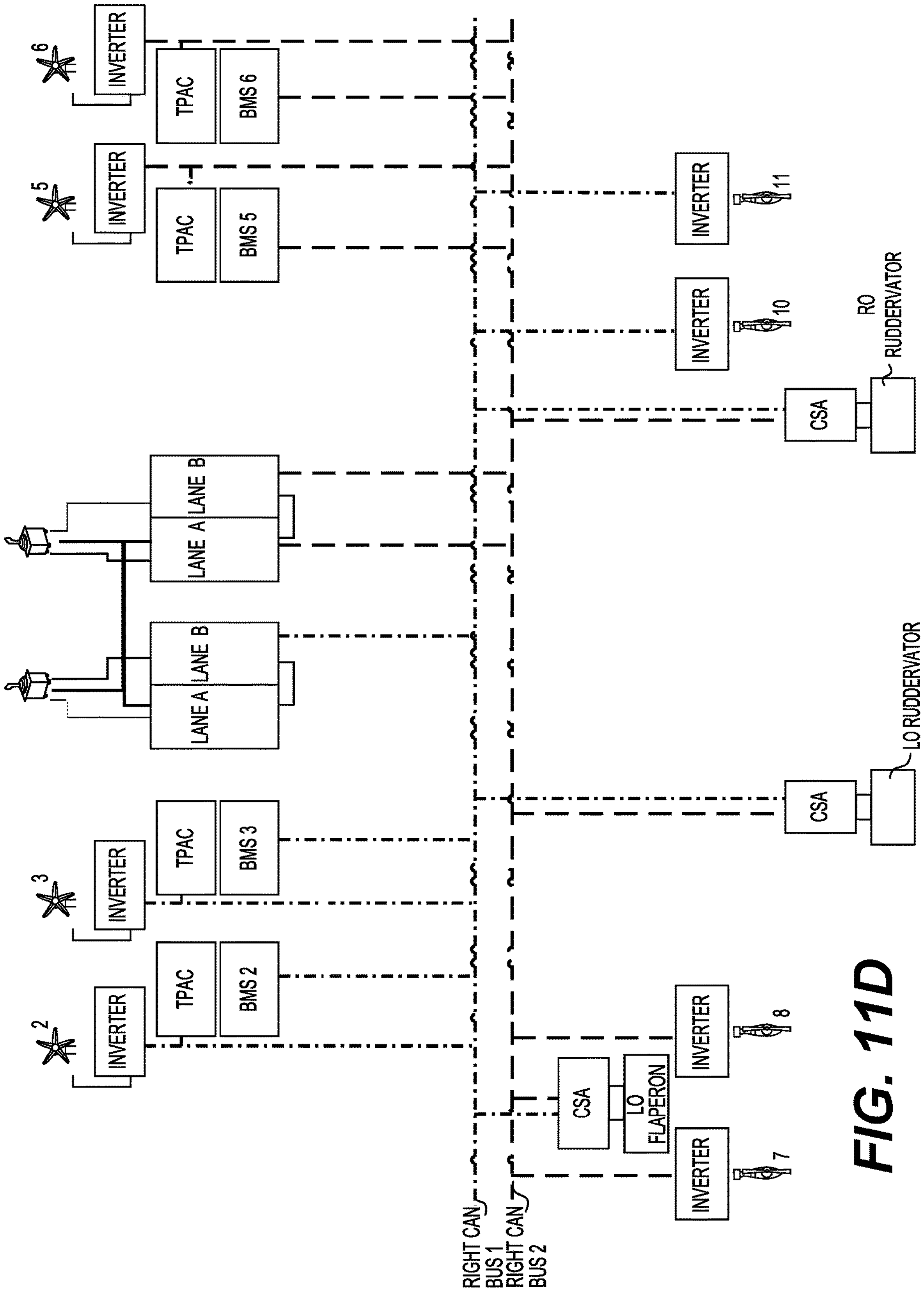

Similarly, with reference to FIG. 11D, Right CAN bus 1 may provide control signals to Inverters 2 and 11, and 3 and 10, so that a failure of this bus may result in substantially symmetric loss of lift or thrust on opposite sides of the aircraft. For example, a failure of Right CAN bus 1 will likely result in EPU 2 and EPU 11 both going offline simultaneously, resulting in substantially symmetric loss of lift with respect to roll and/or pitch of the aircraft. Similarly, failure of Right CAN bus 1 will likely result in EPU 3 and EPU 10 both going offline simultaneously, resulting in substantially symmetric loss of lift with respect to roll and/or pitch of the aircraft. Further, failure of Right CAN bus 1 will likely result in LO ruddervator and RO ruddervator both going offline simultaneously, resulting in substantially symmetric loss of control with respect to yaw and/or pitch of the aircraft. Failure of Right CAN bus 1 will likely result in LO flaperon going offline, resulting in substantially asymmetric loss of control with respect to roll and/or pitch of the aircraft. For example, failure of Right CAN bus 1 will likely result in loss of control of TPAC 2 and TPAC 3, resulting in substantially asymmetric loss of control with respect to roll and/or pitch of the aircraft.

Similarly, with reference to FIG. 11D, Right CAN bus 2 may provide control signals to Inverters 5 and 8, and 6 and 7, so that a failure of this bus may result in substantially symmetric loss of lift or thrust on opposite sides of the aircraft. For example, a failure of Right CAN bus 1 will likely result in EPU 5 and EPU 8 both going offline simultaneously, resulting in substantially symmetric loss of lift with respect to roll and/or pitch of the aircraft. Similarly, failure of Right CAN bus 2 will likely result in EPU 6 and EPU 7 both going offline simultaneously, resulting in substantially symmetric loss of lift with respect to roll and/or pitch of the aircraft. Further, failure of Right CAN bus 2 will likely result in LO ruddervator and RO ruddervator both going offline simultaneously, resulting in substantially symmetric loss of control with respect to yaw and/or pitch of the aircraft. Failure of Right CAN bus 2 will likely result in LO flaperon going offline, resulting in substantially asymmetric loss of control with respect to roll and/or pitch of the aircraft. For example, failure of Right CAN bus 2 will likely result in loss of control of TPAC 5 and TPAC 6, resulting in substantially asymmetric loss of control with respect to roll and/or pitch of the aircraft.

Further, with respect to FIG. 11D, failure of Right CAN bus 1 and Right CAN bus 2 will likely result in loss of control of TPACs 2 and 3 and TPACs 5 and 6, respectively, resulting in substantially symmetric loss of control with respect to roll and/or pitch of the aircraft.

With respect to the embodiment of FIG. 11A, such configurations as described above may provide the benefit that minimally acceptable control of the aircraft may be achieved even after (1) loss of any 2 CAN buses, (2) any 2 FCCs, or (3) complete loss of an aircraft low-voltage electrical wiring interconnect system (EWIS) channel has no substantial effect on inverters.

Figure 12A:
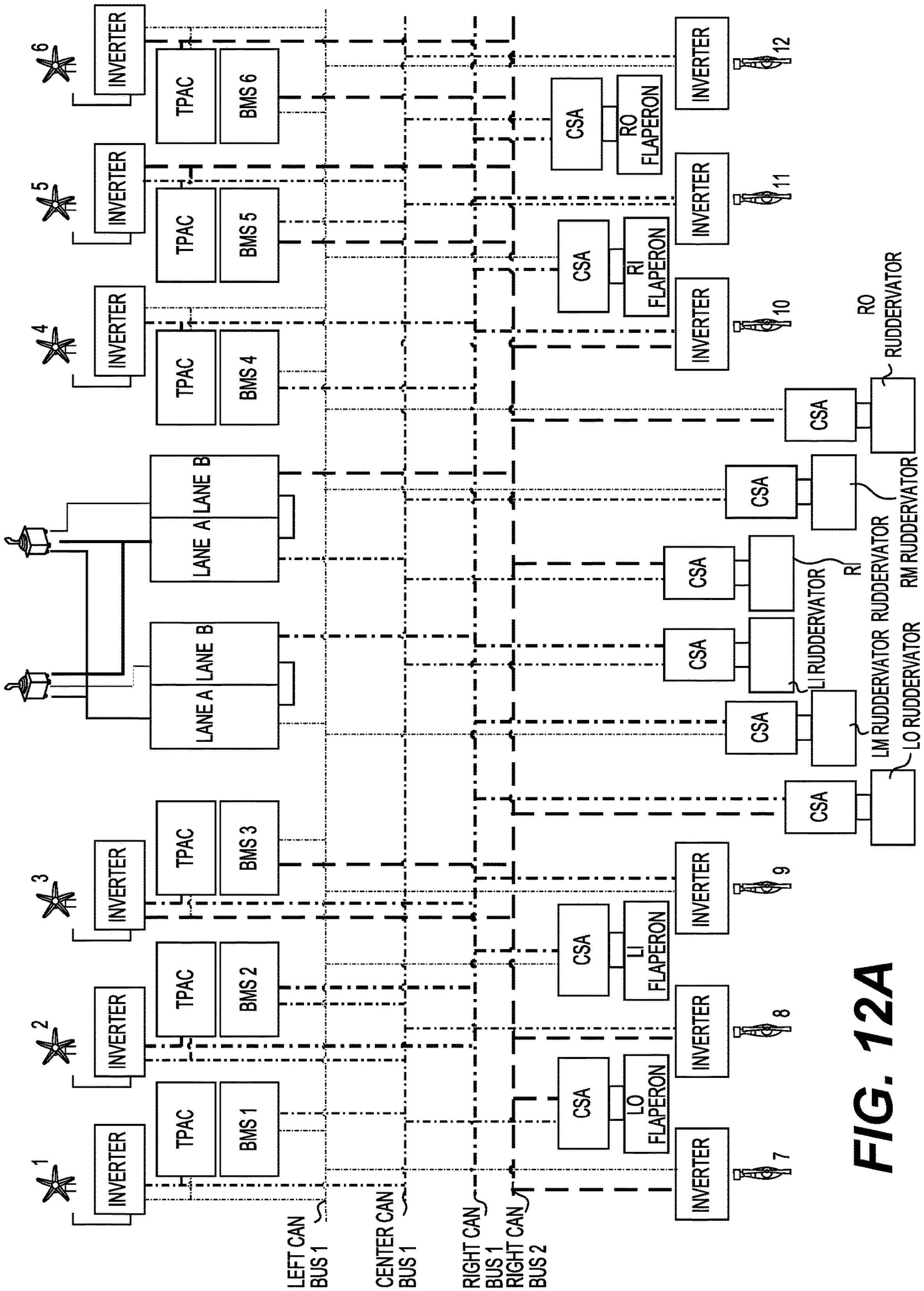

FIG. 12A illustrates another exemplary flight control signaling architecture for controlling the control surfaces and associated actuators, according to various embodiments. In the illustrated embodiment, L FCC-A may provide control signals via Left CAN bus 1, L FCC-B may provide control signals via Right CAN bus 1, R FCC-A may provide control signals via Center CAN bus 1, and R FCC-B may provide control signals via Right CAN bus 2.

Figure 12B:
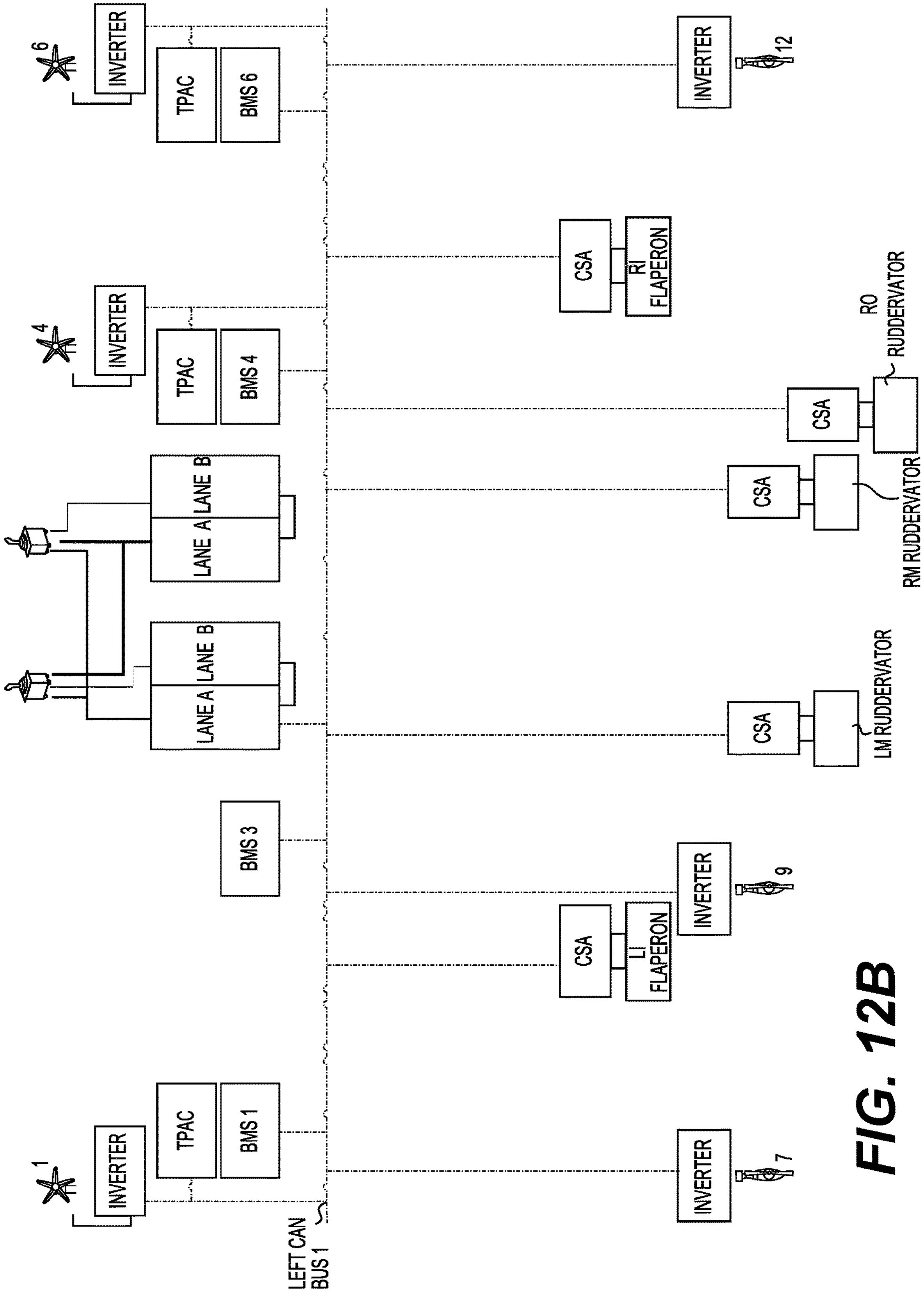

For example, with reference to FIG. 12B, Left CAN bus 1 may provide control signals to Inverters 1 and 12; 4 and 9; and 6 and 7, so that a failure of this bus may result in substantially symmetric loss of lift or thrust on opposite sides of the aircraft. For example, a failure of Left CAN bus 1 will likely result in EPU 1 and EPU 12 both going offline simultaneously, resulting in substantially symmetric loss of lift with respect to roll and/or pitch of the aircraft. Similarly, failure of Left CAN bus 1 will likely result in EPU 4 and EPU 9 both going offline simultaneously, resulting in substantially symmetric loss of lift with respect to roll and/or pitch of the aircraft. Similarly, failure of Left CAN bus 1 will likely result in EPU 6 and EPU 7 both going offline simultaneously, resulting in substantially symmetric loss of lift with respect to roll and/or pitch of the aircraft. Further, failure of Left CAN bus 1 will likely result in LI flaperon and RI flaperon both going offline simultaneously, resulting in substantially symmetric loss of control with respect to roll and/or pitch of the aircraft. Failure of Left CAN bus 1 will likely result in LM ruddervator, RM ruddervator, and RO ruddervator all going offline simultaneously, resulting in substantially asymmetric loss of control with respect to yaw and/or pitch of the aircraft. For example, failure of Left CAN bus 1 will likely result in loss of control of TPACs 1, 4, and 6, resulting in substantially asymmetric loss of control with respect to roll and/or pitch of the aircraft.

Figure 12C:
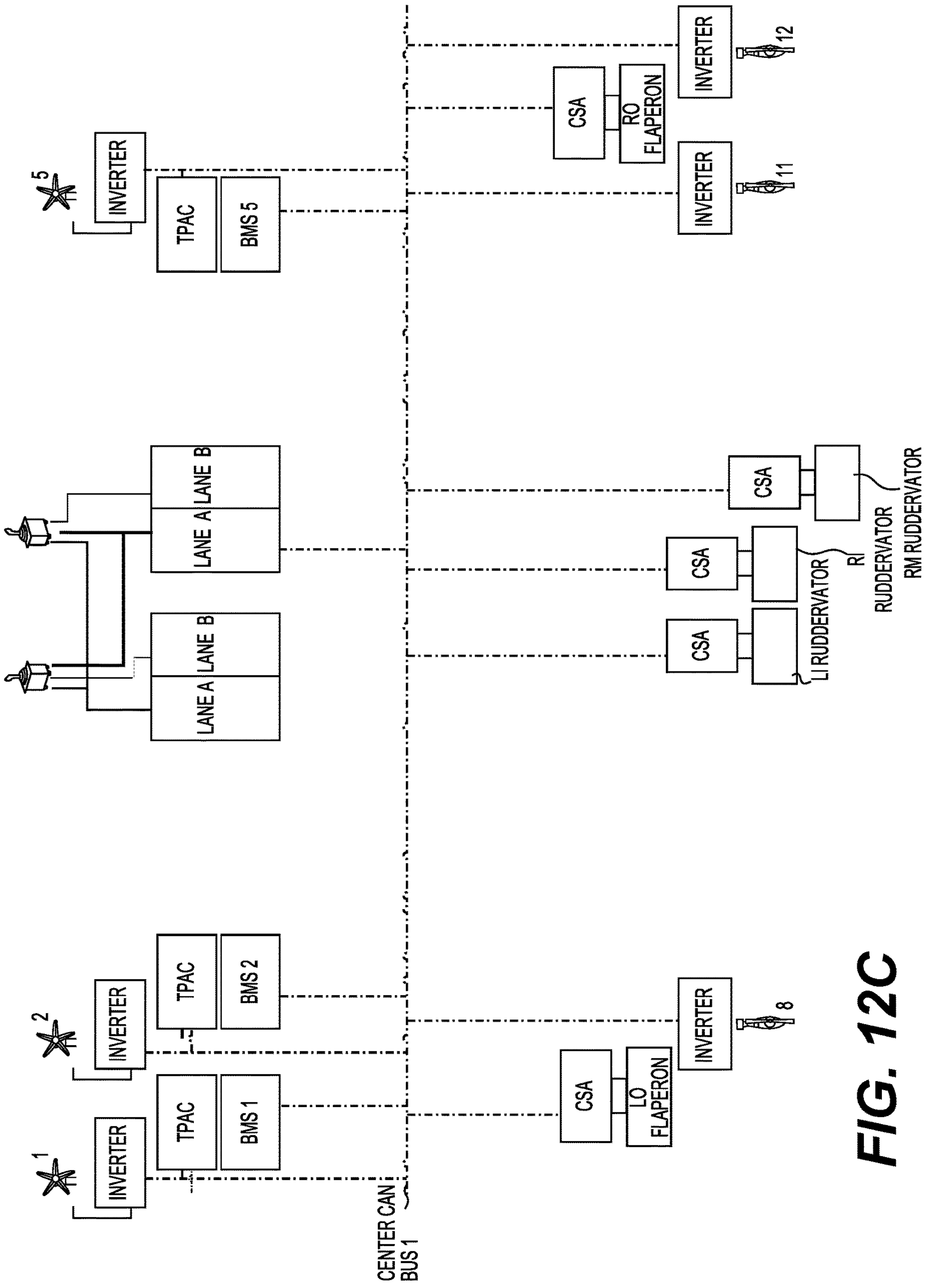

Similarly, with reference to FIG. 12C, Center CAN bus 1 may provide control signals to Inverters 1 and 12; 2 and 11; and 5 and 8, so that a failure of this bus may result in substantially symmetric loss of lift or thrust on opposite sides of the aircraft. For example, a failure of Center CAN bus 1 will likely result in EPU 1 and EPU 12 both going offline simultaneously, resulting in substantially symmetric loss of lift with respect to roll and/or pitch of the aircraft. Similarly, failure of Center CAN bus 1 will likely result in EPU 2 and EPU 11 both going offline simultaneously, resulting in substantially symmetric loss of lift with respect to roll and/or pitch of the aircraft. Similarly, failure of Center CAN bus 1 will likely result in EPU 5 and EPU 8 both going offline simultaneously, resulting in substantially symmetric loss of lift with respect to roll and/or pitch of the aircraft. Further, failure of Center CAN bus 1 will likely result in LO flaperon and RO flaperon both going offline simultaneously, resulting in substantially symmetric loss of control with respect to roll and/or pitch of the aircraft. Failure of Center CAN bus 1 will likely result in LI ruddervator, RI ruddervator, and RM ruddervator all going offline simultaneously, resulting in substantially asymmetric loss of control with respect to yaw and/or pitch of the aircraft. For example, failure of Center CAN bus 1 will likely result in loss of control of TPACs 1, 2, and 5, resulting in substantially asymmetric loss of control with respect to roll and/or pitch of the aircraft.

Figure 12D:
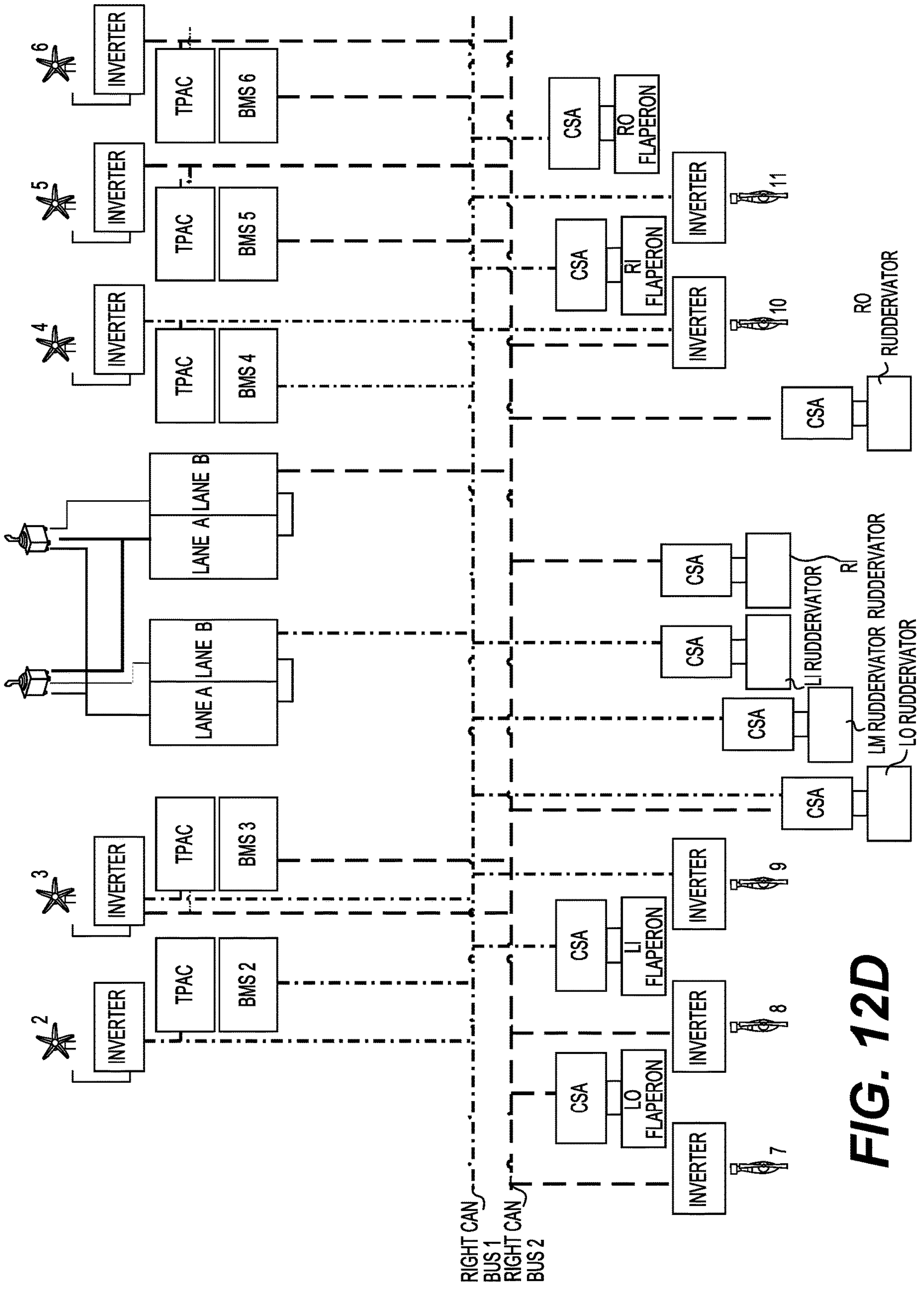

Similarly, with reference to FIG. 12D, Right CAN bus 1 may provide control signals to Inverters 2 and 11; 3 and 10; and 4 and 9, so that a failure of this bus may result in substantially symmetric loss of lift or thrust on opposite sides of the aircraft. For example, a failure of Right CAN bus 1 will likely result in EPU 2 and EPU 11 both going offline simultaneously, resulting in substantially symmetric loss of lift with respect to roll and/or pitch of the aircraft. Similarly, failure of Right CAN bus 1 will likely result in EPU 3 and EPU 10 both going offline simultaneously, resulting in substantially symmetric loss of lift with respect to roll and/or pitch of the aircraft. Similarly, failure of Right CAN bus 1 will likely result in EPU 4 and EPU 9 both going offline simultaneously, resulting in substantially symmetric loss of lift with respect to roll and/or pitch of the aircraft. Failure of Right CAN bus 1 will likely result in LI flaperon and RI flaperon both going offline simultaneously, resulting in substantially symmetric loss of control with respect to roll and/or pitch of the aircraft. Further, failure of Right CAN bus 1 will likely result in LO ruddervator, LM ruddervator, and LI ruddervator all going offline simultaneously, resulting in substantially asymmetric loss of control with respect to yaw and/or pitch of the aircraft. For example, failure of Right CAN bus 1 will likely result in loss of control of TPACs 2, 3, and 4, resulting in substantially asymmetric loss of control with respect to roll and/or pitch of the aircraft.

Similarly, with reference to FIG. 12D, Right CAN bus 2 may provide control signals to Inverters 3 and 10; 5 and 8; and 6 and 7, so that a failure of this bus may result in substantially symmetric loss of lift or thrust on opposite sides of the aircraft. For example, a failure of Right CAN bus 2 will likely result in EPU 3 and EPU 10 both going offline simultaneously, resulting in substantially symmetric loss of lift with respect to roll and/or pitch of the aircraft. Similarly, failure of Right CAN bus 2 will likely result in EPU 5 and EPU 8 both going offline simultaneously, resulting in substantially symmetric loss of lift with respect roll and/or pitch of the aircraft. Similarly, failure of Right CAN bus 2 will likely result in EPU 6 and EPU 7 both going offline simultaneously, resulting in substantially symmetric loss of lift with respect to roll and/or pitch of the aircraft. Failure of Right CAN bus 2 will likely result in LO flaperon and RI flaperon both going offline simultaneously, resulting in substantially asymmetric loss of control with respect to roll and/or pitch of the aircraft. Further, failure of Right CAN bus 2 will likely result in LO ruddervator, RI ruddervator, and RO ruddervator all going offline simultaneously, resulting in substantially asymmetric loss of control with respect to yaw and/or pitch of the aircraft. For example, failure of Right CAN bus 2 will likely result in loss of control of TPACs 3, 5, and 6, resulting in substantially asymmetric loss of control with respect to roll and/or pitch of the aircraft.

With respect to the embodiment of FIG. 12A, such configurations as described above may provide the benefit that minimally acceptable control of the aircraft is may be achieved even with (1) loss of any 2 CAN buses, or (2) loss of any 2 FCCs. Further, the embodiment of FIG. 12A as described above may provide the benefit of less wire weight as compared to disclosed embodiments that utilize six CAN buses.

With respect to FIG. 12A, in an alternative embodiment, instead of L FCC-A providing control signals via Left CAN bus 1, L FCC-B providing control signals via Right CAN bus 1, R FCC-A providing control signals via Center CAN bus 1, and R FCC-B providing control signals via Right CAN bus 2, there may be an alternative configuration in which L FCC-A may provide control signals via Left CAN bus 1 and Center CAN bus 1, L FCC-B may provide control signals via Right CAN bus 1 and Right CAN bus 2, R FCC-A may provide control signals via Center CAN bus 1 and Right CAN bus 1, and R FCC-B may provide control signals via Left CAN bus 1 and Right CAN bus 2. This proposed alternative embodiment may provide the benefit that the aircraft is fully controllable even with (1) loss of any FCC, or (2) loss of any CAN bus. Further, minimally acceptable control may be achieved with such configurations even after (1) loss of any two of the CAN buses.

Figure 13A:
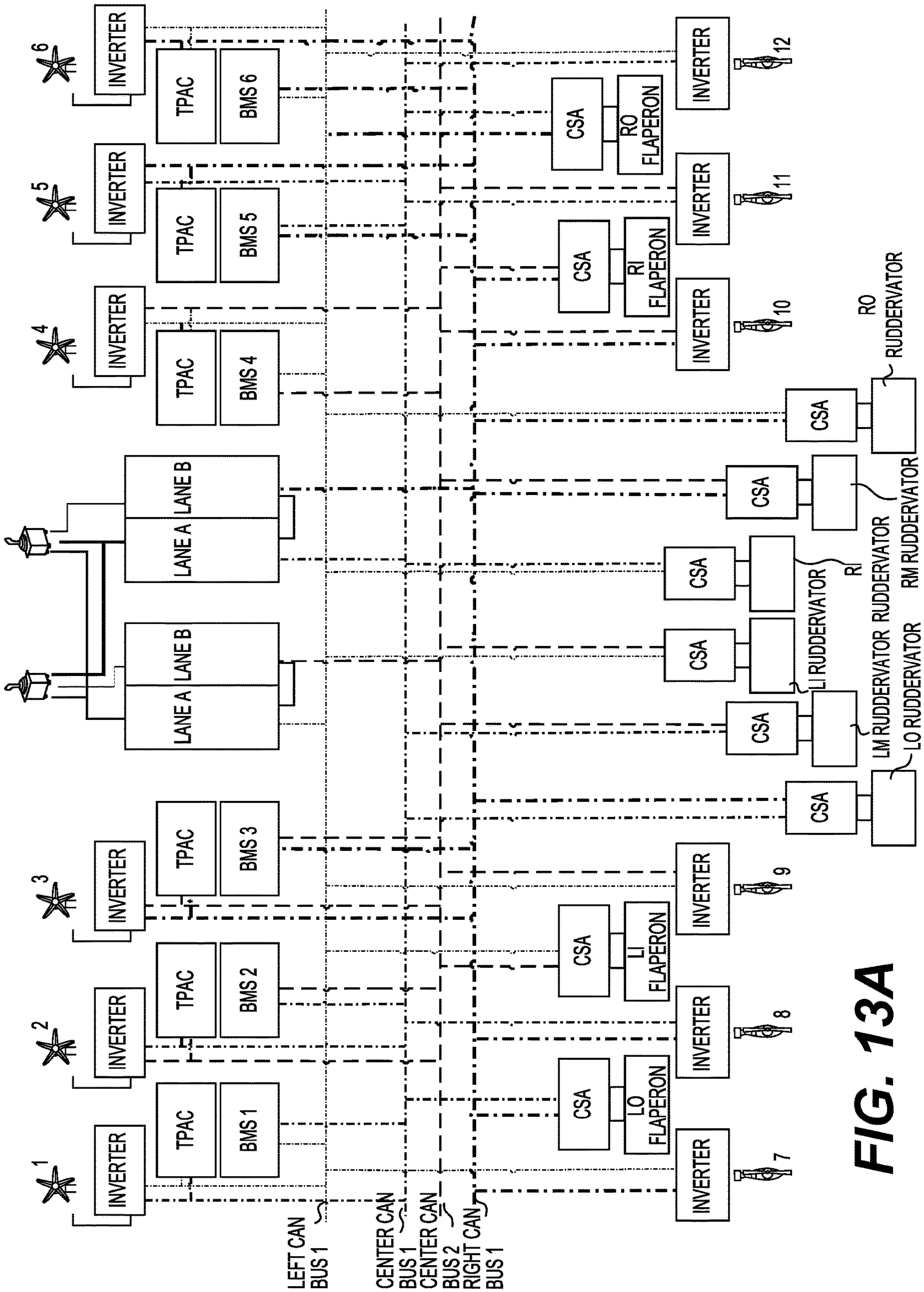

FIG. 13A illustrates another exemplary flight control signaling architecture for controlling the control surfaces and associated actuators, according to various embodiments. In the illustrated embodiment, L FCC-A may provide control signals via Left CAN bus 1, L FCC-B may provide control signals via Center CAN bus 2, R FCC-A may provide control signals via Center CAN bus 1, and R FCC-B may provide control signals via Right CAN bus 1.

Figure 13B:
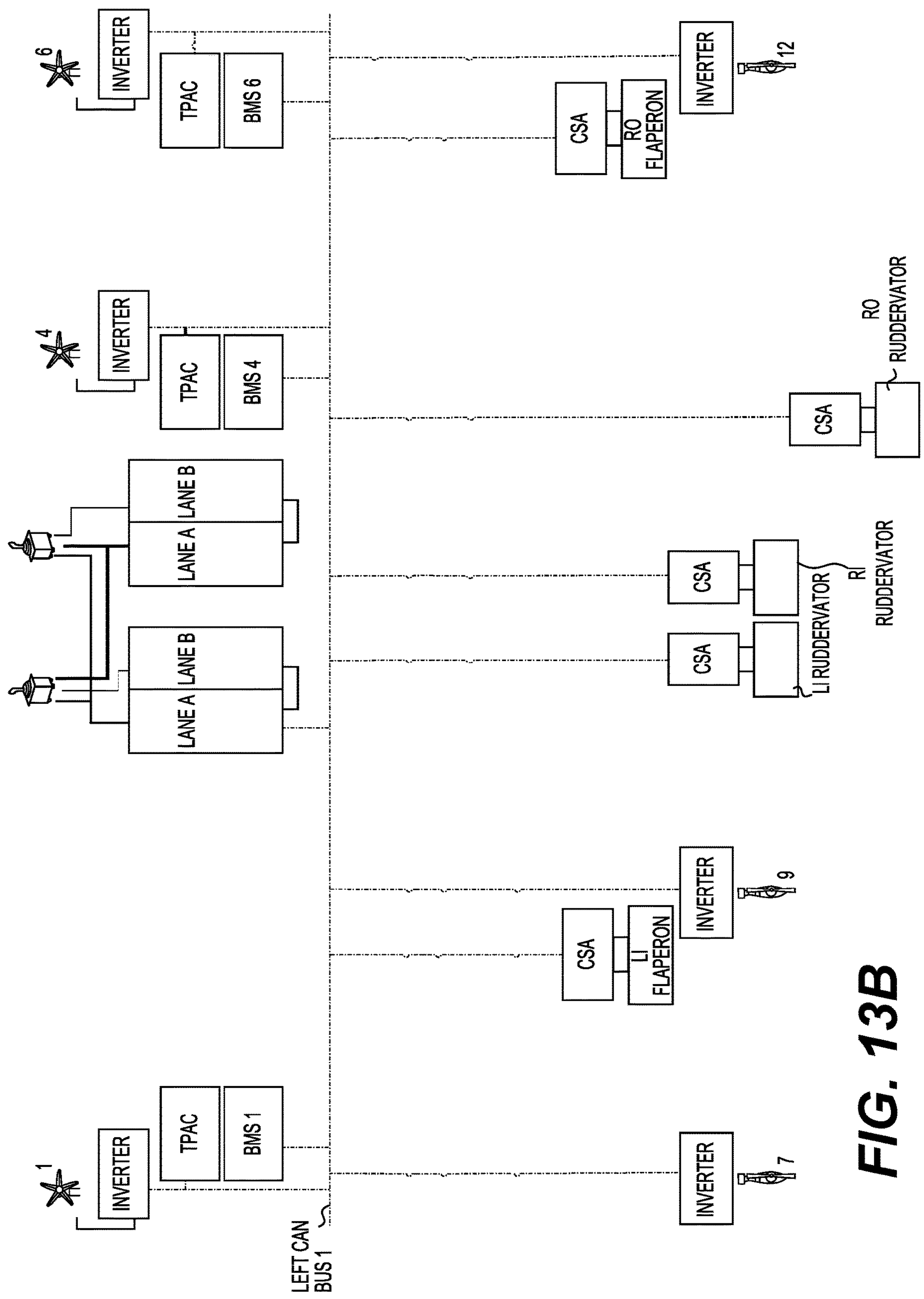

For example, with reference to FIG. 13B, Left CAN bus 1 may provide control signals to Inverters 1 and 12; 4 and 9; and 6 and 7, so that a failure of this bus may result in substantially symmetric loss of lift or thrust on opposite sides of the aircraft. For example, a failure of Left CAN bus 1 will likely result in EPU 1 and EPU 12 both going offline simultaneously, resulting in substantially symmetric loss of lift with respect to roll and/or pitch of the aircraft. Similarly, failure of Left CAN bus 1 will likely result in EPU 4 and EPU 9 both going offline simultaneously, resulting in substantially symmetric loss of lift with respect to roll and/or pitch of the aircraft. Similarly, failure of Left CAN bus 1 will likely result in EPU 6 and EPU 7 both going offline simultaneously, resulting in substantially symmetric loss of lift with respect to roll and/or pitch of the aircraft. Failure of Left CAN bus 1 will likely result in LI flaperon and RO flaperon both going offline simultaneously, resulting in substantially asymmetric loss of control with respect to roll and/or pitch of the aircraft. Further, failure of Left CAN bus 1 will likely result in LI ruddervator, RI ruddervator, and RO ruddervator all going offline simultaneously, resulting in substantially asymmetric loss of control with respect to yaw and/or pitch of the aircraft. For example, failure of Left CAN bus 1 may result in TPACs 1, 4, and 6 all going offline simultaneously, resulting in substantially asymmetric loss of control with respect to roll and/or pitch of the aircraft.

Figure 13C:
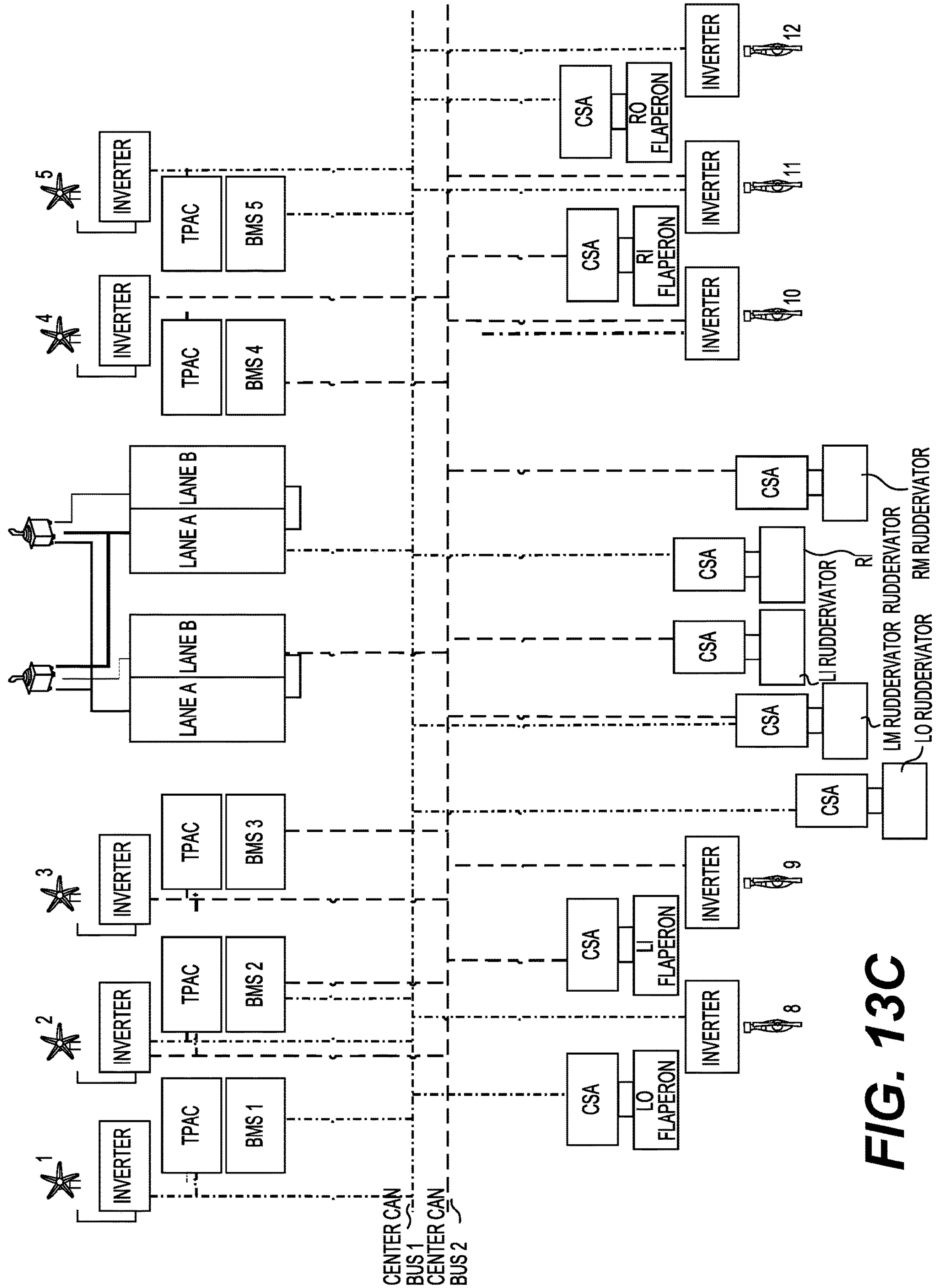

Similarly, with reference to FIG. 13C, Center CAN bus 1 may provide control signals to Inverters 1 and 12; 2 and 11; and 5 and 8, so that a failure of this bus may result in substantially symmetric loss of lift or thrust on opposite sides of the aircraft. For example, a failure of Center CAN bus 1 will likely result in EPU 1 and EPU 12 both going offline simultaneously, resulting in substantially symmetric loss of lift with respect to roll and/or pitch of the aircraft. Similarly, failure of Center CAN bus 1 will likely result in EPU 2 and EPU 11 both going offline simultaneously, resulting in substantially symmetric loss of lift with respect to roll and/or pitch of the aircraft. Similarly, failure of Center CAN bus 1 will likely result in EPU 5 and EPU 8 both going offline simultaneously, resulting in substantially symmetric loss of lift with respect to roll and/or pitch of the aircraft. Further, failure of Center CAN bus 1 will likely result in LO flaperon and RO flaperon both going offline simultaneously, resulting in substantially symmetric loss of control with respect to roll and/or pitch of the aircraft. Failure of Center CAN bus 1 will likely result in LO ruddervator, LM ruddervator, and RI ruddervator all going offline simultaneously, resulting in substantially asymmetric loss of control with respect to yaw and/or pitch of the aircraft. For example, failure of Center CAN bus 1 may result in TPACs 1, 2, and 5 all going offline simultaneously, resulting in substantially asymmetric loss of control with respect to roll and/or pitch of the aircraft.

Similarly, with reference to FIG. 13C, Center CAN bus 2 may provide control signals to Inverters 2 and 11; 3 and 10; and 4 and 9, so that a failure of this bus may result in substantially symmetric loss of lift or thrust on opposite sides of the aircraft. For example, a failure of Center CAN bus 2 will likely result in EPU 2 and EPU 11 both going offline simultaneously, resulting in substantially symmetric loss of lift with respect to roll and/or pitch of the aircraft. Similarly, failure of Center CAN bus 2 will likely result in EPU 3 and EPU 10 both going offline simultaneously, resulting in substantially symmetric loss of lift with respect to roll and/or pitch of the aircraft. Similarly, failure of Center CAN bus 2 will likely result in EPU 4 and EPU 9 both going offline simultaneously, resulting in substantially symmetric loss of lift with respect to roll and/or pitch of the aircraft. Further, failure of Center CAN bus 2 will likely result in LI flaperon and RI flaperon both going offline simultaneously, resulting in substantially symmetric loss of control with respect to roll and/or pitch of the aircraft. Failure of Center CAN bus 2 will likely result in LM ruddervator, LI ruddervator, and RM ruddervator all going offline simultaneously, resulting in substantially asymmetric loss of control with respect to yaw and/or pitch of the aircraft. For example, failure of Center CAN bus 2 may result in TPACs 2, 3, and 4 all going offline simultaneously, resulting in substantially asymmetric loss of control with respect to roll and/or pitch of the aircraft.

Figure 13D:
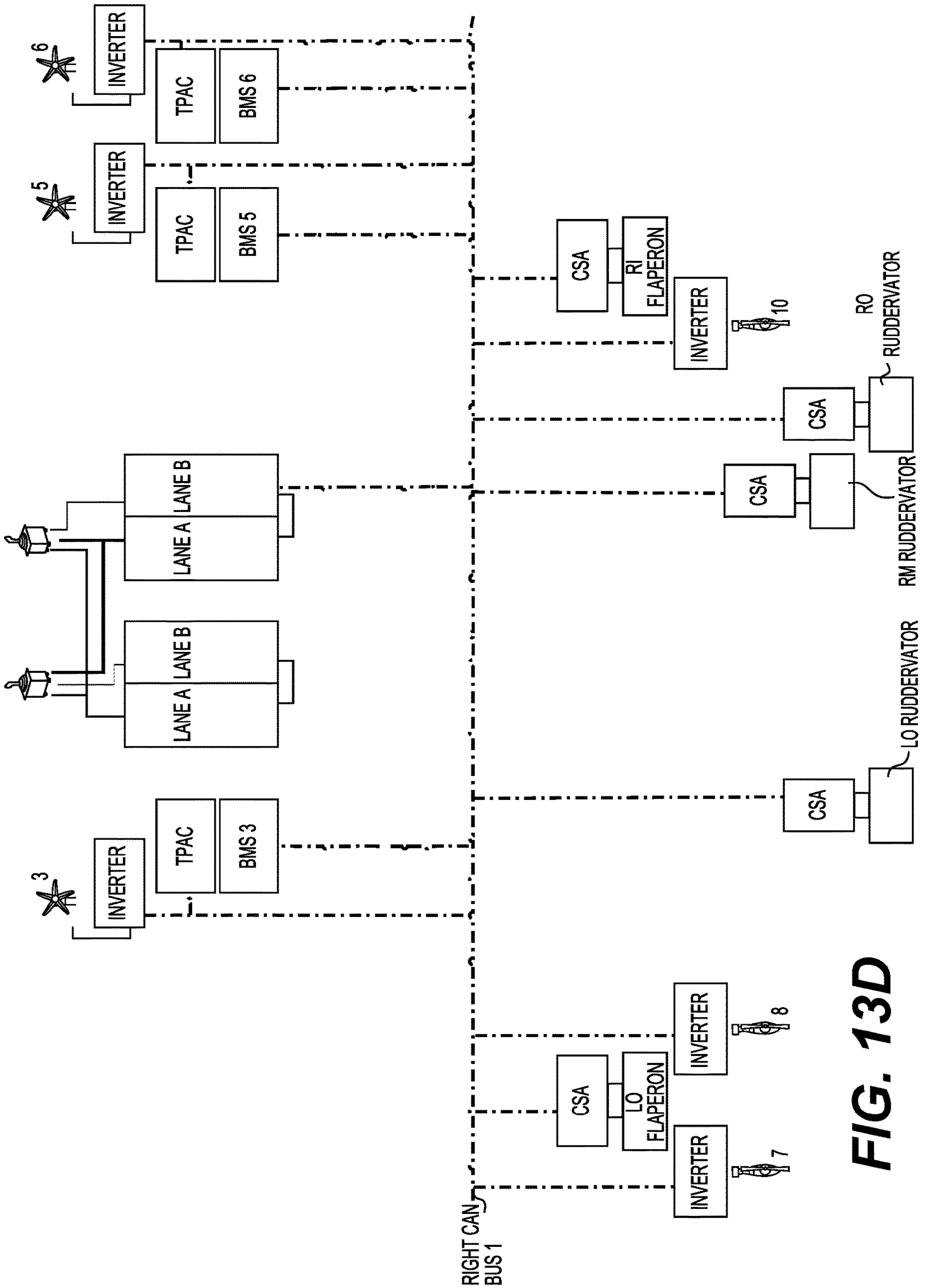

Similarly, with reference to FIG. 13D, Right CAN bus 1 may provide control signals to Inverters 3 and 10; 5 and 8; and 6 and 7, so that a failure of this bus may result in substantially symmetric loss of lift or thrust on opposite sides of the aircraft. For example, a failure of Right CAN bus 1 will likely result in EPU 3 and EPU 10 both going offline simultaneously, resulting in substantially symmetric loss of lift with respect to roll and/or pitch of the aircraft. Similarly, failure of Right CAN bus 1 will likely result in EPU 5 and EPU 8 both going offline simultaneously, resulting in substantially symmetric loss of lift with respect to roll and/or pitch of the aircraft. Similarly, failure of Right CAN bus 1 will likely result in EPU 6 and EPU 7 both going offline simultaneously, resulting in substantially symmetric loss of lift with respect to roll and/or pitch of the aircraft. Failure of Right CAN bus 1 will likely result in LO flaperon and RI flaperon both going offline simultaneously, resulting in substantially asymmetric loss of control with respect to roll and/or pitch of the aircraft. Further, failure of Right CAN bus 1 will likely result in LO ruddervator, RM ruddervator, and RO ruddervator all going offline simultaneously, resulting in substantially asymmetric loss of control with respect to yaw and/or pitch of the aircraft. For example, failure of Right CAN bus 1 may result in TPACs 3, 5, and 6 all going offline simultaneously, resulting in substantially asymmetric loss of control with respect to roll and/or pitch of the aircraft.

With respect to the embodiment of FIG. 13A, such configurations as described above may provide the benefit that minimally acceptable control of the aircraft may be achieved even after (1) loss of any 2 CAN buses, or (2) loss of any 2 FCCs. Further, the embodiment of FIG. 13A as described above may provide the benefit of less wire weight as compared to disclosed embodiments that utilize six CAN buses.

Additional aspects of the present disclosure may be further described via the following clauses:

1. An aircraft, comprising:
   - a fuselage;
   - one or more flight control computers configured to provide control signals;
   - two wing-like structures, the wing-like structures extending on opposite sides of the fuselage;
   - a first set of electrically powered propellers configured to be disposed aft of the wing-like structures and on opposite sides of the fuselage;
   - a second set of electrically powered propellers configured to be disposed forward of the wing-like structures and on opposite sides of the fuselage; and
   - a plurality of electrical buses coupled to the one or more flight control computers;
   - wherein the one or more flight control computers are configured to provide control signals for at least one of the first set of propellers mounted to one of the wing-like structures and one of the second set of propellers mounted to the other wing-like structure via the same electrical bus.

2. The aircraft of clause 1, wherein the wing-like structures are selected from the group consisting of: wings, canards, stabilizers, and winglets.

3. The aircraft of clause 1, wherein the first set of propellers are tiltable between vertical lift and forward propulsion configurations.

4. The aircraft of clause 1, wherein the second set of propellers are tiltable between vertical lift and forward propulsions configuration.

5. The aircraft of clause 3, wherein the first set of propellers are configured to provide vertical lift.

6. The aircraft of clause 4, wherein the second set of propellers are configured to provide vertical lift.

7. The aircraft of clause 1, wherein the first set of propellers are mounted to the wing-like structures via booms.

8. The aircraft of clause 1, wherein the plurality of electrical buses are further configured such that:
   - at least the propellers in the first set of propellers disposed on opposite sides and farthest from the fuselage are provided control signals via the same electrical bus.

9. The aircraft of clause 1, wherein the plurality of electrical buses are further configured such that
   - at least the propellers in the first set of propellers disposed on opposite sides and nearest from the fuselage are provided control signals via the same electrical bus.

10. The aircraft of clause 1, wherein the plurality of electrical buses are further configured such that:
    - at least the propellers in the first set of propellers disposed on opposite sides and disposed between the nearest- and farthest-disposed propellers in the first set of propellers are provided control signals via the same electrical bus.

11. The aircraft of clause 10, wherein the first set of propellers are symmetrical about an axis along a length of the fuselage.

12. The aircraft of clause 1, wherein the second set of propellers are mounted to the wing-like structures via booms.

13. The aircraft of clause 1, wherein the plurality of electrical buses are further configured such that:
    - at least the propellers in the second set of propellers disposed on opposite sides and farthest from the fuselage are provided control signals via the same electrical bus.

14. The aircraft of clause 1, wherein the plurality of electrical buses are further configured such that:
    - at least the propellers in the second set of propellers disposed on opposite sides and nearest from the fuselage are provided control signals via the same electrical bus.

15. The aircraft of clause 1, wherein the plurality of electrical buses are further configured such that:
    - at least the propellers in the second set of propellers disposed on opposite sides and disposed between the nearest- and farthest-disposed propellers in the second set of propellers are provided control signals via the same electrical bus.

16. The aircraft of clause 15, wherein the second set of propellers are symmetrical about an axis along a length of the fuselage.

17. The aircraft of clause 1,
    - wherein a number of first set of propellers is six, three of the first set of propellers mounted to one of the wing-like structures and the other three of the first set of propellers mounted to the other wing-like structure; and
    - wherein a number of second set of propellers is six, three of the second set of propellers mounted to one of the wing-like structures and the other three second set of propellers mounted to the other wing-like structure.

18. The aircraft of clause 1, wherein the plurality of electrical buses are further configured such that:
    - at least one of the first set of propellers mounted farthest from the fuselage to one of the wing-like structures and at least one of the second set of propellers mounted farthest from the fuselage to the other wing-like structure are provided control signals via the same electrical bus.

19. The aircraft of clause 1, wherein the plurality of electrical buses are further configured such that:
    - at least one of the first set of propellers mounted nearest to the fuselage to one of the wing-like structures and at least one of the second set of propellers mounted nearest to the fuselage to the other wing-like structure are provided control signals via the same electrical bus.

20. The aircraft of clause 1, wherein the plurality of electrical buses are further configured such that:
    - at least one of the first set of propellers mounted between the propeller in the first set of propellers mounted farthest from the fuselage to one of the wing-like structures and the propeller in the first set of propellers mounted nearest from the fuselage to that same wing-like structure and at least one of the second set of propellers mounted between the propeller in the second set of propellers mounted farthest from the fuselage to the other wing-like structure and the propeller in the second set of propellers mounted nearest from the fuselage to that same wing-like structure are provided control signals via the same electrical bus.

21. The aircraft of clause 1, wherein the at least one of the first set of propellers mounted between the propeller in the first set of propellers mounted farthest from the fuselage to one of the wing-like structures and the propeller in the first set of propellers mounted nearest from the fuselage to that same wing-like structure, and the at least one of the second set of propellers mounted between the propeller in the second set of propellers mounted farthest from the fuselage to the other wing-like structure and the propeller in the second set of propellers mounted nearest from the fuselage to the other wing-like structure are disposed symmetrically with respect to an axis along a length of the fuselage.

22. The aircraft of clause 1, further comprising:

a plurality of tilt propeller actuators configured to tilt the propellers between vertical lift and forward propulsion configurations, the tilt propeller actuators mounted to the wing-like structures and configured to be disposed on opposite sides of the fuselage.

23. The aircraft of clause 22, wherein the tilt propeller actuators are mounted to the wing-like structures via booms.

24. The aircraft of clause 22, wherein the plurality of electrical buses are further configured such that:

at least the tilt propeller actuators disposed on opposite sides and farthest from the fuselage are provided control signals via the same electrical bus.

25. The aircraft of clause 22, wherein the plurality of electrical buses are further configured such that:

at least the tilt propeller actuators disposed on opposite sides and nearest from the fuselage are provided control signals via the same electrical bus.

26. The aircraft of clause 22, wherein the plurality of electrical buses are further configured such that:

at least the tilt propeller actuators disposed on opposite sides and disposed between the nearest- and farthest-disposed tilt propeller actuators are provided control signals via the same electrical bus.

27. The aircraft of clause 26, wherein the tilt propeller actuators are symmetrical about an axis along a length of the fuselage.

28. The aircraft of clause 22, wherein a number of tilt propeller actuators is six, three of the tilt propeller actuators mounted to one of the wing-like structures and the other three tilt propeller actuators mounted to the other wing-like structure.

29. The aircraft of clause 1, further comprising:

a plurality of flaperon actuators mounted to the wing-like structures and configured to be disposed on opposite sides of the fuselage.

30. The aircraft of clause 29, wherein the plurality of electrical buses are further configured such that:

at least one of the flaperon actuators mounted to one of the wing-like structures and one of the flaperon actuators mounted to the other wing-like structure are provided control signals via the same electrical bus.

31. The aircraft of clause 29, wherein the plurality of electrical buses are further configured such that:

at least one of the flaperon actuators mounted to one of the wing-like structures and one of the flaperon actuators mounted to the other wing-like structure are provided control signals via different electrical buses.

32. The aircraft of clause 29, wherein the plurality of electrical buses are further configured such that:

at least the flaperon actuators disposed on opposite sides and farthest from the fuselage are provided control signals via different electrical buses.

33. The aircraft of clause 29, wherein the plurality of electrical buses are further configured such that:

at least the flaperon actuators disposed on opposite sides and nearest to the fuselage are provided control signals via the same electrical bus.

34. The aircraft of clause 29, wherein a number of flaperon actuators is at least two, at least one of the flaperon actuators mounted to one of the wing-like structures and at least another of the flaperon actuators mounted to the other wing-like structure.

35. The aircraft of clause 34, wherein a number of flaperon actuators is four, two of the flaperon actuators mounted to one of the wing-like structures and the other two flaperon actuators mounted to the other wing-like structure.

36. The aircraft of clause 1, further comprising:

a plurality of ruddervator actuators disposed on opposite sides of the fuselage.

37. The aircraft of clause 36, wherein the ruddervator actuators are mounted to rear stabilizers.

38. The aircraft of clause 36, wherein the plurality of electrical buses are further configured such that:

at least the ruddervator actuators disposed on opposite sides and farthest from the fuselage are provided control signals via the same electrical bus.

39. The aircraft of clause 36, wherein the plurality of electrical buses are further configured such that:

at least the ruddervator actuators disposed on opposite sides and nearest from the fuselage are provided control signals via the same electrical bus.

40. The aircraft of clause 36, wherein the plurality of electrical buses are further configured such that:

at least the ruddervator actuators disposed on opposite sides and disposed between the nearest- and farthest-disposed ruddervator actuators are provided control signals via the same electrical bus.

41. The aircraft of clause 36, wherein a number of ruddervator actuators is at least two, at least one of the ruddervator actuators mounted to one of the rear stabilizers and at least another of the ruddervator actuators mounted to the another of the rear stabilizers.

42. The aircraft of clause 41, wherein a number of ruddervator actuators is six, three of the ruddervator actuators mounted to one of the rear stabilizers and the other three ruddervator actuators mounted to another of the rear stabilizers.

43. The aircraft of clause 1, wherein the plurality of electrical buses are further configured such that each propeller in the first set of propellers and each propeller in the second set of propellers may be provided control signals via a plurality of electrical buses.

44. A method for flight control, comprising:

providing control signals via at least one hardware processor included in an aircraft;

wherein the aircraft further includes:

a fuselage;

two wing-like structures, the wing-like structures extending on opposite sides of the fuselage;

a first set of electrically powered propellers configured to be disposed aft of the wing-like structures and on opposite sides of the fuselage;

a second set of electrically powered propellers configured to be disposed forward of the wing-like structures and on opposite sides of the fuselage; and a plurality of electrical buses coupled to the at least one hardware processor;

wherein providing the control signals via the at least one hardware processor further comprises:

providing, via the at least one hardware processor, the control signals for at least one of the first set of propellers mounted to one of the wing-like structures and one of the second set of propellers mounted to the other wing-like structure via the same electrical bus.

45. The method of clause 44, wherein providing the control signals via the at least one hardware processor further comprises:

providing, via the at least one hardware processor, the controls signals for at least the propellers in the first set of propellers disposed on opposite sides and farthest from the fuselage via the same electrical bus.

46. The method of clause 44, wherein providing the control signals via the at least one hardware processor further comprises:

providing, via the at least one hardware processor, the controls signals for at least the propellers in the first set of propellers disposed on opposite sides and nearest from the fuselage via the same electrical bus.

47. The method of clause 44, wherein providing the control signals via the at least one hardware processor further comprises:

providing, via the at least one hardware processor, the controls signals for at least the propellers in the first set of propellers disposed on opposite sides and disposed between the nearest- and farthest-disposed propellers in the first set of propellers via the same electrical bus.

48. The method of clause 44, wherein providing the control signals via the at least one hardware processor further comprises:

providing, via the at least one hardware processor, the controls signals for at least the propellers in the second set of propellers disposed on opposite sides and farthest from the fuselage via the same electrical bus.

49. The method of clause 44, wherein providing the control signals via the at least one hardware processor further comprises:

providing, via the at least one hardware processor, the controls signals for at least the propellers in the second set of propellers disposed on opposite sides and nearest from the fuselage via the same electrical bus.

50. The method of clause 44, wherein providing the control signals via the at least one hardware processor further comprises:

providing, via the at least one hardware processor, the controls signals for at least the propellers in the second set of propellers disposed on opposite sides and disposed between the nearest- and farthest-disposed propellers in the second set of propellers via the same electrical bus.

51. The method of clause 44, wherein providing the control signals via the at least one hardware processor further comprises:

providing, via the at least one hardware processor, the controls signals for at least one of the first set of propellers mounted farthest from the fuselage to one of the wing-like structures and at least one of the second set of propellers mounted farthest from the fuselage to the other wing-like structure via the same electrical bus.

52. The method of clause 44, wherein providing the control signals via the at least one hardware processor further comprises:

providing, via the at least one hardware processor, the controls signals for at least one of the first set of propellers mounted nearest to the fuselage to one of the wing-like structures and at least one of the second set of propellers mounted nearest to the fuselage to the other wing-like structure via the same electrical bus.

53. The method of clause 44, wherein providing the control signals via the at least one hardware processor further comprises:

providing, via the at least one hardware processor, the controls signals for at least one of the first set of propellers mounted between the propeller in the first set of propellers mounted farthest from the fuselage to one of the wing-like structures and the propeller in the first set of propellers mounted nearest from the fuselage to that same wing-like structure and at least one of the second set of propellers mounted between the propeller in the second set of propellers mounted farthest from the fuselage to the other wing-like structure and the propeller in the second set of propellers mounted nearest from the fuselage to that same wing-like structure via the same electrical bus.

54. The method of clause 44, wherein providing the aircraft further includes:

a plurality of tilt propeller actuators configured to tilt the propellers between vertical lift and forward propulsion configurations, the tilt propeller actuators mounted to the wing-like structures and configured to be disposed on opposite sides of the fuselage.

55. The method of clause 54, wherein providing the control signals via the at least one hardware processor further comprises:

providing, via the at least one hardware processor, the controls signals for at least the tilt propeller actuators disposed on opposite sides and farthest from the fuselage via the same electrical bus.

56. The method of clause 54, wherein providing the control signals via the at least one hardware processor further comprises:

providing, via the at least one hardware processor, the controls signals for at least the tilt propeller actuators disposed on opposite sides and nearest from the fuselage via the same electrical bus.

57. The method of clause 54, wherein providing the control signals via the at least one hardware processor further comprises:

providing, via the at least one hardware processor, the controls signals for at least the tilt propeller actuators disposed on opposite sides and disposed between the nearest- and farthest-disposed tilt propeller actuators via the same electrical bus.

58. The method of clause 44, wherein the aircraft further includes:

a plurality of flaperon actuators mounted to the wing-like structures and configured to be disposed on opposite sides of the fuselage.

59. The method of clause 58, wherein providing the control signals via the at least one hardware processor further comprises:

providing, via the at least one hardware processor, the controls signals for at least one of the flaperon actuators mounted to one of the wing-like structures and one of the flaperon actuators mounted to the other wing-like structure via the same electrical bus.

60. The method of clause 58, wherein providing the control signals via the at least one hardware processor further comprises:

providing, via the at least one hardware processor, the controls signals for at least one of the flaperon actuators mounted to one of the wing-like structures and one of the flaperon actuators mounted to the other wing-like structure via different electrical buses.

61. The method of clause 58, wherein providing the control signals via the at least one hardware processor further comprises:

providing, via the at least one hardware processor, the controls signals for at least the flaperon actuators disposed on opposite sides and farthest from the fuselage via different electrical buses.

62. The method of clause 58, wherein providing the control signals via the at least one hardware processor further comprises:

providing, via the at least one hardware processor, the controls signals for at least the flaperon actuators disposed on opposite sides and nearest from the fuselage via different electrical buses.

63. The method of clause 58, wherein providing the control signals via the at least one hardware processor further comprises:

providing, via the at least one hardware processor, the controls signals for at least the flaperon actuators disposed on opposite sides and nearest to the fuselage via different electrical buses.

64. The method of clause 44, wherein the aircraft further includes:

a plurality of ruddervator actuators disposed on opposite sides of the fuselage.

65. The method of clause 64, wherein providing the control signals via the at least one hardware processor further comprises:

providing, via the at least one hardware processor, the controls signals for at least the ruddervator actuators disposed on opposite sides and farthest from the fuselage via the same electrical bus.

66. The method of clause 64, wherein providing the control signals via the at least one hardware processor further comprises:

providing, via the at least one hardware processor, the controls signals for at least the ruddervator actuators disposed on opposite sides and nearest from the fuselage via the same electrical bus.

67. The method of clause 64, wherein providing the control signals via the at least one hardware processor further comprises:

providing, via the at least one hardware processor, the controls signals for at least the ruddervator actuators disposed on opposite sides and disposed between the nearest- and farthest-disposed ruddervator actuators via the same electrical bus.

68. The method of clause 55, wherein providing the control signals via the at least one hardware processor further comprises:

providing, via the at least one hardware processor, the controls signals for each propeller in the first set of propellers and each propeller in the second set of propellers via a plurality of electrical buses.

69. A flight control computer, comprising:

at least one hardware processor, the at least one hardware processor included in an aircraft; and at least one non-transitory processor-readable medium tangibly storing instructions executable by the at least one hardware processor for:

providing control signals via the at least one hardware processor;

wherein the aircraft further includes:

a fuselage;

two wing-like structures, the wing-like structures extending on opposite sides of the fuselage;

a first set of electrically powered propellers configured to be disposed aft of the wing-like structures and on opposite sides of the fuselage;

a second set of electrically powered propellers configured to be disposed forward of the wing-like structures and on opposite sides of the fuselage; and a plurality of electrical buses coupled to the at least one hardware processor;

wherein providing the control signals via the at least one hardware processor further comprises:

providing, via the at least one hardware processor, the control signals for at least one of the first set of propellers mounted to one of the wing-like structures and one of the second set of propellers mounted to the other wing-like structure via the same electrical bus.

70. The flight control computer of clause 69, wherein providing the control signals via the at least one hardware processor further comprises:

providing, via the at least one hardware processor, the controls signals for at least the propellers in the first set of propellers disposed on opposite sides and farthest from the fuselage via the same electrical bus.

71. The flight control computer of clause 69, wherein providing the control signals via the at least one hardware processor further comprises:

providing, via the at least one hardware processor, the controls signals for at least the propellers in the first set of propellers disposed on opposite sides and nearest from the fuselage via the same electrical bus.

72. The flight control computer of clause 69, wherein providing the control signals via the at least one hardware processor further comprises:

providing, via the at least one hardware processor, the controls signals for at least the propellers in the first set of propellers disposed on opposite sides and disposed between the nearest- and farthest-disposed propellers in the first set of propellers via the same electrical bus.

73. The flight control computer of clause 69, wherein providing the control signals via the at least one hardware processor further comprises:

providing, via the at least one hardware processor, the controls signals for at least the propellers in the second set of propellers disposed on opposite sides and farthest from the fuselage via the same electrical bus.

74. The flight control computer of clause 69, wherein providing the control signals via the at least one hardware processor further comprises:

providing, via the at least one hardware processor, the controls signals for at least the propellers in the second set of propellers disposed on opposite sides and nearest from the fuselage via the same electrical bus.

75. The flight control computer of clause 69, wherein providing the control signals via the at least one hardware processor further comprises:

providing, via the at least one hardware processor, the controls signals for at least the propellers in the second set of propellers disposed on opposite sides and disposed between the nearest- and farthest-disposed propellers in the second set of propellers via the same electrical bus.

76. The flight control computer of clause 69, wherein providing the control signals via the at least one hardware processor further comprises:

providing, via the at least one hardware processor, the controls signals for at least one of the first set of propellers mounted farthest from the fuselage to one of the wing-like structures and at least one of the second set of propellers mounted farthest from the fuselage to the other wing-like structure via the same electrical bus.

77. The flight control computer of clause 69, wherein providing the control signals via the at least one hardware processor further comprises:

providing, via the at least one hardware processor, the controls signals for at least one of the first set of propellers mounted nearest to the fuselage to one of the wing-like structures and at least one of the second set of propellers mounted nearest to the fuselage to the other wing-like structure via the same electrical bus.

78. The flight control computer of clause 69, wherein providing the control signals via the at least one hardware processor further comprises:

providing, via the at least one hardware processor, the controls signals for at least one of the first set of propellers mounted between the propeller in the first set of propellers mounted farthest from the fuselage to one of the wing-like structures and the propeller in the first set of propellers mounted nearest from the fuselage to that same wing-like structure and at least one of the second set of propellers mounted between the propeller in the second set of propellers mounted farthest from the fuselage to the other wing-like structure and the propeller in the second set of propellers mounted nearest from the fuselage to that same wing-like structure via the same electrical bus.

79. The flight control computer of clause 69, wherein the aircraft further includes:

a plurality of tilt propeller actuators that tilt propellers between vertical lift and forward propulsion configurations, the tilt propeller actuators mounted to the wing-like structures and configured to be disposed on opposite sides of the fuselage.

80. The flight control computer of clause 79, wherein providing the control signals via the at least one hardware processor further comprises:

providing, via the at least one hardware processor, the controls signals for at least the tilt propeller actuators disposed on opposite sides and farthest from the fuselage via the same electrical bus.

81. The flight control computer of clause 79, wherein providing the control signals via the at least one hardware processor further comprises:

providing, via the at least one hardware processor, the controls signals for at least the tilt propeller actuators disposed on opposite sides and nearest from the fuselage via the same electrical bus.

82. The flight control computer of clause 79, wherein providing the control signals via the at least one hardware processor further comprises:

providing, via the at least one hardware processor, the controls signals for at least the tilt propeller actuators disposed on opposite sides and disposed between the nearest- and farthest-disposed tilt propeller actuators via the same electrical bus.

83. The flight control computer of clause 69, wherein the aircraft further includes:

a plurality of flaperon actuators mounted to the wing-like structures and configured to be disposed on opposite sides of the fuselage.

84. The flight control computer of clause 83, wherein providing the control signals via the at least one hardware processor further comprises:

providing, via the at least one hardware processor, the controls signals for at least one of the flaperon actuators mounted to one of the wing-like structures and one of the flaperon actuators mounted to the other wing-like structure via the same electrical bus.

85. The flight control computer of clause 83, wherein providing the control signals via the at least one hardware processor further comprises:

providing, via the at least one hardware processor, the controls signals for at least one of the flaperon actuators mounted to one of the wing-like structures and one of the flaperon actuators mounted to the other wing-like structure via different electrical buses.

86. The flight control computer of clause 83, wherein providing the control signals via the at least one hardware processor further comprises:

providing, via the at least one hardware processor, the controls signals for at least the flaperon actuators disposed on opposite sides and farthest from the fuselage via different electrical buses.

87. The flight control computer of clause 83, wherein providing the control signals via the at least one hardware processor further comprises:

providing, via the at least one hardware processor, the controls signals for at least the flaperon actuators disposed on opposite sides and nearest from the fuselage via different electrical buses.

88. The flight control computer of clause 83, wherein providing the control signals via the at least one hardware processor further comprises:

providing, via the at least one hardware processor, the controls signals for at least the flaperon actuators disposed on opposite sides and nearest to the fuselage via different electrical buses.

89. The flight control computer of clause 69, wherein the aircraft further includes:

a plurality of ruddervator actuators disposed on opposite sides of the fuselage.

90. The flight control computer of clause 89, wherein providing the control signals via the at least one hardware processor further comprises:

providing, via the at least one hardware processor, the controls signals for at least the ruddervator actuators disposed on opposite sides and farthest from the fuselage via the same electrical bus.

91. The flight control computer of clause 89, wherein providing the control signals via the at least one hardware processor further comprises:

providing, via the at least one hardware processor, the controls signals for at least the ruddervator actuators disposed on opposite sides and nearest from the fuselage via the same electrical bus.

92. The flight control computer of clause 89, wherein providing the control signals via the at least one hardware processor further comprises:

providing, via the at least one hardware processor, the controls signals for at least the ruddervator actuators disposed on opposite sides and disposed between the nearest- and farthest-disposed ruddervator actuators via the same electrical bus.

93. The flight control computer of clause 69, wherein providing the control signals via the at least one hardware processor further comprises:

providing, via the at least one hardware processor, the controls signals for each propeller in the first set of propellers and each propeller in the second set of propellers via a plurality of electrical buses.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

What is claimed is:

1. An aircraft, comprising:

a fuselage;

a plurality of flight control computers configured to provide control signals;

a first set of one or more electric propulsion units (EPUs) and a second set of one or more EPUs, wherein each of the first set and the second set are disposed on one side of the fuselage, wherein the first set is disposed forward of the second set during forward flight;

a third set of one or more EPUs and a fourth set of one or more EPUs, wherein each of the third set and the fourth set are disposed on another side of the fuselage, wherein the third set is disposed forward of the fourth set during forward flight;

a plurality of first electrical buses coupled to the plurality of flight control computers; and a plurality of second electrical buses coupled to at least one power source and configured to provide power to one or more EPUs, the plurality of second electrical buses being electrically separate from the plurality of first electrical buses, wherein:

at least one of the plurality of flight control computers is configured to provide control signals via one electrical bus of the plurality of first electrical buses to at least one of the first set of one or more EPUs and at least one of the fourth set of one or more EPUs; and at least one of the plurality of flight control computers is configured to provide control signals via another electrical bus of the plurality of first electrical buses to at least one of the third set of one or more EPUs and at least one of the second set of one or more EPUs.

2. The aircraft of claim 1, wherein at least one of the plurality of flight control computers is configured to provide control signals via the one electrical bus of the plurality of first electrical buses to one of the first set of one or more EPUs and one of the fourth set of one or more EPUs that are both disposed farthest from the fuselage.

3. The aircraft of claim 1, wherein at least one of the plurality of flight control computers is configured to provide control signals via the one electrical bus of the plurality of first electrical buses to one of the first set of one or more EPUs and one of the fourth set of one or more EPUs that are both disposed nearest to the fuselage.

4. The aircraft of claim 1, wherein at least one of the plurality of flight control computers is configured to provide control signals via the another electrical bus of the plurality of first electrical buses to one of the third set of one or more EPUs and one of the second set of one or more EPUs that are both disposed farthest from the fuselage.

5. The aircraft of claim 1, wherein at least one of the plurality of flight control computers is configured to provide control signals via the another electrical bus of the plurality of first electrical buses to one of the third set of one or more EPUs and one of the second set of one or more EPUs that are both disposed nearest to the fuselage.

6. The aircraft of claim 1, wherein at least one of the plurality of flight control computers is configured to provide control signals electrical bus of the plurality of first electrical buses to at least one of the first set of one or more EPUs and at least one of the third set of one or more EPUs.

7. The aircraft of claim 1, wherein at least one of the plurality of flight control computers is configured to provide control signals via a same electrical bus of the plurality of first electrical buses to at least one of the second set of one or more EPUs and at least one of the fourth set of one or more EPUs.

8. The aircraft of claim 1, wherein a number of EPUs in each set of one or more EPUs is three.

9. The aircraft of claim 1, wherein the first set of one or more EPUs and the third set of one or more EPUs are tiltable between a vertical lift configuration and a forward propulsion configuration.

10. The aircraft of claim 1, further comprising:

a plurality of tilt propeller actuators, each configured to tilt one of the EPUs between a vertical lift configuration and a forward propulsion configuration, the tilt propeller actuators disposed on opposite sides of the fuselage.

11. The aircraft of claim 10, wherein at least one of the plurality of flight control computers is configured to provide control signals via a same electrical bus of the plurality of first electrical buses to the tilt propeller actuators that are disposed on opposite sides and farthest from the fuselage.

12. The aircraft of claim 1, further comprising:

a plurality of flaperon actuators disposed on opposite sides of the fuselage.

13. The aircraft of claim 12, wherein at least one of the plurality of flight control computers is configured to provide control signals via a same electrical bus of the plurality of first electrical buses to the flaperon actuators that are disposed on opposite sides and nearest to the fuselage.

14. The aircraft of claim 1, further comprising:

a plurality of ruddervator actuators disposed on opposite sides of the fuselage.

15. The aircraft of claim 14, wherein at least one of the plurality of flight control computers is configured to provide control signals via a same electrical bus of the plurality of first electrical buses to the ruddervator actuators that are disposed on opposite sides and farthest from the fuselage.

16. A method for flight control, comprising:

providing control signals, via a plurality of flight control computers (FCCs) coupled to a plurality of first electrical buses, to a first set of one or more electric propulsion units (EPUs), a second set of one or more EPUs, a third set of one or more EPUs, and a fourth set of one or more EPUs included as part of an aircraft, wherein:

providing the control signals comprises:

providing at least some of the control signals via one electrical bus of the plurality of first electrical buses to at least one of the first set of one or more EPUs and at least one of the fourth set of one or more EPUs, and providing at least some of the control signals via another electrical bus of the plurality of first electrical buses to at least one of the third set of one or more EPUs and at least one of the second set of one or more EPUs; and the aircraft includes:

a fuselage;

the plurality of first electrical buses coupled to the plurality of FCCs; and a plurality of second electrical buses coupled to at least one power source and configured to provide power to one or more EPUs, the plurality of second electrical buses being electrically separate from the plurality of first electrical buses, wherein:

each of the first set of one or more EPUs and the second set of one or more EPUs are disposed on one side of the fuselage, wherein the first set is disposed forward of the second set during forward flight; and each of the third set of one or more EPUs and the fourth set of one or more EPUs are disposed on another side of the fuselage, wherein the third set is disposed forward of the fourth set during forward flight.

17. The method of claim 16, wherein providing the control signals via the plurality of FCCs further comprises:

providing, via at least one of the plurality of FCCs, the control signals via the one electrical bus of the plurality of first electrical buses to one of the first set of one or more EPUs and one of the fourth set of one or more EPUs that are both disposed farthest from the fuselage.

18. The method of claim 16, wherein providing the control signals via the plurality of FCCs further comprises:

providing, via at least one of the plurality of FCCs, the control signals via the one electrical bus of the plurality of first electrical buses to one of the first set of one or more EPUs and one of the fourth set of one or more EPUs that are both disposed nearest to the fuselage.

19. The method of claim 16, wherein providing the control signals via the plurality of FCCs further comprises:

providing, via at least one of the plurality of FCCs, the control signals via the another electrical bus of the plurality of first electrical buses to one of the third set of one or more EPUs and one of the second set of one or more EPUs that are both disposed farthest from the fuselage.

20. The method of claim 16, wherein providing the control signals via the plurality of FCCs further comprises:

providing, via at least one of the plurality of FCCs, the control signals via the another electrical bus of the plurality of first electrical buses to one of the third set of one or more EPUs and one of the second set of one or more EPUs that are both disposed nearest to the fuselage.

21. The method of claim 16, wherein providing the control signals via the plurality of FCCs further comprises:

providing, via at least one of the plurality of FCCs, the control signals via a same electrical bus of the plurality of first electrical buses to at least one of the first set of one or more EPUs and at least one of the third set of one or more EPUs.

22. The method of claim 16, wherein providing the control signals via the plurality of FCCs further comprises:

providing, via at least one of the plurality of FCCs, the control signals via a same electrical bus of the plurality of first electrical buses to at least one of the second set of one or more EPUs and at least one of the fourth set of one or more EPUs.

23. The method of claim 16, wherein a number of EPUs in each set of one or more EPUs is three.

24. The method of claim 16, wherein the first set of one or more EPUs and the third set of one or more EPUs are tiltable between a vertical lift configuration and a forward propulsion configuration.

25. The method of claim 16, wherein the aircraft further comprises:

a plurality of tilt propeller actuators, each configured to tilt one of the EPUs between a vertical lift configuration and a forward propulsion configuration, the tilt propeller actuators disposed on opposite sides of the fuselage.

26. The method of claim 25, wherein providing the control signals via the plurality of FCCs further comprises:

providing, via at least one of the plurality of FCCs, the control signals via a same electrical bus of the plurality of first electrical buses to the tilt propeller actuators that are disposed on opposite sides and farthest from the fuselage.

27. The method of claim 16, wherein the aircraft further comprises:

a plurality of flaperon actuators configured to be disposed on opposite sides of the fuselage.

28. The method of claim 27, wherein providing the control signals via the plurality of FCCs further comprises:

providing, via at least one of the plurality of FCCs, the control signals via a same electrical bus of the plurality of first electrical buses to the flaperon actuators that are disposed on opposite sides and nearest to the fuselage.

29. The method of claim 16, wherein the aircraft further comprises:

a plurality of ruddervator actuators configured to be disposed on opposite sides of the fuselage.

30. The method of claim 29, wherein providing the control signals via the plurality of FCCs further comprises:

providing, via at least one of the plurality of FCCs, the control signals via a same electrical bus of the plurality of first electrical buses to the ruddervator actuators that are disposed on opposite sides and farthest from the fuselage.

31. An aircraft, comprising:

a fuselage;

a first set of one or more electric propulsion units (EPUs) and a second set of one or more EPUs, wherein each of the first set and the second set are disposed on one side of the fuselage, wherein the first set is disposed forward of the second set during forward flight;

a third set of one or more EPUs and a fourth set of one or more EPUs, wherein each of the third set and the fourth set are disposed on another side of the fuselage, wherein the third set is disposed forward of the fourth set during forward flight;

a plurality of first electrical buses coupled to one or more flight control computers (FCCs); and a plurality of second electrical buses coupled to at least one power source and configured to provide power to one or more EPUs, the plurality of second electrical buses being electrically separate from the plurality of first electrical buses, wherein the one or more FCCs are configured to:

provide control signals via one electrical bus of the plurality of first electrical buses to at least one of the first set of one or more EPUs and at least one of the fourth set of one or more EPUs; and provide control signals via another electrical bus of the plurality of first electrical buses to at least one of the third set of one or more EPUs and at least one of the second set of one or more EPUs.

* * * * *